United States Patent
Login et al.

(10) Patent No.: US 10,413,818 B2
(45) Date of Patent: Sep. 17, 2019

(54) MONITORING AN APPLICATION ON A PROCESSING DEVICE

(71) Applicant: OUTFIT7 LIMITED, London (GB)

(72) Inventors: Samo Login, Pissouri (CY); John Stephen Rankin, London (GB)

(73) Assignee: Outfit7 Limited, London (GB)

( * ) Notice: Subject to any disclaimer, the term of this patent is extended or adjusted under 35 U.S.C. 154(b) by 1091 days.

(21) Appl. No.: 14/560,523

(22) Filed: Dec. 4, 2014

(65) Prior Publication Data

US 2016/0096109 A1    Apr. 7, 2016

Related U.S. Application Data

(60) Provisional application No. 62/058,417, filed on Oct. 1, 2014.

(51) Int. Cl.
| | |
|---|---|
| *A63F 13/30* | (2014.01) |
| *H04L 12/26* | (2006.01) |
| *H04L 29/08* | (2006.01) |
| *G06Q 30/02* | (2012.01) |

(52) U.S. Cl.
CPC ......... *A63F 13/30* (2014.09); *G06Q 30/0207* (2013.01); *G06Q 30/0242* (2013.01); *G06Q 30/0251* (2013.01); *G06Q 30/0269* (2013.01); *H04L 43/04* (2013.01); *H04L 67/22* (2013.01)

(58) Field of Classification Search
None
See application file for complete search history.

(56) References Cited

U.S. PATENT DOCUMENTS

| | | |
|---|---|---|
| 6,099,408 A | 8/2000 | Schneier et al. |
| 6,264,557 B1 | 7/2001 | Schneier et al. |
| 6,571,216 B1 | 5/2003 | Garg et al. |
| 7,761,327 B1 | 7/2010 | Hannah et al. |

(Continued)

FOREIGN PATENT DOCUMENTS

| | | |
|---|---|---|
| WO | WO 2009/126316 A1 | 10/2009 |
| WO | WO 2011/035442 A1 | 3/2011 |

(Continued)

OTHER PUBLICATIONS

International Search Report and Written Opinion dated Jan. 12, 2016 in PCT/EP2015/072107.

(Continued)

*Primary Examiner* — Meredith A Long
(74) *Attorney, Agent, or Firm* — Oblon, McClelland, Maier & Neustadt, L.L.P.

(57) ABSTRACT

A processing device is described storing instructions defining a first application and a second application. Engagement of the second application by a user is effective to generate one or more rewards for use in the first application. The processing device further stores instructions separate from the second application defining a monitoring module and a reward generating module. The monitoring module is operable to determine a measure of an engagement of the second application by the user. The reward generating module is operable to calculate one or more rewards in dependence upon the determined measure of engagement and to make the calculated one or more rewards available for use in the first application.

60 Claims, 33 Drawing Sheets

(56) References Cited

U.S. PATENT DOCUMENTS

| | | | |
|---|---|---|---|
| 8,090,618 B1* | 1/2012 | Chu | G06Q 30/0209 705/14.12 |
| 8,700,455 B2 | 4/2014 | Hopwood | |
| 8,814,703 B2 | 8/2014 | McCaffrey et al. | |
| 8,821,294 B2 | 9/2014 | Mccaffrey et al. | |
| 8,825,525 B2 | 9/2014 | Carpenter et al. | |
| 8,834,276 B2 | 9/2014 | McCaffrey et al. | |
| 8,839,266 B1* | 9/2014 | Partridge | G06F 13/00 719/310 |
| 2002/0002076 A1 | 1/2002 | Schneier et al. | |
| 2004/0092310 A1 | 5/2004 | Brosnan et al. | |
| 2004/0166931 A1 | 8/2004 | Criss-Puszkiewicz et al. | |
| 2006/0281541 A1 | 12/2006 | Nguyen et al. | |
| 2006/0287106 A1 | 12/2006 | Jensen | |
| 2008/0090628 A1 | 4/2008 | Mueller et al. | |
| 2008/0167106 A1 | 7/2008 | Lutnick et al. | |
| 2009/0239661 A1 | 9/2009 | Acres | |
| 2009/0299817 A1 | 12/2009 | Fok et al. | |
| 2010/0146502 A1 | 6/2010 | Zalewski | |
| 2011/0250949 A1 | 10/2011 | van Os et al. | |
| 2012/0036003 A1 | 2/2012 | Tong et al. | |
| 2012/0315993 A1 | 12/2012 | Dumont et al. | |
| 2013/0006773 A1 | 1/2013 | Lutnick et al. | |
| 2013/0117084 A1 | 5/2013 | Rooke et al. | |
| 2013/0143669 A1 | 6/2013 | Muller | |
| 2013/0151342 A1 | 6/2013 | Citron et al. | |
| 2013/0185133 A1 | 7/2013 | Tong et al. | |
| 2013/0219426 A1 | 8/2013 | Zweig et al. | |
| 2013/0304580 A1 | 11/2013 | Feadler et al. | |
| 2013/0324259 A1* | 12/2013 | McCaffrey | A63F 13/79 463/42 |
| 2013/0324260 A1 | 12/2013 | Mccaffrey et al. | |
| 2013/0324261 A1 | 12/2013 | Mccaffrey et al. | |
| 2013/0325573 A1 | 12/2013 | Park et al. | |
| 2013/0339228 A1* | 12/2013 | Shuster | G06F 9/541 705/40 |
| 2014/0058811 A1 | 2/2014 | Gorowitz et al. | |
| 2014/0058812 A1 | 2/2014 | Bender et al. | |
| 2014/0089068 A1 | 3/2014 | Yehezkel et al. | |
| 2014/0164142 A1* | 6/2014 | Yang | G06Q 30/0273 705/14.69 |
| 2014/0278853 A1 | 9/2014 | Brown et al. | |
| 2014/0280896 A1* | 9/2014 | Papakostas | H04W 4/001 709/224 |
| 2014/0337831 A1 | 11/2014 | Katagai et al. | |
| 2014/0342837 A1 | 11/2014 | Mccaffrey et al. | |
| 2014/0342838 A1 | 11/2014 | Mccaffrey et al. | |
| 2014/0344071 A1 | 11/2014 | Mccaffrey et al. | |
| 2015/0046247 A1* | 2/2015 | Rajappa | G06Q 30/0235 705/14.35 |
| 2015/0065252 A1* | 3/2015 | Ikeda | A63F 13/45 463/42 |
| 2015/0120458 A1 | 4/2015 | Lee | |
| 2015/0189377 A1* | 7/2015 | Wheatley | H04N 21/44218 725/12 |
| 2016/0335316 A1* | 11/2016 | Riva | G06F 17/30421 |
| 2017/0178179 A1* | 6/2017 | Bauman | G06Q 30/0244 |

FOREIGN PATENT DOCUMENTS

| | | |
|---|---|---|
| WO | WO 2012/019072 A1 | 2/2012 |
| WO | WO 2013/118629 A1 | 8/2013 |
| WO | WO 2013/158033 A1 | 10/2013 |
| WO | WO 2014/074945 A1 | 5/2014 |

OTHER PUBLICATIONS

Partial European Search Report dated Feb. 9, 2015 in Patent Application No. 14172199.3.

U.S. Appl. No. 14/303,055, filed Jun. 12, 2014, Login.

U.S. Office Action issued in U.S. Appl. No. 14/745,094 dated Mar. 14, 2018.

Office Action dated Feb. 21, 2019 in European Patent Application No. 14 172 199.3.

"Inter-process communication", Wikipedia, version dated Apr. 18, 2014, < https://en. wikipedia.org/w/index.php?title=Interprocess_communication&oldid=604713283>.

* cited by examiner

First application on user processing device

MONITORING AN APPLICATION ON A PROCESSING DEVICE

CLAIM OF PRIORITY

This patent application claims priority from U.S. Provisional Patent Application Ser. No. 62/058,417, filed on Oct. 1, 2014, the full contents of which are incorporated herein by reference.

TECHNICAL FIELD

The present invention generally relates to monitoring an application on a processing device. Results of the monitoring may be used to generate rewards for use in a different application.

BACKGROUND

There has been growing interest in systems for promoting applications (commonly referred to as "apps"), which provide rewards in one application in connection with use of one or more other applications. Known systems of this kind are described, for example, in US 2013/0324259 A1 and US 2013/0324260 A1.

In known systems for promoting applications, multiple game servers are connected to a network. Each game server implements a different electronic game and provides the electronic game over the network to client devices used by players. Each game server is also connected to an aggregator server operating an aggregator database and a cross-promotional engine. The aggregator database stores information transmitted from the game servers. The information in the aggregator database is utilised by the cross-promotion engine, in conjunction with rules, to establish promotions between the various electronic games. The cross-promotion engine tracks a user's progress in an electronic game and registers rewards to the user in a different electronic game, such as virtual goods and virtual items, based on the user's progress.

These known systems suffer from a number of disadvantages, however. For example, one disadvantage is that, in order for a user to earn a reward, the game servers must be connected to the aggregator server so that the cross-promotion engine in the game server can track the user's progress in an electronic game and register a reward to the user in a different electronic game. A further disadvantage is that, in order for a user to claim a reward that he/she has earned, the user device of the user must be connected to the game servers via the network, and this may not always be convenient or possible for the user (for example if the user is using the user device in "Flight-Safe" mode).

SUMMARY

According to the present invention, there is provided a processing device storing instructions defining a first application and a second application, engagement of the second application by a user being effective to generate one or more rewards for use in the first application. The processing device further stores instructions, separate from the second application, defining a monitoring module and a reward generating module. The monitoring module is operable to determine a measure of an engagement of the second application by the user. The reward generating module is operable to calculate one or more rewards in dependence upon the determined measure of engagement and to make the calculated one or more rewards available for use in the first application.

The present invention also provides a method of generating rewards for use in a first application on a processing device in response to user engagement of a second application on the processing device. The method comprises a monitoring module on the processing device that is separate from the second application determining a measure of an engagement of the second application by the user. The method further comprises a reward generating module on the processing device that is separate from the second application calculating one or more rewards in dependence upon the determined measure of an engagement and making the calculated one or more rewards available for use in the first application.

The present invention also provides a non-transitory storage medium storing computer program instructions. The computer program instructions, when executed by a processing device that has first application instructions defining a first application and second application instructions, separate from the computer program instructions, defining a second application engagement of which by a user is effective to generate one or more rewards for use in the first application, cause the processing device to determine a second application to be monitored, and to determine a measure of an engagement of the determined second application by a user.

The present invention further provides a method that is performed by the execution of monitoring instructions on a processing device that has first application instructions defining a first application and second application instructions, separate from the monitoring instructions, defining a second application engagement of which by a user is effective to generate one or more rewards for use in the first application. The method comprises determining a second application to be monitored. The method further comprises determining a measure of an engagement of the determined second application by a user.

BRIEF DESCRIPTION OF THE DRAWINGS

Embodiments of the invention will now be described in detail, by way of example only, with reference to the accompanying drawings, in which.

DETAILED DESCRIPTION

Although embodiments of the invention will be described below, it will be evident that various modifications may be made to these embodiments without departing from the broader spirit and scope of the invention. Accordingly, the following description and the accompanying drawings are to be regarded as illustrative rather than restrictive.

In the following description and in the accompanying figures, numerous details are set forth in order to provide an understanding of various embodiments of the invention. However, it will be evident to those skilled in the art that embodiments may be practiced without these details.

As used herein, the term "user" may be construed to include a person, a machine, or the combination of a person and a machine.

Reference is made in the following to applications or "apps". These applications may take many forms and may have many different purposes. An example is provided of the applications being electronic games, but this is merely one example and should not be regarded as restrictive.

Figure 1:
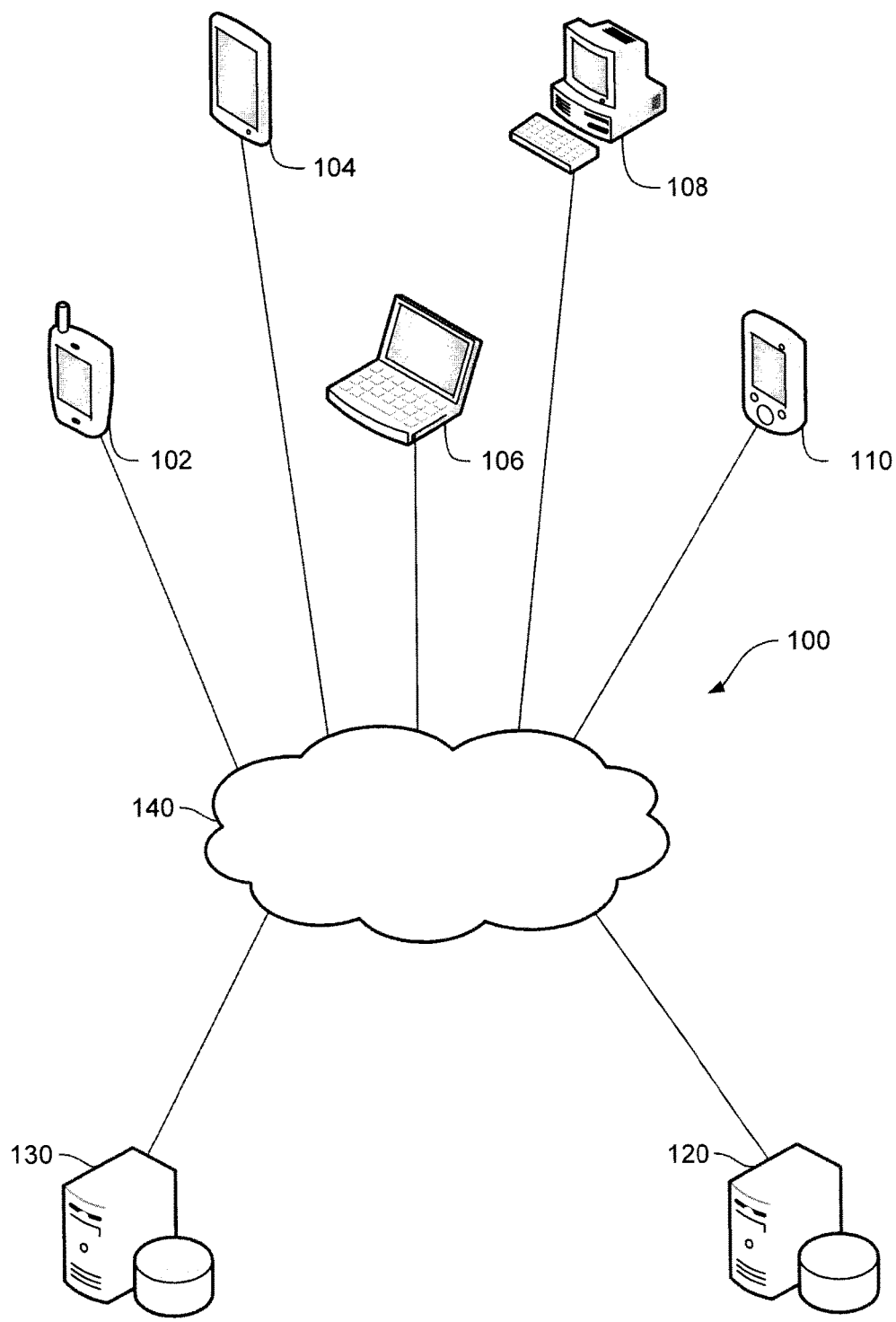
FIG. 1 is a schematic diagram showing an example of a system in which various embodiments of the invention may be practised.

FIG. 1 is a schematic diagram showing an example of a system 100 in which various embodiments of the invention may be practised. In the example, a plurality of user processing devices 102, 104, 106, 108, 110 communicate with one or more backend servers 120 and one or more application download servers 130 via a network 140. Five user processing devices are shown in FIG. 1 by way of example, although there may be more than this or fewer. Similarly, one backend server 120 and one application download server 130 are shown in FIG. 1 by way of example, but it should be understood that the system is scalable to more than one of each of these servers.

Aspects of the configuration and processing operations of each user processing device 102, 104, 106, 108, 110, backend server 120 and application download server 130 that are helpful for understanding embodiments of the present invention are described in detail below, while the description of other aspects, which will be familiar to those skilled in the art, is omitted for the sake of clarity.

The network 140 may comprise one or more networks, such as the Internet, a telephone network, a cellular data network, etc. The network 140 may also comprise a virtual private network (VPN), a local area network (LAN), a wide area network (WAN), or any other form of network.

Each user processing device may comprise any processing device that can run applications, such as a smartphone 102, a tablet computer 104, a laptop computer 106, a desktop computer 108, a games console 110, or some other form of processing device such as a personal digital assistant, a smart watch, etc. Each of the user processing devices communicates with the network 140 through any suitable communication link, such as wireless communication link (for example a WiFi or cellular telephone data link) or a wire, fibre-optic cable, etc. Each communication link may not be permanent.

As will be explained in more detail below, a user processing device 102, 104, 106, 108, 110 runs a first application that can be used by a user of the processing device. The first application may be pre-installed on the user processing device (for example by the manufacturer of the user processing device or by a distributor of the user processing device) or the first application may be downloaded by the user from an application download server 130 such as the iTunes Store or the Google Play Store. As part of the first application, or separate therefrom, second applications are promoted to the user, for example by informing the user that the use of a second application will generate rewards that the user may utilise in the first application. These promotions may be used to promote second applications from third parties and/or second applications from the same developer as the first application. The promotions may be used to promote second applications that are not installed on the user processing device and/or second applications that are already installed on the user processing device so as to engage and/or re-engage the user with the already-installed second applications (in this regard, the already-installed second applications may or may not have been previously promoted). The promotions may be cross-promotions. Accordingly, the terms "promotion", "promotions" and the like as used herein should be understood to encompass all of the above types of promotions as well as any other form of promotions.

By way of example, the user can download a promoted second application onto the user processing device for example by downloading it from an application download server 130 such as the iTunes Store or the Google Play Store. Once available on the user processing device, the user can engage the second application to earn one or more rewards that the user can utilise in the first application. Each such second application is therefore referred to herein as either a second application or a reward-generating application. The user processing device performs processing to determine a measure of an engagement of the user with the second application (for example, a measure of the length of time that the user may be engaged with the second application) and calculates one or more rewards for use in the first application in dependence upon the determined number of engagement. For example, the size of a reward, or the number of rewards, may be based on the determined measure of engagement of the user with the second application. Alternatively, the size of the reward, or the number of rewards, may be fixed and the user processing device may determine whether the determined measure of engagement achieves a necessary threshold for the user to earn the reward(s).

By way of non-limiting example, if the first application is an electronic game, then the reward(s) may take the form of additional lives, coins, jewels, moves, etc. in the first electronic game. It should be noted that the rewards used by the first application need not be of the same kind as the rewards used by the second application. Furthermore, although an example has been given of earning rewards that can be used in a first application comprising an electronic game, it will be appreciated that the teachings herein are more generally applicable to any other kind of first application. For example, the first application may be an application for booking holidays and the second application may be a review application for leaving reviews of hotels advertised in the holiday booking application, where engagement of the review application by the user is effective to generate a reward in the form of a discount for use in the holiday booking application.

As will be explained in detail below, the processing to determine the user's engagement with a second application is performed by a monitoring module that is separate from the second application. This provides a number of advantages. For example, it is not necessary to modify or supplement the instructions of the second application in order for the monitoring to be performed. The monitoring module may be part of the first application, part of the operating system of the user processing device, or a separate module on the user processing device. The monitoring module may interface with at least one of the first application and the operating system of the user processing device to determine therefrom a measure of the engagement of the second application by the user. Furthermore, the user can engage with the second application, earn one or more rewards and utilise the earned reward(s) in the first application without the need for the user processing device to have a connection to the network 140 (or any other network), and without the need for the user processing device to have a connection to a backend server 120 or to an application download server 130.

Figure 2:
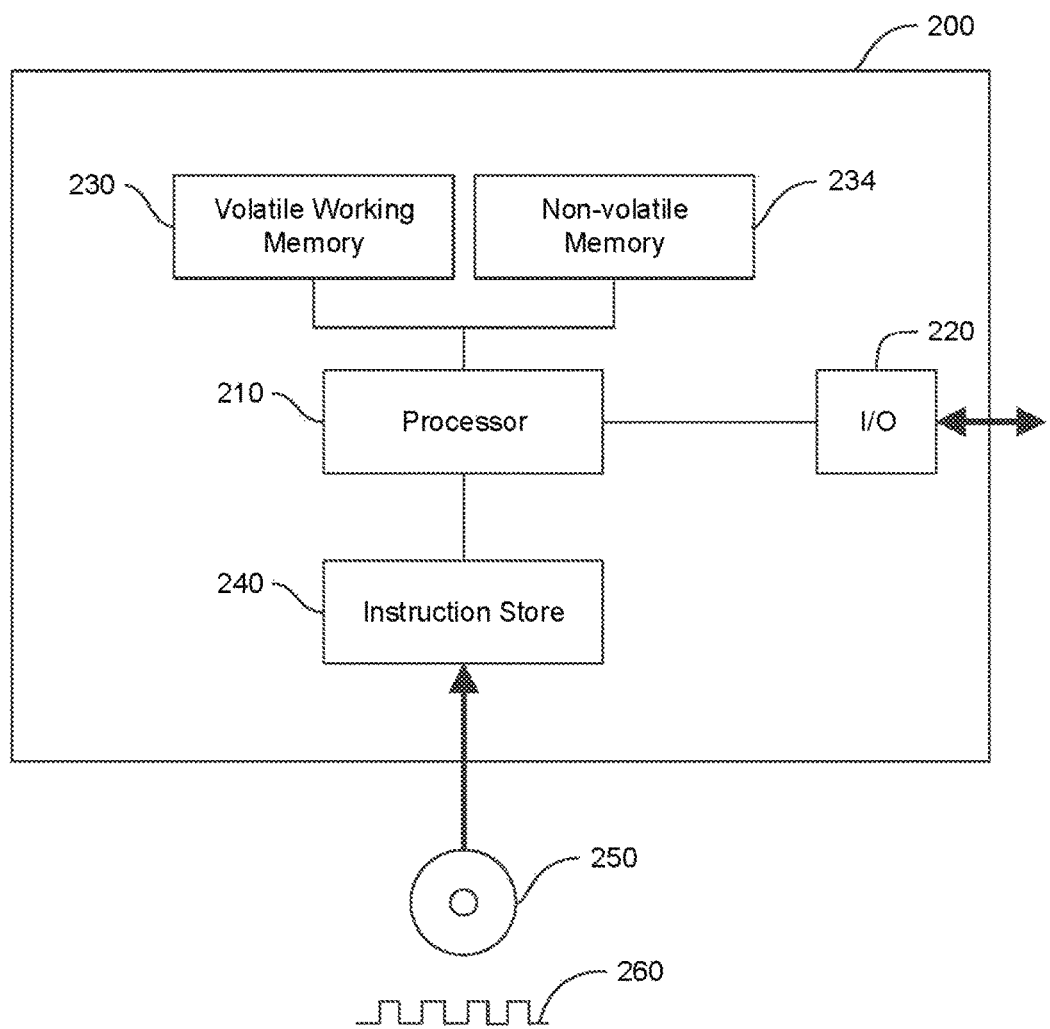
FIG. 2 schematically shows an example of a general kind of programmable processing apparatus that may be used to implement a user processing device in embodiments of the invention.

Referring now to FIG. 2, an example of a general kind of programmable processing apparatus 200 that may be used to implement a user processing device in embodiments is shown.

The programmable processing apparatus 200 comprises one or more processors 210, one or more input/output communication modules 220, one or more volatile working memories 230, one or more non-volatile memories 234 and one or more instruction stores 240 storing computer-readable instructions which can be executed by a processor 210 to perform the processing operations as described hereinafter.

An instruction store 240 is a non-transitory storage medium, which may comprise a non-volatile memory, for example in the form of a read-only-memory (ROM), a magnetic computer storage device (for example a hard disk) or an optical disk, which is pre-loaded with the computer-readable instructions. Alternatively, an instruction store 240 may comprise writeable memory, such as random access memory (RAM) and the computer-readable instructions can be input thereto from a computer program product, such as a non-transitory computer-readable storage medium 250 (for example an optical disk such as a CD-ROM, DVD-ROM, etc) or a computer-readable signal 260 carrying the computer-readable instructions.

The computer-readable instructions comprise monitoring instructions which, when executed, cause the user processing device to implement a monitoring module, first application instructions defining a first application which, when executed, cause the user processing device to implement the first application, and, for each second application, second application instructions defining the second application and which, when executed, cause the user processing device to implement the second application.

The first application and the monitoring module each comprise a number of functional processing modules. These functional processing modules differ in different embodiments, as will now be described. As noted above, the second application need not be modified to incorporate any additional modules beyond the module or modules to implement the second application. Accordingly, as the structure and processing operations of the second application may be conventional, they will not be described in the following.

First Embodiment

Figure 3:
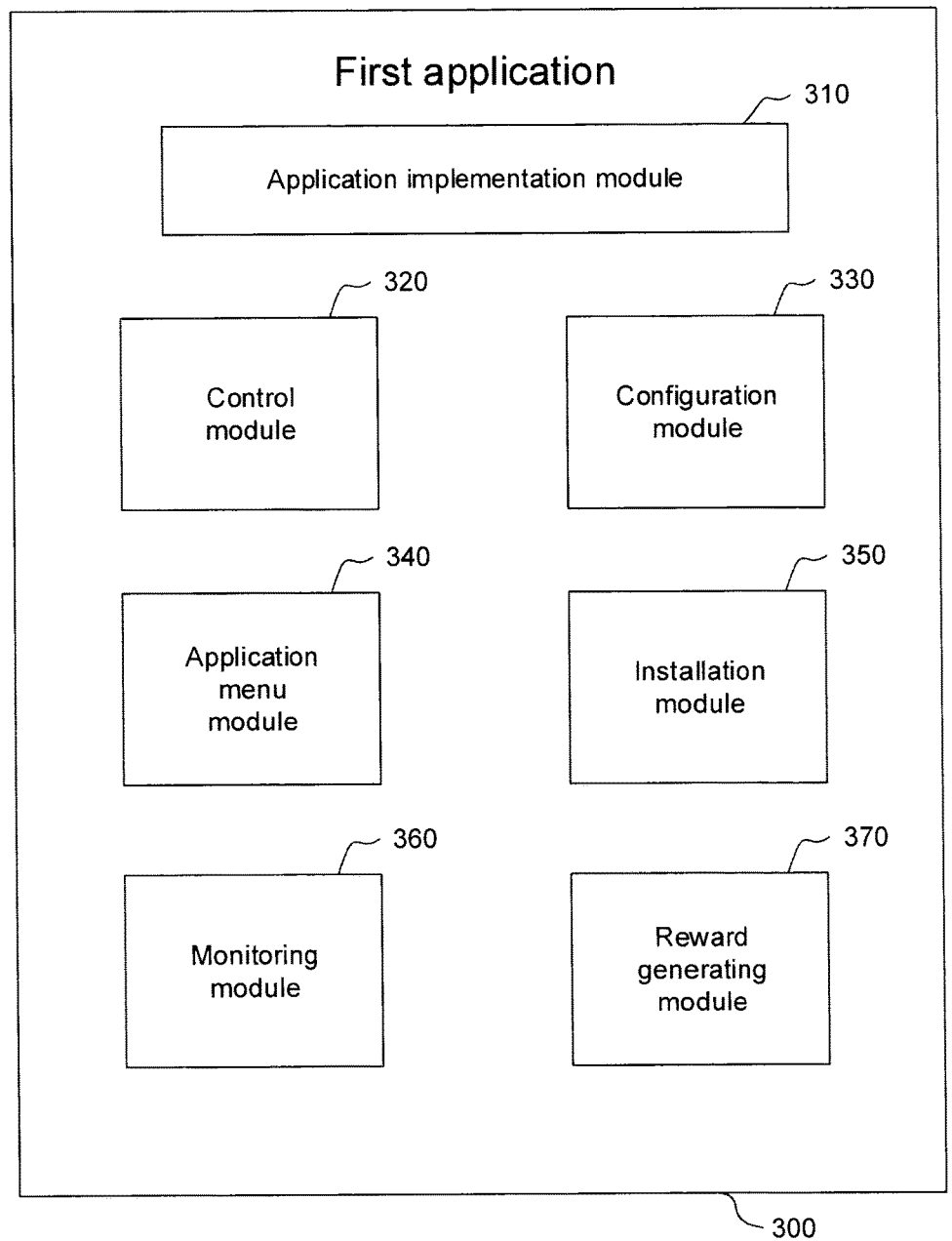
FIG. 3 schematically illustrates functional processing modules of a first application in a first embodiment.

FIG. 3 schematically illustrates the functional processing modules of a first application 300 in a first embodiment.

Referring to FIG. 3, in addition to the application implementation module 310 that effects processing to implement the application, the first application also comprises a control module 320, a configuration module 330, an application menu module 340, an installation module 350, a monitoring module 360 and a reward generating module 370.

As noted above, the application implementation module 310 effects processing to implement the application. Accordingly, the content of the application implementation module 310 depends upon the nature of the first application. For example, if the first application is an electronic game, then the application implementation module 310 implements the game rules defining, inter alia, the structural setup of the game that allows user choice making to occur and determines how the game play evolves from the beginning to the end in response to play actions and decisions.

The other modules illustrated in FIG. 3 perform processing operations in connection with the promotion of second applications, the downloading of second applications onto the user processing device, the monitoring of each second application to determine a measure of the user's engagement therewith, and the generation of rewards that the user can utilise in the first application 300.

Control module 320 is operable to provide general control functionality for the processing operations performed by the other modules in the first application 300.

Configuration module 330 is operable to communicate with one or more backend servers 120 to obtain therefrom configuration data relating to one or more second applications to be promoted. More particularly, in this embodiment, the configuration data comprises data defining one or more second applications that are to be promoted and, for each second application that is to be promoted, conversion data defining a conversion between a measure of engagement of the second application by the user and one or more rewards in the first application. The conversion data therefore defines what measure of engagement of the second application by the user is required to generate one or more rewards in the first application. For example, the conversion data may define a threshold level that the measure of engagement must meet in order for the reward(s) to be generated in the first application. Alternatively, the conversion data may define different rewards, different numbers of rewards and/or different values of rewards for different measures of engagement. The conversion data may impose a maximum for the reward(s) that can be earned. The configuration module 330 may be configured to communicate with a backend server 120 at regular intervals to update the configuration data comprising the data defining the second application(s) to be promoted and the conversion data. In this way, different second applications may be promoted at different times.

Application menu module 340 is operable to generate and display a menu of second applications (reward-generating applications) that the user may select from. This menu includes each second application identified in the configuration data that was obtained from a backend server 120. The second applications identified in the configuration data, and therefore in the menu generated and displayed by application menu module 340, may include second applications that are not installed on the user processing device but are available for download, and/or second applications that are already installed on the user processing device on which the first application is installed. The menu generated by application menu module 340 may take any form, such as a list, table, game wall, or any other display format which identifies reward-generating applications to the user. The menu could be part of an existing menu or display of the first application. Each second application in the menu may be represented in any form, for example by a name or by an icon.

Installation module 350 is operable to facilitate the installation of a second application that is downloaded from an application download server 130 onto the user processing device.

Monitoring module 360 is operable to determine a measure of engagement of a second application by the user. In this embodiment, the monitoring module 360 is part of the first application, but this need not be the case as will be explained in later embodiments.

Figure 4:
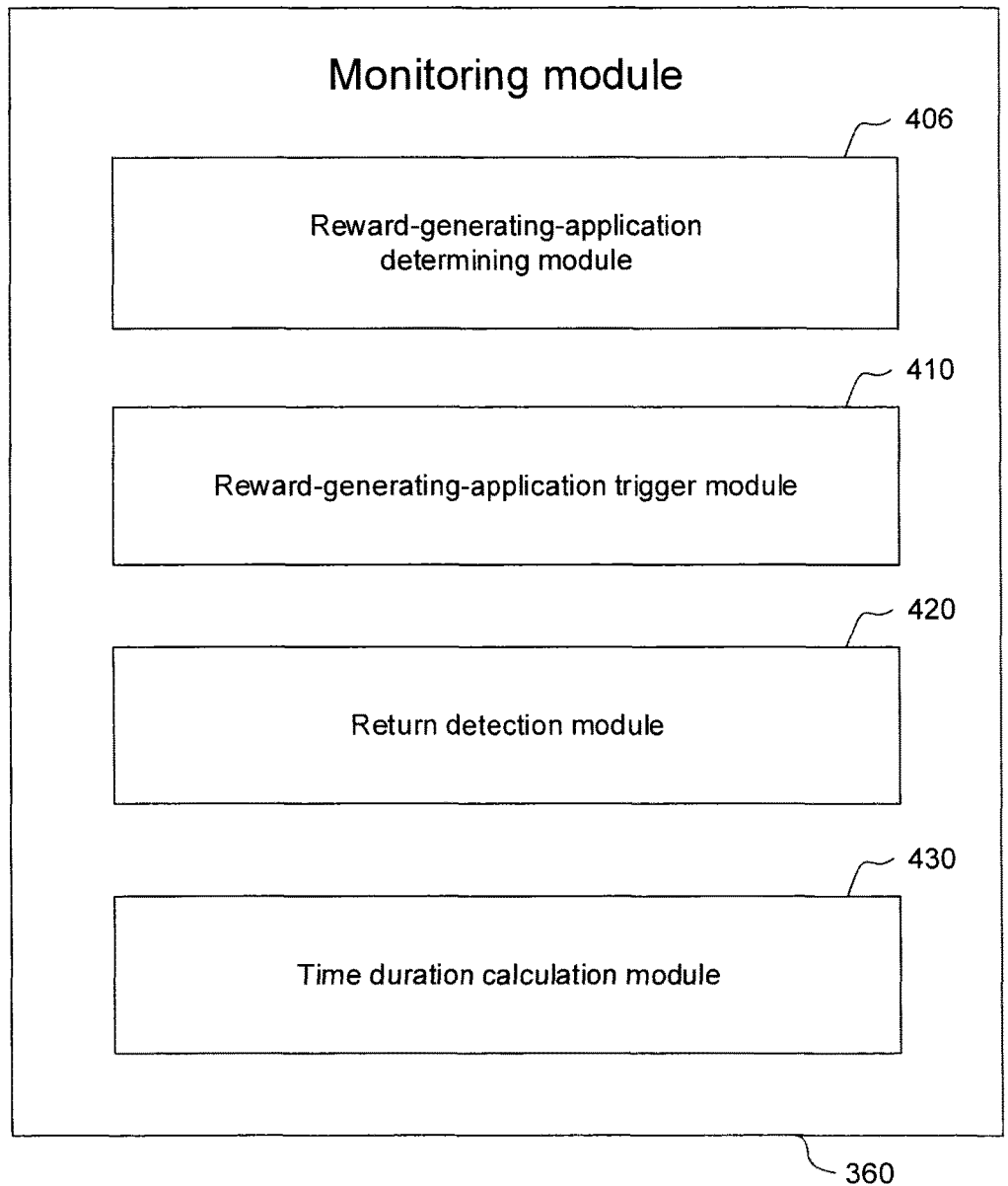
FIG. 4 schematically illustrates functional processing modules of a monitoring module in the first embodiment.

FIG. 4 schematically illustrates the functional processing modules of monitoring module 360 in the present embodiment.

Referring to FIG. 4, the monitoring module 360 of the present embodiment comprises a reward-generating-application determining module 406, reward-generating-application trigger module 410, a return detection module 420 and a time duration calculation module 430.

Reward-generating-application determining module 406 is operable to determine a reward-generating application to be monitored.

Reward-generating-application trigger module 410 is operable to trigger activation of a reward-generating application, and to store a time indicative of the time at which activation of the reward generating application is triggered.

Return detection module 420 is operable to detect when the user returns to the first application 300, and to store a time indicative of the time at which the user returns to the first application.

Time duration calculation module 430 is operable to calculate a measure of an engagement of the second application by the user comprising a measure of time between the time at which activation of the reward-generating application was triggered and the time at which the user returned to the first application.

Referring again to FIG. 3, reward generating module 370 is operable to generate one or more rewards for use by the user in the first application by calculating one or more rewards in dependence upon the measure of engagement determined by the monitoring module 360 and by making the calculated reward(s) available for use in the first application. In this embodiment, the reward generating module 370 is part of the first application 300, but this need not be the case as will be explained in later embodiments.

The processing operations performed by a first application 300 on a user processing device 102, 104, 106, 108, 110 and by a backend server 120 will now be described with reference to FIGS. 5A, 5B, 5C and 6. Within these figures, the identity of the device performing each processing operation can be determined from the heading at the top of the column in which the processing operation is shown.

Figure 5A:
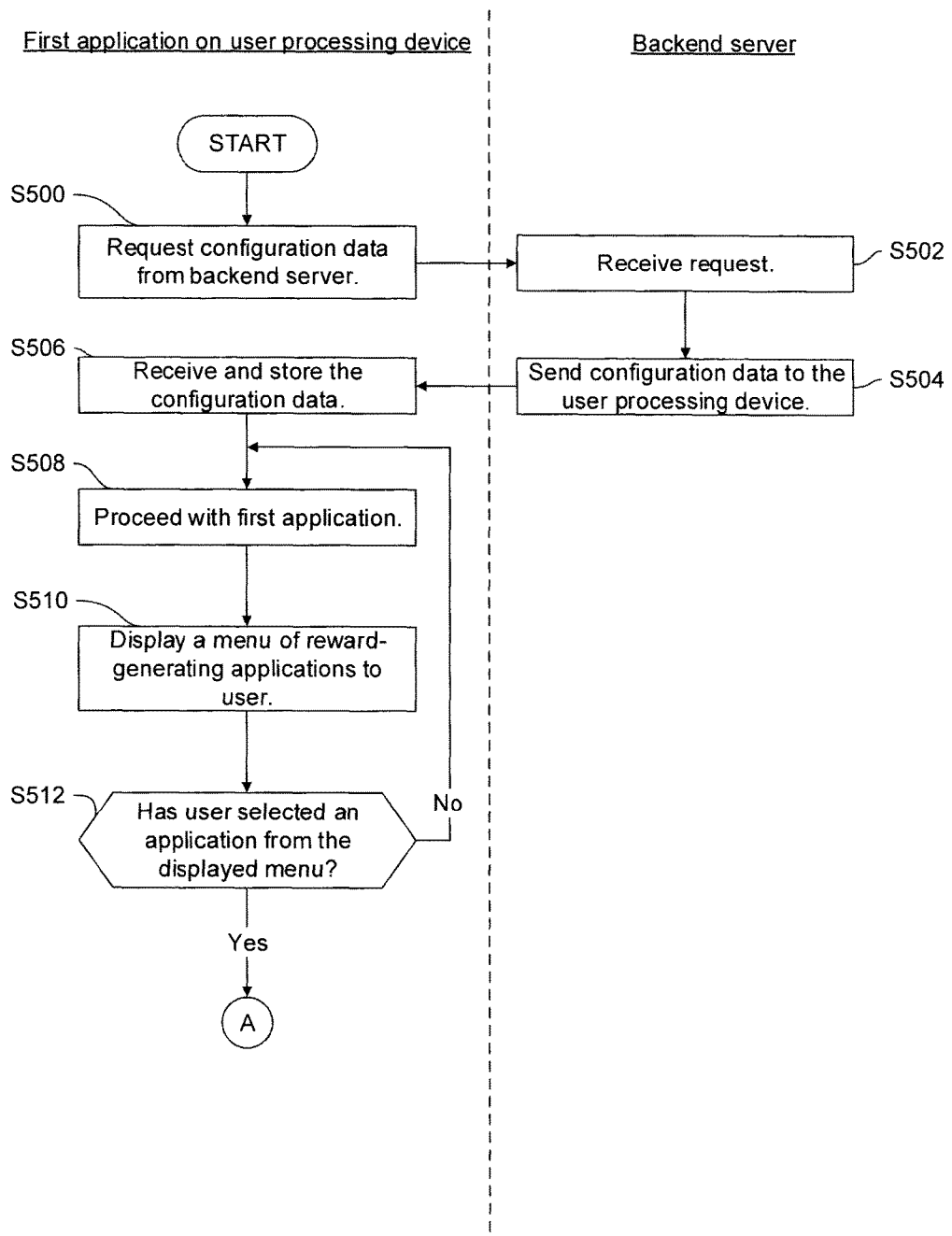
FIGS. 5A, 5B and 5C show processing operations performed by a first application on a user processing device and by a backend server in the first embodiment.
Figure 5B:
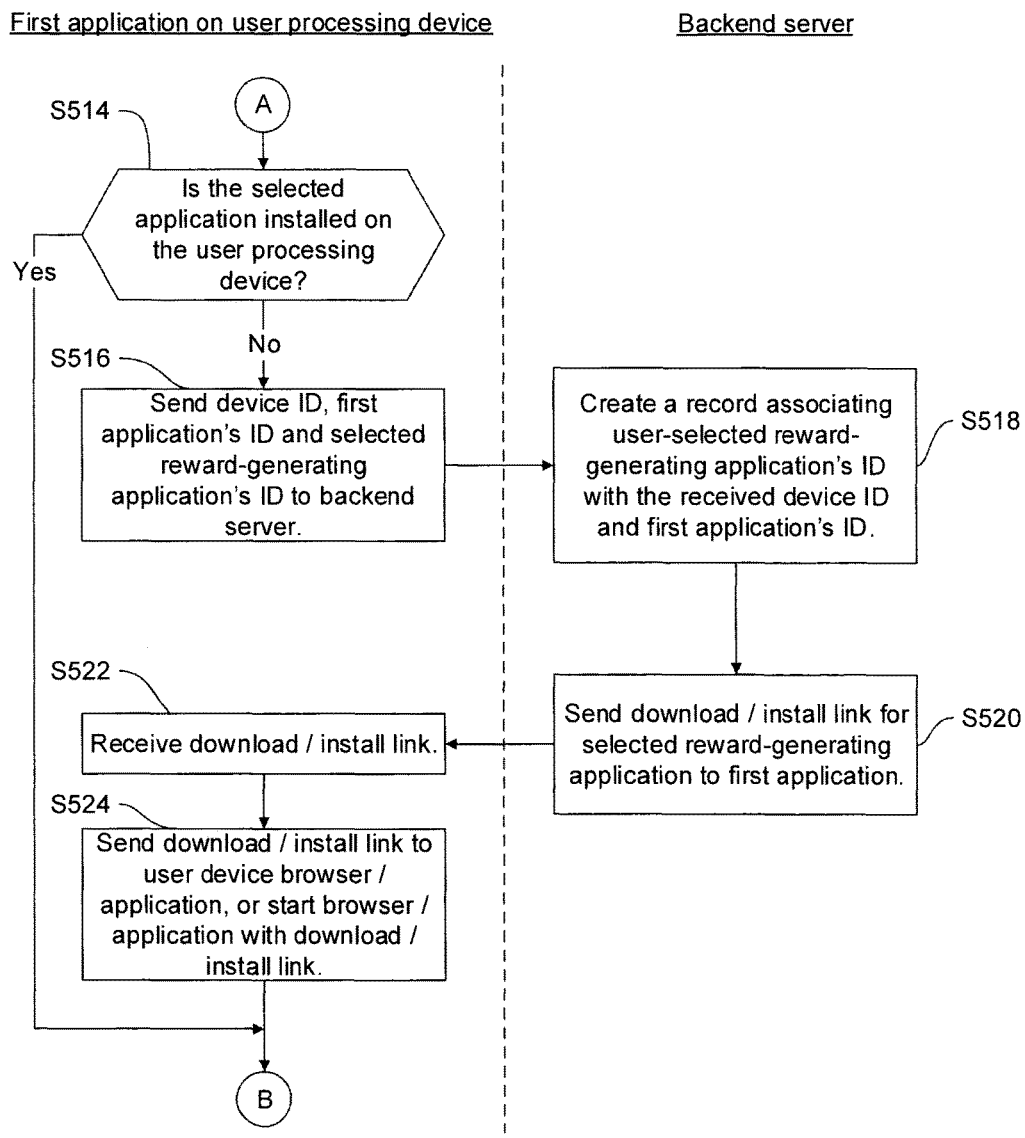
Figure 5C:
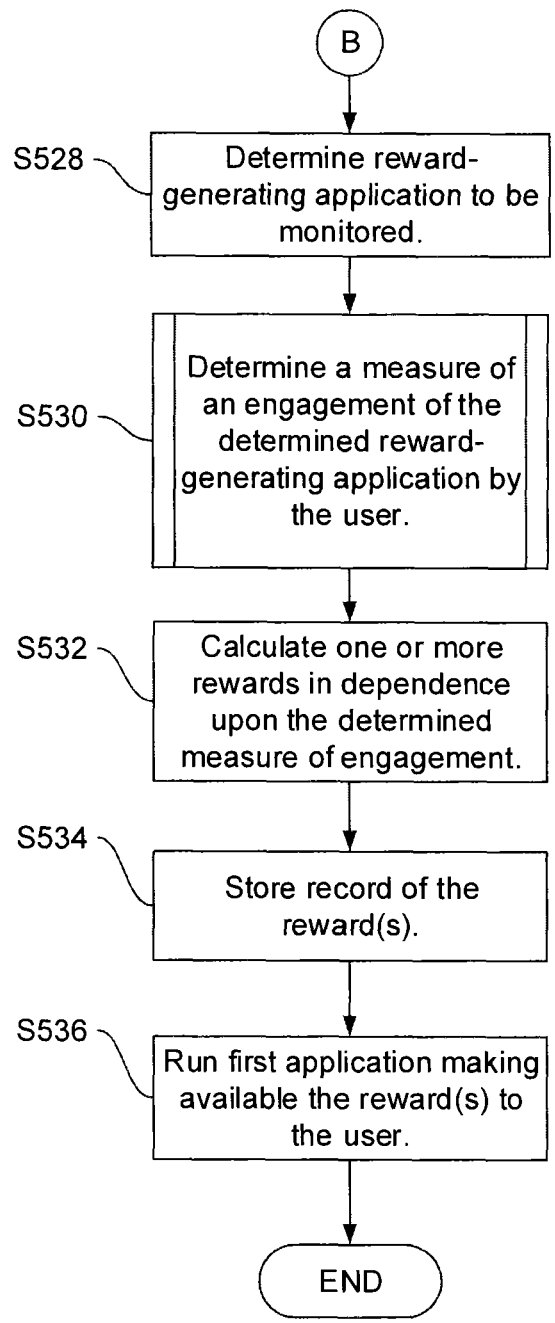

Referring to FIG. 5A, at step S500, configuration module 330 of first application 300 requests configuration data from a backend server 120.

At step S502, the request for configuration data is received by the backend server 120 and, at step S504, the backend server 120 sends configuration data to the requesting user processing device. As noted above, the configuration data in this embodiment comprises data defining one or more second applications that are currently being promoted as reward-generating applications for the first application 300 on the user processing device, and also conversion data defining a conversion from a measure of engagement of the user with a second application to one or more rewards in the first application. The conversion data may impose a maximum for the reward(s) that can be earned and may also impose a minimum for the reward(s) that can be earned.

At step S506, the configuration data sent by the backend server 120 is received by configuration module 330 and stored in a volatile working memory 230 and a non-volatile memory 234 of the user processing device 102, 104, 106, 108, 110 (the storage in volatile working memory 230 being for use in the current session and the storage in non-volatile memory 234 being for future use in other sessions until new configuration data is received from a backend server 120).

The request for configuration data transmitted at step S500 and the configuration data transmitted at step S504 may be secured by encryption, using techniques well known to those skilled in the art.

Although not shown in FIG. 5A, steps S500, S502, S504 and S506 may be repeated at regular intervals in order to obtain up-to-date configuration data from a backend server 120.

At step S508, application implementation module 310 performs processing to proceed with the first application 300. For example, if the first application is an electronic game, then processing is performed at step S508 to run the game on the user processing device and to allow the user to play the game.

At a predetermined time or event in the first application (for example, when the user has completed a predetermined task such as completing a level in an electronic game or when the user has used the first application for a predetermined length of time) or at a time or event in the first application that has been randomly selected by the first application or by the user (for example by the user selecting an icon displayed by the first application or by the user entering a specific menu that is part of the first application), application menu module 340 displays to the user at step S510 a menu of the reward-generating applications that were identified in the configuration data received from the backend server 120. As noted above, the menu may take any form such as a list, table, game wall or any other display format. Each application in the menu may be represented in any way, for example by a name or by an icon. In the present embodiment, the menu is displayed with a message informing the user that rewards for use in the first application can be obtained by selecting and engaging with one or more of the reward-generating applications appearing in the menu. The message also gives the user an option of declining to select a reward-generating application, and instead returning to the first application 300.

In the present embodiment, second applications that are identified in the configuration data, and therefore included in the menu displayed at step S510, may include second applications that are not yet installed on the user processing device but are available for download, and/or second applications that are already installed on the user processing device. Accordingly, the second applications being promoted can be changed by changing the configuration data. Furthermore, the promotion of a second application may be time-limited and may be ended by removing the identification of the second application from the configuration data. Similarly, the promotion of a second application can be restarted so as to promote re-engagement of the user with that second application by including the identity of the second application in the configuration data again.

At step S512, control module 320 and application menu module 340 determine whether the user has selected a reward-generating application from the displayed menu. If the user has not selected a reward-generating application, then processing returns to step S508. On the other hand, if the user has selected a reward-generating application from the menu (for example by selecting the name or the icon of a reward-generating application in the menu), then processing proceeds to step S514, at which control module 320 determines whether the selected reward-generating application is already installed on the user processing device. If it is determined that the selected reward-generating application is already installed on the user-processing device, then processing proceeds to step S528, which will be described later. On the other hand, if it is determined that the selected reward-generating application is not installed on the user processing device, then processing proceeds to step S516. It should be noted that, with some operating systems such as Windows, it may not be possible for control module 320 to determine at step S514 whether the selected reward-generating application is already installed on the user processing device. In such a case, control module 320 may pass data defining the selected reward-generating application to the operating system and the operating system may then determine whether the selected reward-generating application is already installed on the user processing device and inform control module 320 of the result. Alternatively, if the operating system determines that the selected reward-generating application is not installed on the user processing device, it may download and install it, and then inform control module 320 that the selected reward-generating application. In that case, control module 320 would always receive a positive result at step S514 (unless a download and install by the operating system was unsuccessful) and so processing would then proceed to step S528 (described below).

At step S516, installation module 350 sends a request to a backend server 120 requesting a download/install link for downloading the selected reward-generating application from an application download server 130. In this embodiment, the request sent by installation module 350 comprises a unique device identifier that uniquely identifies the user processing device (for example if the user processing device is a smartphone, the unique device ID may be the smartphone's IMEI number, or the Identifier for Advertisers (IDFA or IFA) on iOS devices, or the "Advertising ID" on Android devices), a first identifier identifying the first application 300, and a second identifier identifying the selected reward-generating application.

At step S518, the backend server 120 receives the request from the first application 300 and creates a record in a database, the record associating the second identifier identifying the selected reward-generating application with the unique identifier of the user processing device and the identifier of the first application 300. Such a record is created for each user processing device that connects to backend server 120 and enables the backend server 120 to track the number and identities of reward-generating applications that are selected by each user. This enables the success of a promotion campaign promoting reward-generating applications to be assessed.

At step S520, the backend server 120 transmits the requested resource locator in a form of a download/install link (such as a URL) that allows a browser in the user processing device (for example the iTunes app on an iOS device) to locate and download the reward-generating application selected by the user.

At step S522, installation module 350 receives the download/install link from the backend server 120 and, at step S524, sends the received download/install link to a browser or a different application in the user processing device. In the present embodiment, the browser or different application then downloads the selected reward-generating application from an application download server 130 using the received download/install link, and installs the reward-generating application on the user processing device. It should be noted, however, that the user may choose to open the user processing device's application browser or different application and find the selected reward-generating application by himself/herself, without using the resource locator, and then download and install the selected reward-generating application.

Following the processing at step S524, processing proceeds to step S528. In addition, as noted above, processing also proceeds to step S528 when it is determined at step S514 that the user has selected from the menu displayed at step S510 a reward-generating application that is already installed on the user processing device.

At step S528, reward-generating-application determining module 406 determines a reward-generating application to be monitored. In this embodiment, reward-generating application determining module 406 determines a reward-generating application to be monitored by determining which reward-generating application was selected by the user from the menu displayed at step S510.

At step S530, monitoring module 360 determines a measure of an engagement of the determined reward-generating application by the user.

Figure 6:
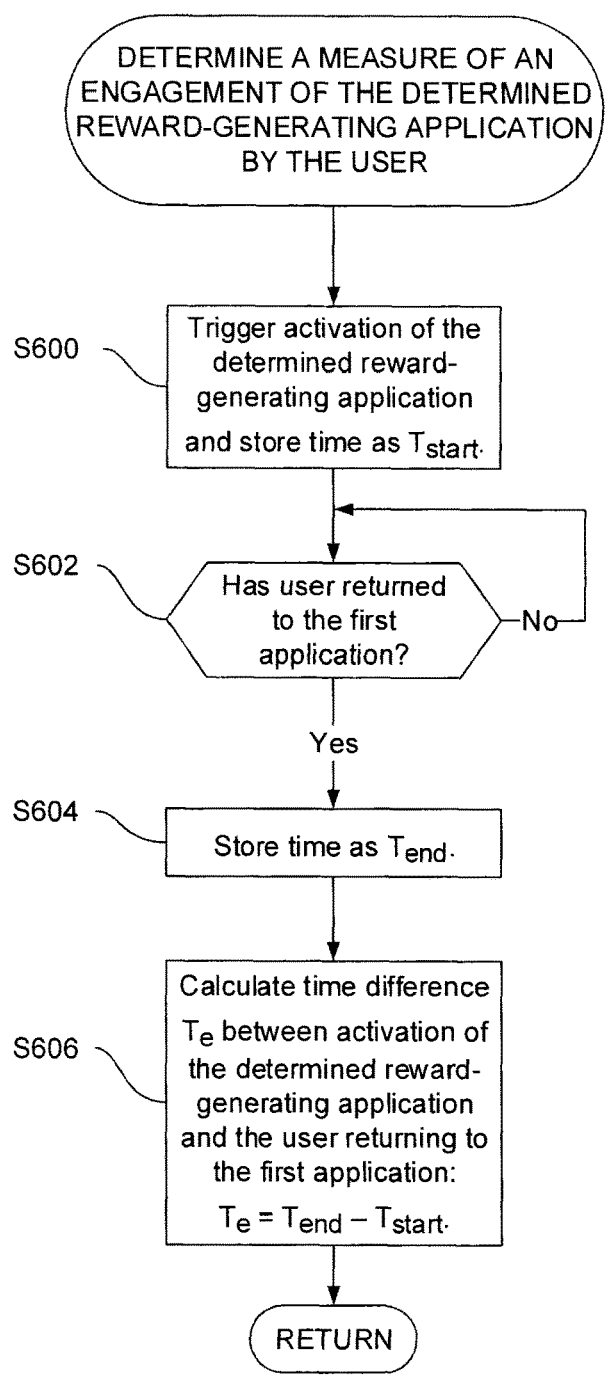
FIG. 6 shows processing operations performed at step S530 in FIG. 5C in the first embodiment.

FIG. 6 shows the processing operations by monitoring module 360 at step S530.

Referring to FIG. 6, at step S600, reward-generating-application trigger module 410 triggers activation of the determined reward-generating application (this being the reward-generating application selected from the menu displayed at step S510 in this embodiment) and stores the time of the activation as a start time $T_{start}$. Activation of the determined reward-generating application can be effected, for example, by the reward-generating-application trigger module 410 sending an instruction to the operating system of the user processing device to open the reward-generating application if the determined reward-generating application is closed, or to bring the reward-generating application to the foreground if it is already open but is in the background or dormant.

At step S602, return detection module 420 determines whether the user has returned to the first application 300, for example by detecting an action of the user in the first application such as a click, tap, swipe, key pad input or other form of input. Return detection module 420 repeats the processing at step S602 until it is determined that the user has returned to the first application.

When it is determined at step S602 that the user has returned to the first application, return detection module 420 stores, at step S604, the time of the user's return as an end time $T_{end}$.

At step S606, time duration calculation module 430 calculates a measure of the time during which the user may have been engaged with the determined reward-generating application. In this embodiment, time duration calculation module 430 calculates the measure of time as the time difference $T_e$ between activation of the determined reward-generating application and the user returning to the first application. By way of example, time duration calculation module 430 may calculate $T_e$ using the following equation:

$$T_e = T_{end} - T_{start}$$  Equation 1

It will, of course, be appreciated that different measures of time may be calculated by time duration calculation module 430. For example, time duration calculation module 430 could adjust the value of $T_{start}$ by subtracting a predetermined amount of time typical of time taken for an application to start and be available for a user to use after it has been selected.

Referring again to FIG. 5C, at step S532, reward generating module 370 of application 300 calculates one or more rewards in dependence upon the determined measure of engagement. More particularly, in this embodiment, reward generating module 370 reads the conversion data from the configuration data stored at step S506 defining how a measure of engagement of the user with the reward-generating application is to be converted into one or more rewards in the first application, and applies the conversion to the measure of engagement determined at step S530. As noted previously, the conversion data may define a simple threshold for the measure of engagement, below which no reward is earned, and define what reward is to be made available if the measure of engagement is above the threshold. Alternatively, the conversion data may define a more complex algorithm giving varying values, types, and/or numbers of reward(s) for different measures of engagement of the user with the second application. The conversion data may impose a maximum for the reward(s) that can be earned regardless of how long the user engages with the reward-generating application.

After calculating one or more rewards at step S532, reward generating module 370 stores a record of the reward (s) at step S534. Optionally, data defining the generated reward(s) may be transmitted by the user processing device to a backend server 120 when the user processing device is able to establish a communication link with network 140 (which would enable the backend server 120 to track the number of rewards earned through the use of different promoted applications).

At step S536, application implementation module 310 runs the first application making available the reward(s) to the user and informing the user of the reward(s) that is available for utilisation in the first application.

Second Embodiment

Figure 7:
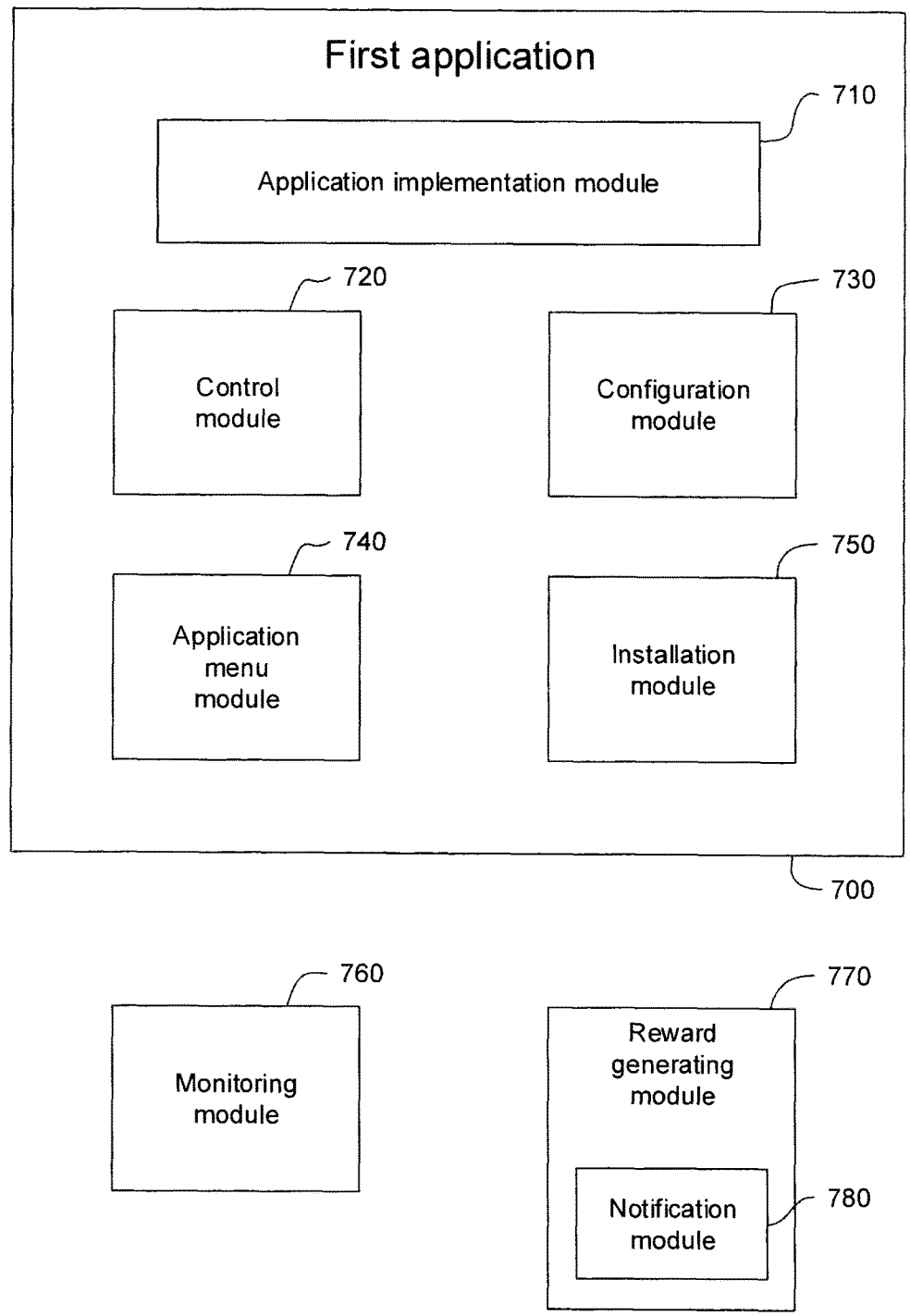
FIG. 7 schematically illustrates functional processing modules of a first application, as well as functional processing modules comprising a monitoring module and a reward generating module, in the second to eighth embodiments.

FIG. 7 schematically illustrates the functional processing modules of a first application in a second embodiment, as well as functional processing modules comprising a monitoring module and a reward generating module.

Referring to FIG. 7, a first application 700 comprises an application implementation module 710, a control module 720, a configuration module 730, an application menu module 740 and an installation module 750. These modules have the same configuration, and perform the same processing operations, as the application implementation module 310, control module 320, configuration module 330, application menu module 340 and installation module 350, respectively, in the first embodiment and accordingly will not be described again here.

A monitoring module 760 and a reward generating module 770 are also provided in the second embodiment. However, the monitoring module 760 and the reward generating module 770 need not be part of the first application 700. Instead, each of the monitoring module 760 and the reward generating module 770 can be part of the first application, part of the operating system of the user processing device 102, 104, 106, 108, 110 or a separate module on the user processing device 102, 104, 106, 108, 110.

As will be explained below, monitoring module 760 in the second embodiment is operable to determine a measure of an engagement of a reward-generating application by a user by performing processing operations to determine a length of a session spent in the reward-generating application by the user.

Figure 8:
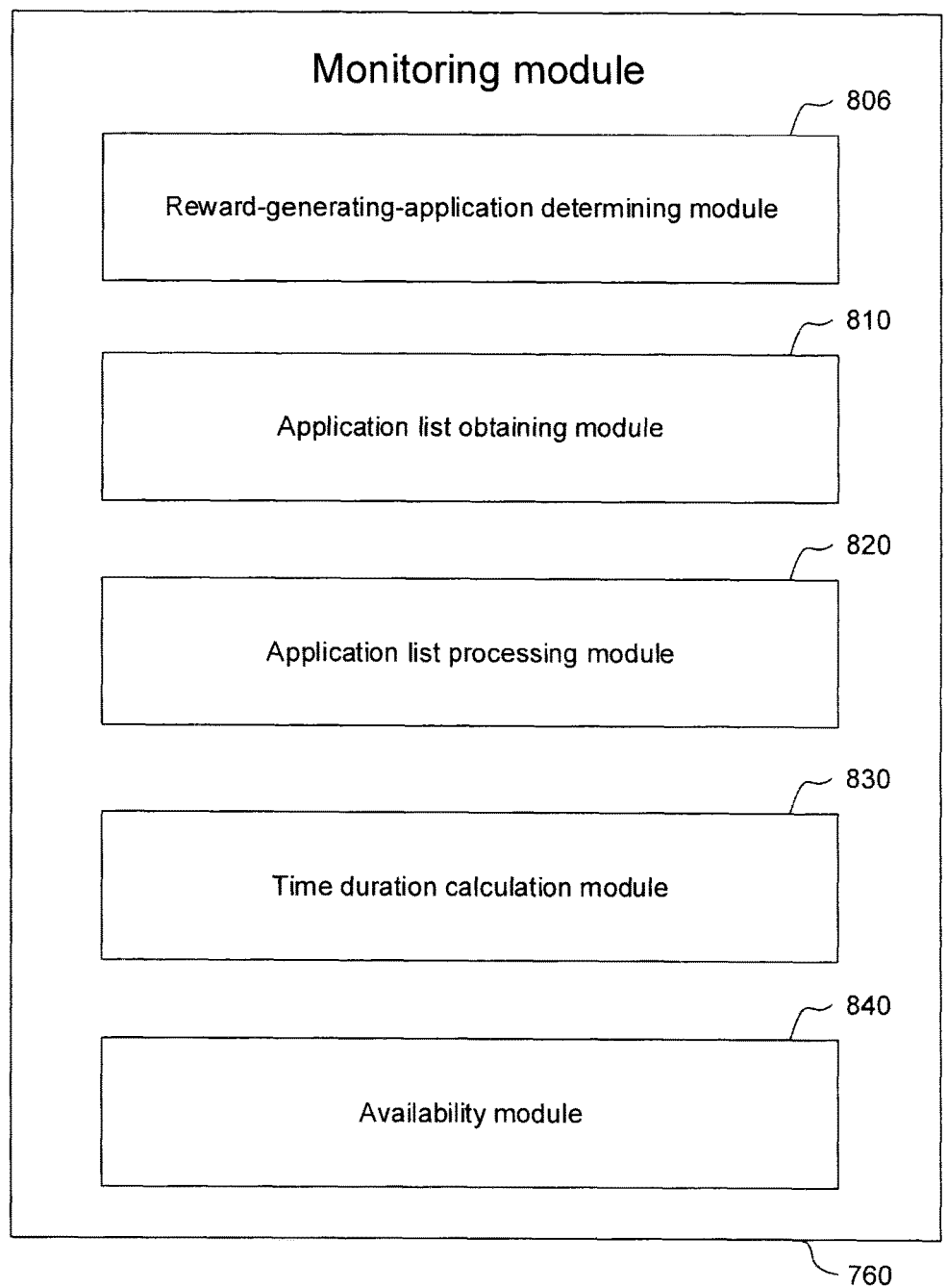
FIG. 8 schematically illustrates functional processing modules of a monitoring module in the second embodiment.

FIG. 8 schematically illustrates functional processing modules of monitoring module 760 in the second embodiment.

Referring to FIG. 8, monitoring module 760 comprises a reward-generating-application determining module 806, an application list obtaining module 810, an application list processing module 820, a time duration calculation module 830, and an availability module 840.

Reward-generating-application determining module 806 is operable to determine which reward-generating application(s) is to be monitored.

Application list obtaining module 810 is operable to obtain a list of applications running on the user processing device, sorted by time of last engagement by the user. Application list obtaining module 810 may obtain the list in any of a number of different ways. By way of example, application list obtaining module 810 may obtain the list by receiving data defining the list from the operating system of the user processing device. Alternatively, application list obtaining module 810 may obtain the list by reading data defining the list from a memory into which the data was written by the operating system of the user processing device. As a further alternative, application list obtaining module 810 may obtain data from the operating system (either by the operating system transmitting the data to the application list obtaining module 810 or by the application list obtaining module 810 reading the data from memory into which the data was written by the operating system) defining currently open applications as well as the time of last engagement of each currently running application by the user, and application list obtaining module may then sort the applications itself in accordance with the time of last engagement to obtain a sorted list. It should be noted that the list may be a list of only one application. This could occur, for example, if only one application is running on the user processing device or if the operating system provides data to the application list obtaining module defining only the application that was last used by the user (this data being provided either by sending the data to the application list obtaining module or by writing it to memory from which it can be read by the application list obtaining module).

Application list processing module 820 is operable to process a list obtained by the application list obtaining module 810 to determine whether the application last used by the user is a reward-generating application to be monitored by monitoring module 760. Application list processing module 820 is further operable to store a time at which the application last used by the user is first determined to be a reward-generating application to be monitored and a time at which the application last used by the user is determined to be no longer that reward-generating application.

Time duration calculation module 830 is operable to determine a measure of engagement of a reward-generating application by the user by calculating a measure of time between a first time at which the application last used by the user is determined to be a reward-generating application and a time at which the application last used by the user is determined to be no longer the reward-generating application.

Availability module 840 is operable to make data available to reward generating module 770 defining the measure of engagement determined by time duration calculation module 830.

Referring again to FIG. 7, reward generating module 770 includes a notification module 780. Notification module 780 is operable to trigger a notification to the user that one or more rewards have been earned for use in the first application. The notification may link to the first application so that the user can return to the first application. The notification may link to the first application using any mechanism that returns the user to the first application. For example, the notification may provide a visible link, the selection of which returns the user to the first application. Alternatively, opening or selecting the notification itself may return the user to the first application using a hidden link within the notification.

The processing operations performed by the functional processing modules of the second embodiment will now be described with reference to FIGS. 9A, 9B, 10, 11 and 12.

Figure 9A:
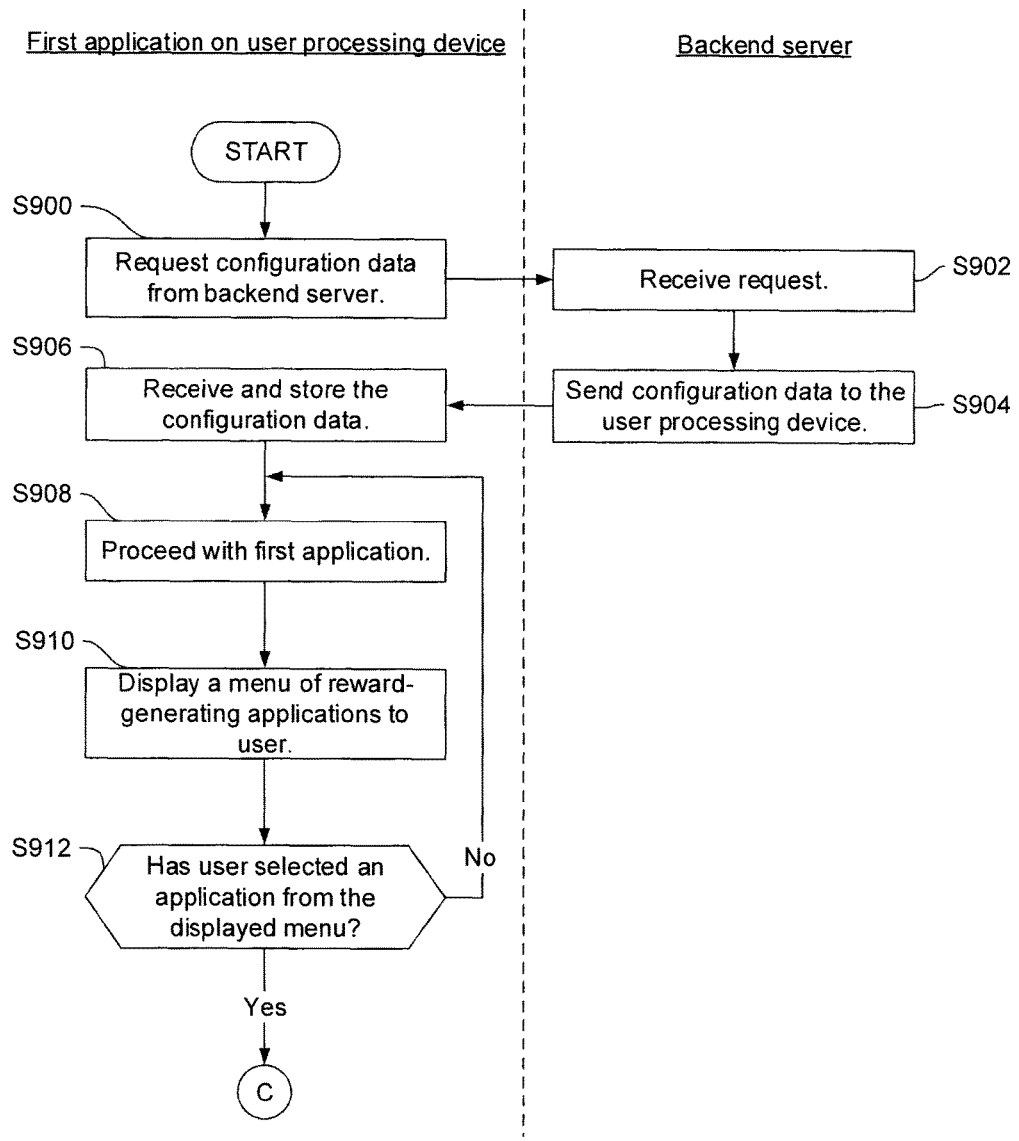
FIGS. 9A and 9B show processing operations performed by functional processing modules in the second to eighth embodiments.
Figure 9B:
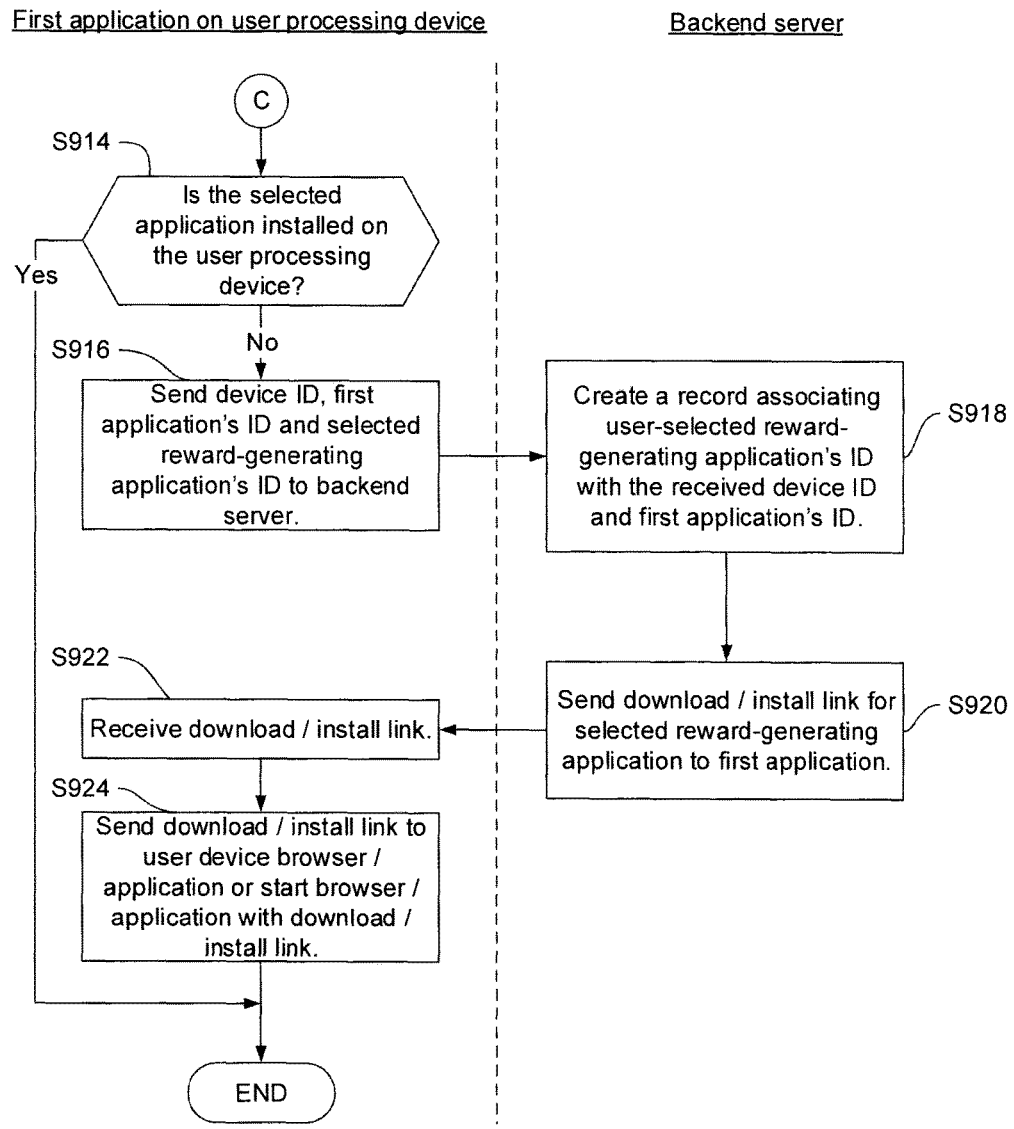

FIGS. 9A and 9B show the processing operations performed by the functional processing modules of first application 700 in conjunction with a backend server 120. These processing operations at steps S900, S902, S904, S906, S908, S910, S912, S914, S916, S918, S920, S922, and S924 are the same as corresponding steps performed in the first embodiment, which were described above with reference to FIGS. 5A and 5B. Accordingly, the processing operations will not be described again here.

Figure 10:
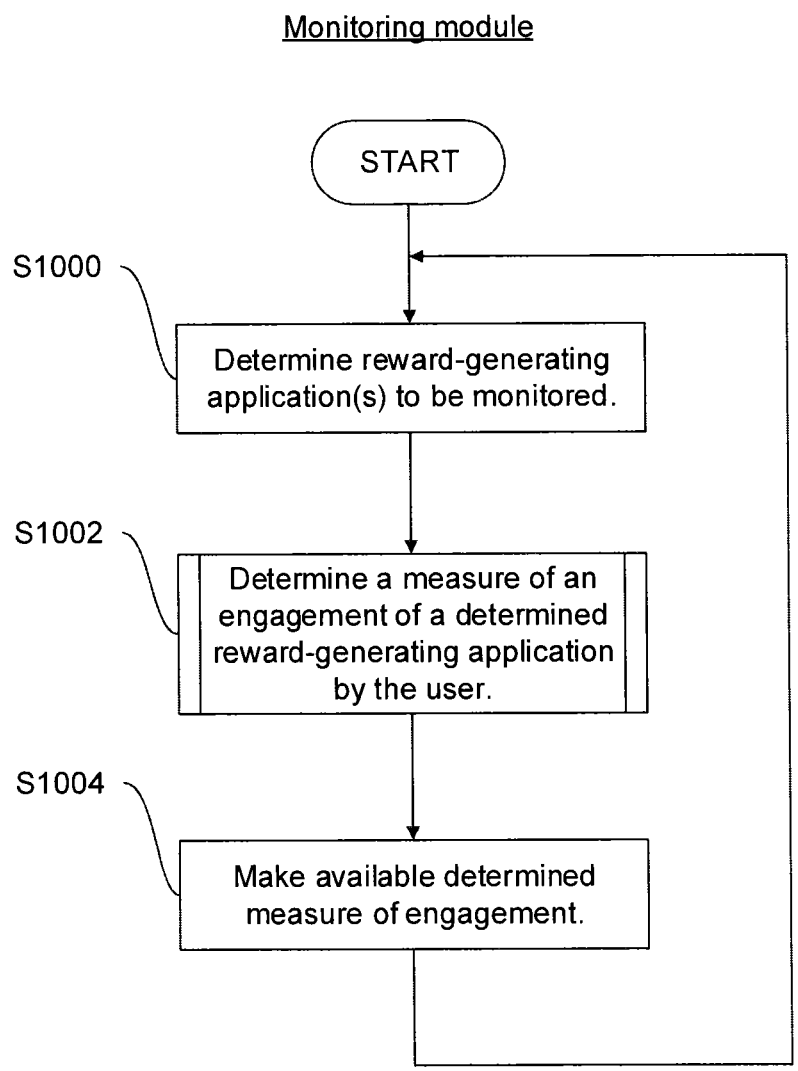
FIG. 10 shows processing operations performed by a monitoring module in the second to eighth embodiments.

FIG. 10 shows the processing operations performed by monitoring module 760. Monitoring module 760 may run continuously in the background on the user processing device to perform the processing operations shown in FIG. 10. Accordingly, monitoring module 760 determines a measure of an engagement of each reward-generating application by the user whether the reward-generating application is opened by selecting it from the menu displayed at step S910 by the first application 700, by opening it directly from the user processing device's home screen, desktop, or by opening it in any other way (for example by opening it using a third application).

Referring to FIG. 10, at step S1000, reward-generating-application determining module 806 determines the reward-generating application(s) to be monitored. In this embodiment, reward-generating-application determining module 806 determines the reward-generating application(s) to be monitored from the configuration data received at step S906 defining the reward-generating applications that are currently being promoted. This configuration data may be read by monitoring module 760 from a memory into which it was written by configuration module 730 of first application 700 or the configuration data may be transmitted to monitoring module 760 by configuration module 730. It should be noted that the monitoring performed by monitoring module 760 is not, therefore, limited to monitoring of a single reward-generating application but can encompass multiple reward-generating applications.

At step S1002 monitoring module 760 determines a measure of an engagement of a determined reward-generating application by the user. The processing at step S1002 is performed for each reward-generating application determined to be an application to be monitored at step S1000.

Figure 11:
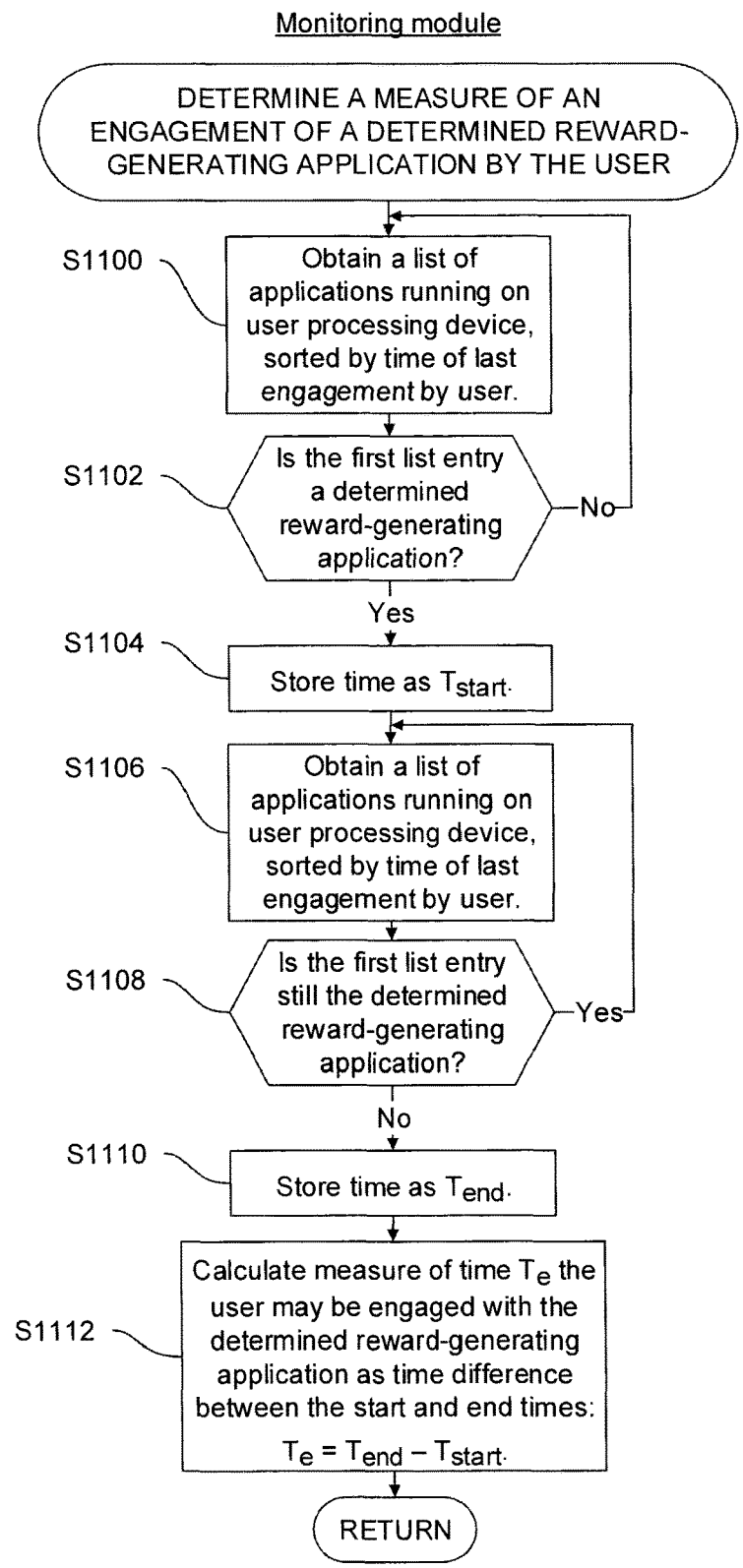
FIG. 11 shows processing operations performed at step S1002 in the second embodiment.

FIG. 11 shows the processing operations performed at step S1002 in the second embodiment.

Referring to FIG. 11, at step S1100, application list obtaining module 810 obtains a list of applications running on the user processing device, sorted by time of last engagement by the user. In this embodiment, application list obtaining module 810 obtains the sorted list by reading data defining the sorted list from memory into which the data was written by the operating system of the user processing device. This reading of data from memory to obtain the sorted list may occur at a predetermined frequency with a time $T_f$ between each reading. However, as noted previously, application list obtaining module 810 may obtain the list in different ways.

At step S1102, application list processing module 820 determines whether the first entry on the list obtained at step S1100 is a determined reward-generating application. The processing at steps S1100 and S1102 is performed at regular intervals so as to determine the time at which a determined reward-generating application first becomes the first entry on the list, indicating that the reward-generating application is now being engaged by the user.

When it is determined at step S1102 that a determined reward-generating application has become the first entry on the list, processing proceeds to step S1104, at which application list processing module 820 stores the current time as a start time $T_{start}$.

At step S1106, application list obtaining module 810 again obtains a list of applications running on the user processing device, sorted by time of last engagement by the user. In this embodiment, application list obtaining module 810 obtains the list at step S1106 by reading data defining the sorted list from memory, into which it was written by the operating system of the user processing device. This reading of data from memory to obtain the sorted list may occur at a predetermined frequency with a time $T_f$ between each reading. However, as noted previously, application list obtaining module 810 may obtain the list in different ways.

At step S1108, application list processing module 820 processes the list obtained at step S1106 to determine whether the first entry on the list is still the determined reward-generating application. Steps S1106 and S1108 are repeatedly performed (for example at regular intervals) so as to determine the time at which a different application becomes the first entry on the sorted list, indicating that the user is now engaging with a different application, rather than the determined reward-generating application.

When it is determined at step S1108 that the determined reward-generating application is no longer the first entry on the sorted list, processing proceeds to step S1110, at which application list processing module 820 stores the current time as an end time $T_{end}$.

At step S1112, time duration calculation module 830 calculates a measure of time indicative of the time that the user may have been engaged with the determined reward-generating application. In this embodiment, time duration calculation module 830 calculates the measure of time, $T_e$, using the following equation:

$$T_e = T_{end} - T_{start} \qquad \text{Equation 2}$$

Time duration calculation module 830 could use other equations to calculate the measure of time $T_e$ at step S1112. For example, time duration calculation module 830 may include an error factor in its calculation:

$$T_e = T_{end} - T_{start} + T_{error} \qquad \text{Equation 3}$$

where $T_{error}$ is an error factor that is added to take account of margins of error. For example, $T_{error}$ may be set to a predetermined time value indicative of the time resolution for obtaining the sorted lists at steps S1100 and S1106. Thus, by way of example, $T_{error}$ may be set to $T_f$, which is the time between each reading of list data by application list obtaining module 810 at steps S1100 and S1106.

Referring again to FIG. 10, after processing has been performed at step S1002 to determine the measure of engagement of the user with the determined reward-generating application, processing proceeds to step S1004, at which availability module 840 makes the determined measure of engagement available to reward generating module 770. In this embodiment, availability module 840 makes the determined measure of engagement available by storing data defining the determined measure of engagement in memory that can also be accessed by reward generating module 770 to read the stored data. However, availability module 840 could make the determined measure of engagement available in different ways, for example by transmitting data defining the determined measure of engagement to reward generating module 770.

Figure 12:
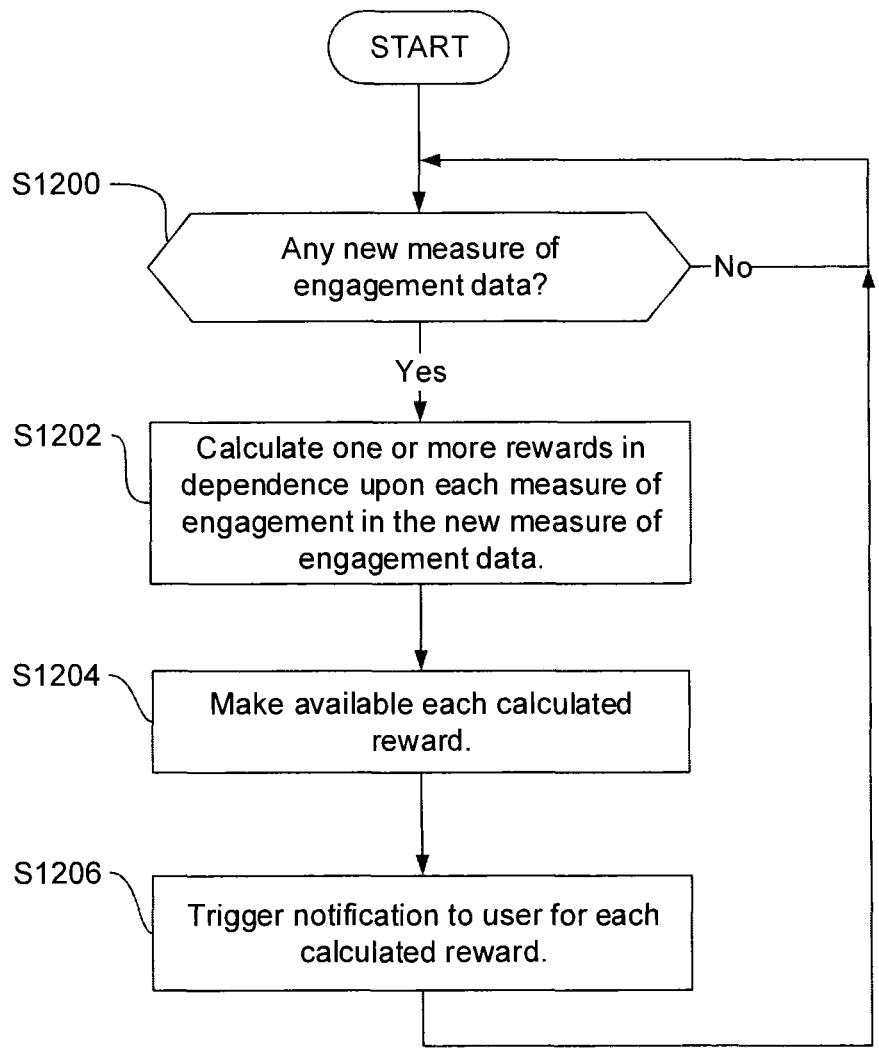
FIG. 12 shows processing operations performed by a reward generating module in the second to eighth embodiments.

Referring now to FIG. 12, the processing operations performed by reward generating module 770 will be described. These processing operations may be repeatedly performed by reward generating module 770 which may run continuously in the background on the user processing device.

At step S1200, reward generating module 770 determines whether any new measure of engagement data has been made available by monitoring module 760. In this embodiment, reward generating module 770 checks whether any new measure of engagement data is available by reading data from the memory in which availability module 840 of monitoring module 760 stores data defining a measure of engagement at step S1004. The processing at step S1200 is repeated at regular intervals until reward generating module 770 determines that new measure of engagement data is available.

When it is determined at step S1200 that new measure of engagement data is available, processing proceeds to step S1202, at which reward generating module 770 calculates one or more rewards in dependence upon each measure of engagement in the new measure of engagement data. In this embodiment, reward generating module 770 calculates the reward(s) in dependence upon the conversion data in the configuration data received from backend server 120 at step S906 (this conversion data defining, as explained in the first embodiment, a conversion between a measure of the engagement of the user with a reward-generating application and the reward(s) to be provided in the first application).

At step S1204, reward generating module 770 makes available each calculated reward to the first application 700. In this embodiment, reward generating module 770 makes available each calculated reward by storing data defining the reward in memory that can be accessed by first application 700 to read the data. However, reward generating module 770 could make available each reward in a different way, for example by transmitting data defining each reward to the first application 700.

At step S1206, notification module 780 triggers a notification to the user informing the user of the reward(s) that are available for utilisation in the first application 700. In this embodiment, notification module 780 interfaces with the operating system of the user processing device to send a notification which includes a link to the first application 700. In this way, by selecting the link in the notification, the user is returned to the first application so that he/she can enjoy the benefits of the reward(s) therein.

Third Embodiment

The components of the third embodiment and the processing operations performed thereby are the same as those in the second embodiment, with the exception of the components of monitoring module 760 and the processing operations performed by monitoring module 760 at step S1002. Accordingly, only these differences will be described here.

As will be explained below, monitoring module 760 in the third embodiment is operable to determine a measure of an engagement of a reward-generating application by a user by performing processing operations to determine a length of a session spent in the reward-generating application by the user. The processing operations performed by monitoring module 760 to determine a session length are different from the processing operations performed in the second embodiment.

Figure 13:
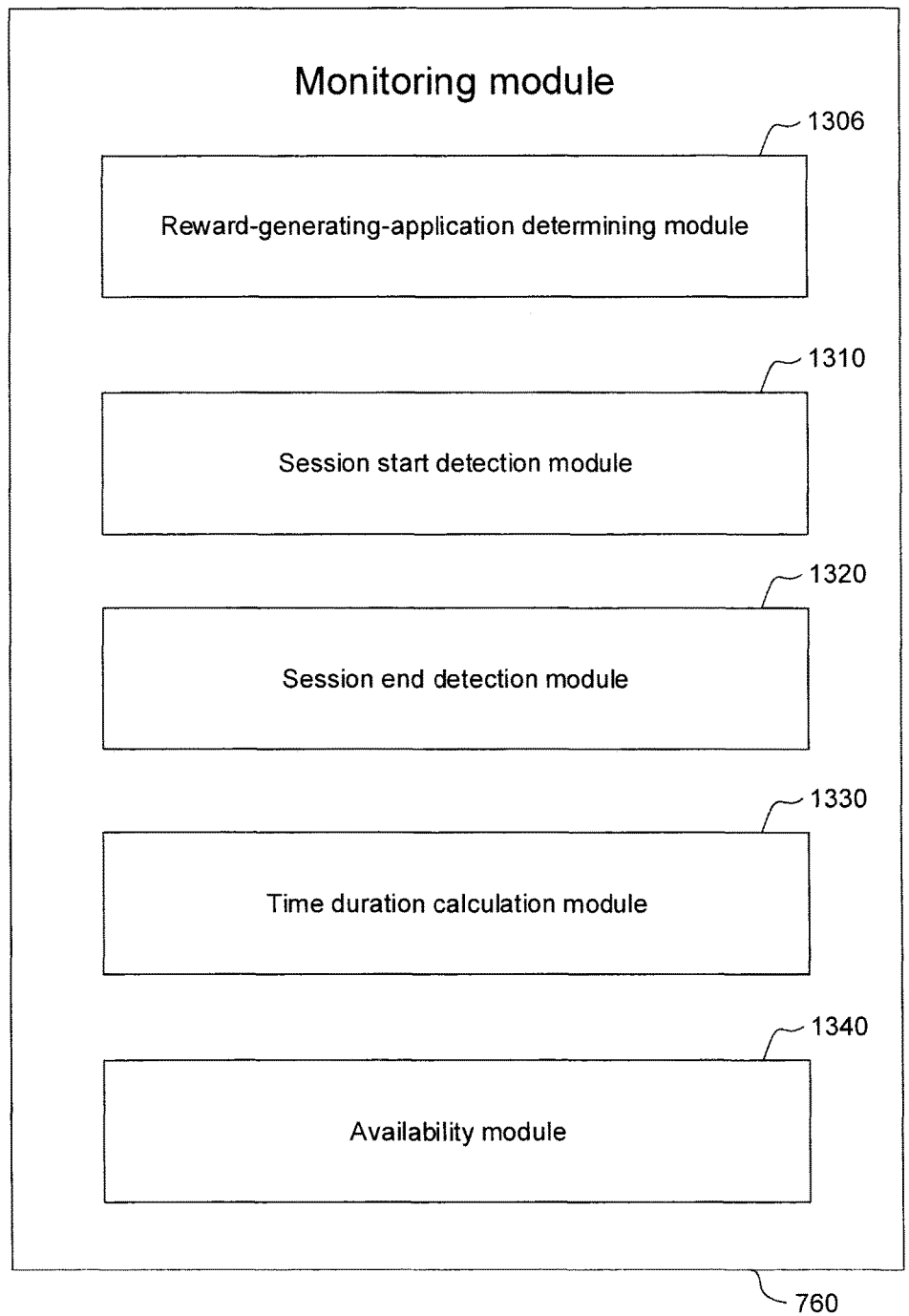
FIG. 13 schematically illustrates functional processing modules of a monitoring module in the third embodiment.

FIG. 13 schematically illustrates the functional processing modules of monitoring module 760 in the third embodiment.

Referring to FIG. 13, monitoring module 760 comprises a reward-generating-application determining module 1306, a session start detection module 1310, a session end detection module 1320, a time duration calculation module 1330 and an availability module 1340.

Reward-generating-application determining module 1306 is operable to perform the same processing as reward-generating-application determining module 806 in the second embodiment, and is therefore operable to determine at step S1000 the reward-generating application(s) to be monitored.

Session start detection module 1310 is operable to detect a start of a session by the user in a determined reward-generating application, and to store a time indicative of the time at which the session started. Session start detection module 1310 may detect a start of a session in a reward-generating application in any of a number of different ways. By way of example, session start detection module 1310 may detect a start of a session by receiving a notification of the session start from the operating system of the user processing device. Alternatively, session start detection module 1310 may detect a session start by reading data indicative of the session start from a memory, into which the data was written by the operating system of the user processing device.

Session end detection module 1320 is operable to detect an end of a session by the user in the determined reward-generating application, and to store a time indicative of the time at which the session ended. Session end detection module 1320 may detect an end of a session in a reward-generating application in any of a number of different ways. By way of example, session end detection module 1320 may detect an end of a session by receiving a notification of the session end from the operating system of the user processing device. Alternatively, session end detection module 1320 may detect a session end by reading data indicative of the session end from a memory, into which the data was written by the operating system of the user processing device.

Time duration calculation module 1330 is operable to determine a measure of an engagement of a determined reward-generating application by the user by calculating a measure of time between the start of the session and the end of the session.

Availability module 1340 is operable to perform the same processing operations as availability module 840 in the second embodiment, and is therefore operable to make available each determined measure of engagement at step S1004.

Figure 14:
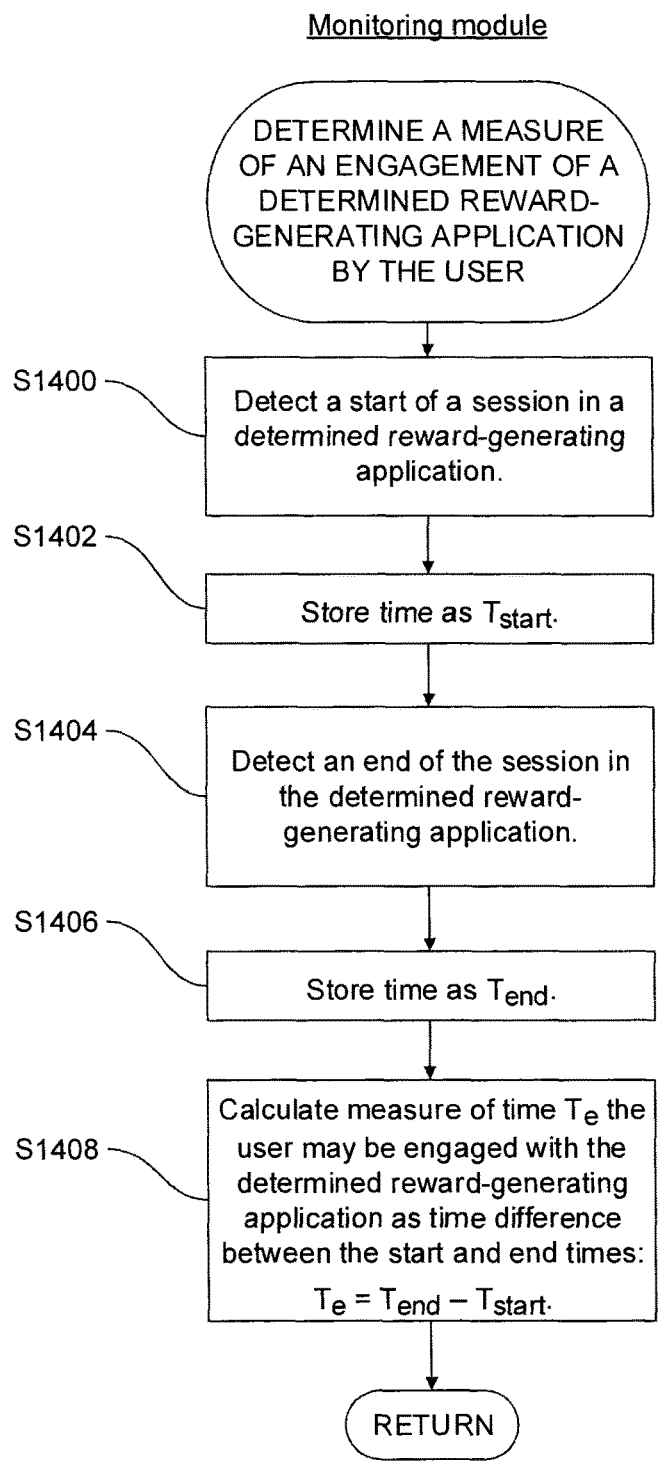
FIG. 14 shows processing operations performed by a monitoring module at step S1002 in the third embodiment.

FIG. 14 shows the processing operations performed by the components of monitoring module 760 at step S1002 in the third embodiment.

Referring to FIG. 14, at step S1400, session start detection module 1310 detects the start of a session by the user in a determined reward-generating application. In this embodiment, session start detection module 1310 detects the start of the session by receiving a notification from the operating system of the user processing device, which detects, for example, when the user starts using an application and sends a notification to session start detection module 1310. However, as noted above, session start detection module 1310 may detect a session start in different ways, for example by reading data indicative of a session start from memory, into which the data was written by the operating system of the user processing device.

When a start of a session is detected at step S1400, processing proceeds to step S1402, at which session start detection module 1310 stores the current time as a session start time $T_{start}$.

At step S1404, session end detection module 1320 detects the end of the session in the determined reward-generating application. In this embodiment, session end detection module 1320 detects the end of the session by receiving a notification from the operating system of the user processing device, which, for example, detects when a user ends a session in an application and sends a notification to session end detection module 1320. However, as noted above, session end detection module 1320 may detect a session end by reading data defining a session end from memory, into which the data was written by the operating system of the user processing device.

It should be noted that the notifications received at step S1400 and S1404 may be generic (rather than specifically identifying a session start and a session end, respectively) with the session start detection module 1310 and session end detection module 1320 operating as a latch to determine that a first notification is a session start notification, a second notification is a session end notification, a third notification is a session start notification, a fourth notification is a session end notification, etc.

Upon detection at step S1404 of the end of the session in the determined reward-generating application, processing proceeds to step S1406, at which session end detection module 1320 stores the current time as a session end time $T_{end}$.

At step S1408, time duration calculation module 1330 calculates a measure of an engagement of the determined reward-generating application by the user by calculating a measure of session time during which the user may be engaged with the determined reward-generating application. In this embodiment, time duration calculation module 1330 calculates a measure of time $T_e$ using the following equation:

$$T_e = T_{end} - T_{start} \qquad \text{Equation 4}$$

Time duration calculation module 1330 could use other equations to calculate the measure of time $T_e$ at step S1408. For example, time duration calculation module 1330 may include an error factor in its calculation:

$$T_e = T_{end} - T_{start} + T_{error} \qquad \text{Equation 5}$$

where $T_{error}$ is an error factor that is added to take account of margins of error. For example, if session start detection module 1310 and session end detection module 1320 detect session starts and session ends at steps S1400 and S1404, respectively, by reading data from a memory to see if the operating system of the user processing device has stored data indicative of a session start or session end, then $T_{error}$ may be set to a predetermined time value indicative of the frequency at which the memory is read at steps S1400 and S1404. Thus, by way of example, if the time interval between each memory read at steps S1400 and S1404 is $T_f$, then $T_{error}$ may be set to $T_f$.

Fourth Embodiment

The components of the fourth embodiment and the processing operations performed thereby are the same as those in the second embodiment, with the exception of the components of monitoring module 760 and the processing operations performed by monitoring module 760 at step S1002. Accordingly, only these differences will be described here.

As will be explained below, monitoring module 760 in the fourth embodiment is operable to determine a measure of an engagement of a reward-generating application by a user by performing processing operations to determine a length of a session spent in the reward-generating application by the user. The processing operations performed by monitoring module 760 to determine a session length are different from the processing operations performed in the second embodiment and in the third embodiment.

Figure 15:
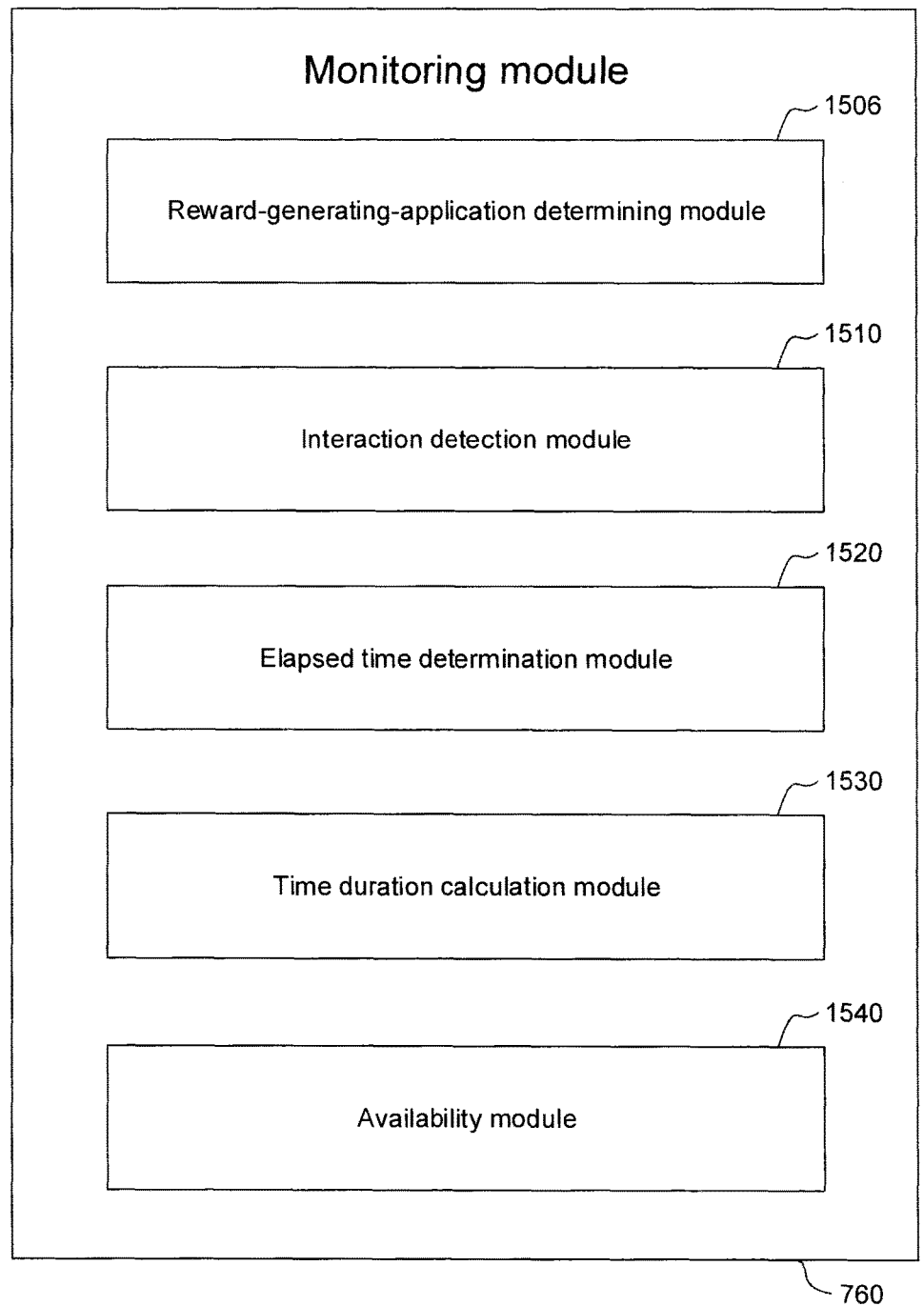
FIG. 15 schematically illustrates functional processing modules of the monitoring module in the fourth embodiment.

FIG. 15 schematically illustrates the functional processing modules of monitoring module 760 in the fourth embodiment.

Referring to FIG. 15, monitoring module 760 comprises a reward-generating-application determining module 1506, an interaction detection module 1510, an elapsed time determination module 1520, a time duration calculation module 1530 and an availability module 1540.

Reward-generating-application determining module 1506 is operable to perform the same processing as reward-generating-application determining module 806 in the second embodiment, and is therefore operable to determine at step S1000 the reward-generating application(s) to be monitored.

Interaction detection module 1510 is operable to detect user interactions in a reward-generating application, and to store a time indicative of the time of receipt of each notification. A user interaction may be any user action such as a click, tap, swipe, key pad input, in-app purchase, or any other type of user interaction. Interaction detection module 1510 may detect a user interaction in any of a number of different ways. By way of example, interaction detection module 1510 may read data indicative of a user interaction from a memory, into which the data was written by the operating system of the user processing device. By way of further example, interaction detection module 1510 may receive a notification of a user interaction sent to it by the operating system of the user processing device.

Elapsed time determination module 1520 is operable to determine whether a predetermined time has elapsed since a last user interaction in a reward generating application.

Time duration calculation module 1530 is operable to determine a measure of an engagement of a determined reward-generating application by the user by calculating a measure of time between user interactions in the reward-generating application based upon the received notifications of user interactions.

Availability module 1540 is operable to perform the same processing operations as availability module 840 in the second embodiment, and is therefore operable to make available each determined measure of engagement at step S1004.

Figure 16:
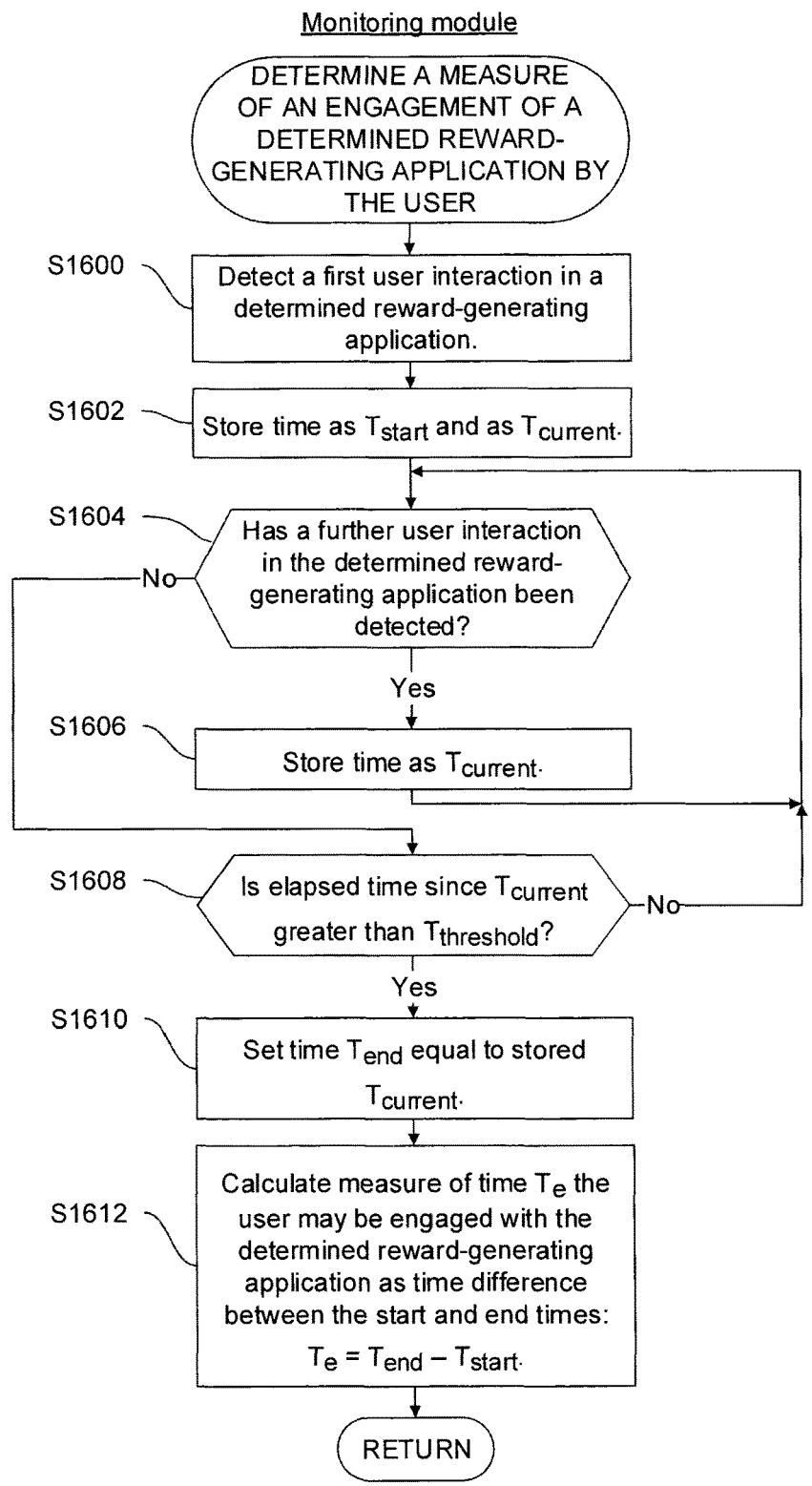
FIG. 16 shows processing operations performed by a monitoring module at step S1002 in the fourth embodiment.

FIG. 16 shows the processing operations performed by the components of monitoring module 760 at step S1002 in the fourth embodiment.

Referring to FIG. 16, at step S1600, interaction detection module 1510 detects a first user interaction in a determined reward-generating application. As noted above, a user interaction may comprise any user interaction, such as a click, tap, swipe, key pad input, in-app purchase, etc. In this embodiment, interaction detection module 1510 detects the first user interaction by reading data indicative of a user interaction from memory, into which the data was written by the operating system of the user processing device. This reading of data from memory to check for data indicative of a first user interaction may be performed at a predetermined frequency, with a time $T_f$ between each reading. However, as noted previously, interaction detection module 1510 may detect user interactions in different ways, for example by receiving notifications of user interactions sent by the operating system of the user processing device.

Upon detection of the first user interaction at step S1600, processing proceeds to step S1602, at which interaction detection module 1510 stores a time indicating the time of detection as a start time $T_{start}$ and also as a time $T_{current}$. The stored start time $T_{start}$ is therefore indicative of a time at which a user session in the determine reward-generating application started.

At step S1604, interaction detection module 1510 checks whether a further user interaction has been detected in the determined reward-generating application. Again, the user interaction may be any user interaction, such as a click, tap, swipe, key pad input, in-app purchase, etc. and, in this embodiment, interaction detection module 1510 detects a user interaction by reading data defining a user interaction from a memory, into which the data was written by the operating system of the user processing device, although detection could be performed in other ways, as described above.

When it is determined at step S1604 that a further user interaction has been detected, processing proceeds to step S1606, at which interaction detection module 1510 stores a time indicative of the time of the detection as time $T_{current}$ (thereby changing the time $T_{current}$ previously stored at step S1602).

On the other hand, when it is determined at step S1604 that no a further user interaction has been detected, then processing proceeds to step S1608, at which elapsed time determination module 1520 determines whether the time that has elapsed since $T_{current}$ stored at step S1606 (or stored at step S1602 if step S1606 has not been performed) is greater than a threshold time $T_{threshold}$.

If it is determined at step S1608 that the elapsed time is not greater than $T_{threshold}$, then processing returns to step S1604. Accordingly, the processing operations at steps S1604, S1606 and S1608 are repeated until no user interaction in the determined reward-generating application is detected for a period of time greater than $T_{threshold}$.

When it is determined at step S1608 that the elapsed time since the last user interaction is greater than $T_{threshold}$, processing proceeds to step S1610, at which a time $T_{end}$, indicative of the time at which the user's session in the determined reward-generating application ended, is set equal to $T_{current}$ previously stored at step S1606 (or step S1602 if step S1606 has not been performed).

At step S1612, time duration calculation module 1530 calculates a measure of an engagement of the determined reward-generating application by the user by calculating a measure of session time during which the user may have been engaged with the determined reward-generating application. In this embodiment, time duration calculation module 1530 calculates a measure of time $T_e$ using the following equation, $$T_e = T_{end} - T_{start} \qquad \text{Equation 6}$$

Time duration calculation module 1530 could use other equations to calculate the measure of time $T_e$ at step S1612. For example, time duration calculation module 1530 may include an error factor in its calculation:

$$T_e = T_{end} - T_{start} + T_{error} \qquad \text{Equation 7}$$

where $T_{error}$ is an error factor that is added to take account of margins for error. For example, $T_{error}$ may be set to a predetermined time value indicative of the resolution of the memory read operations performed at steps S1600 and S1604 by interaction detection module 1510. Thus, by way of example, $T_{error}$ may be set to $T_f$, which is the time between each reading of data by interaction detection module 1510 at steps S1600 and S1604.

In the processing operations described above, time duration calculation module 1530 calculates the measure of time $T_e$ in response to a determination at step S1608 that the elapsed time since the last user interaction is greater than $T_{threshold}$. However, instead, time duration calculation module 1530 may calculate $T_e$ before elapsed time determination module 1520 determines whether the time since the last user interaction is greater than $T_{threshold}$. An example of such processing is shown in FIG. 17.

Figure 17:
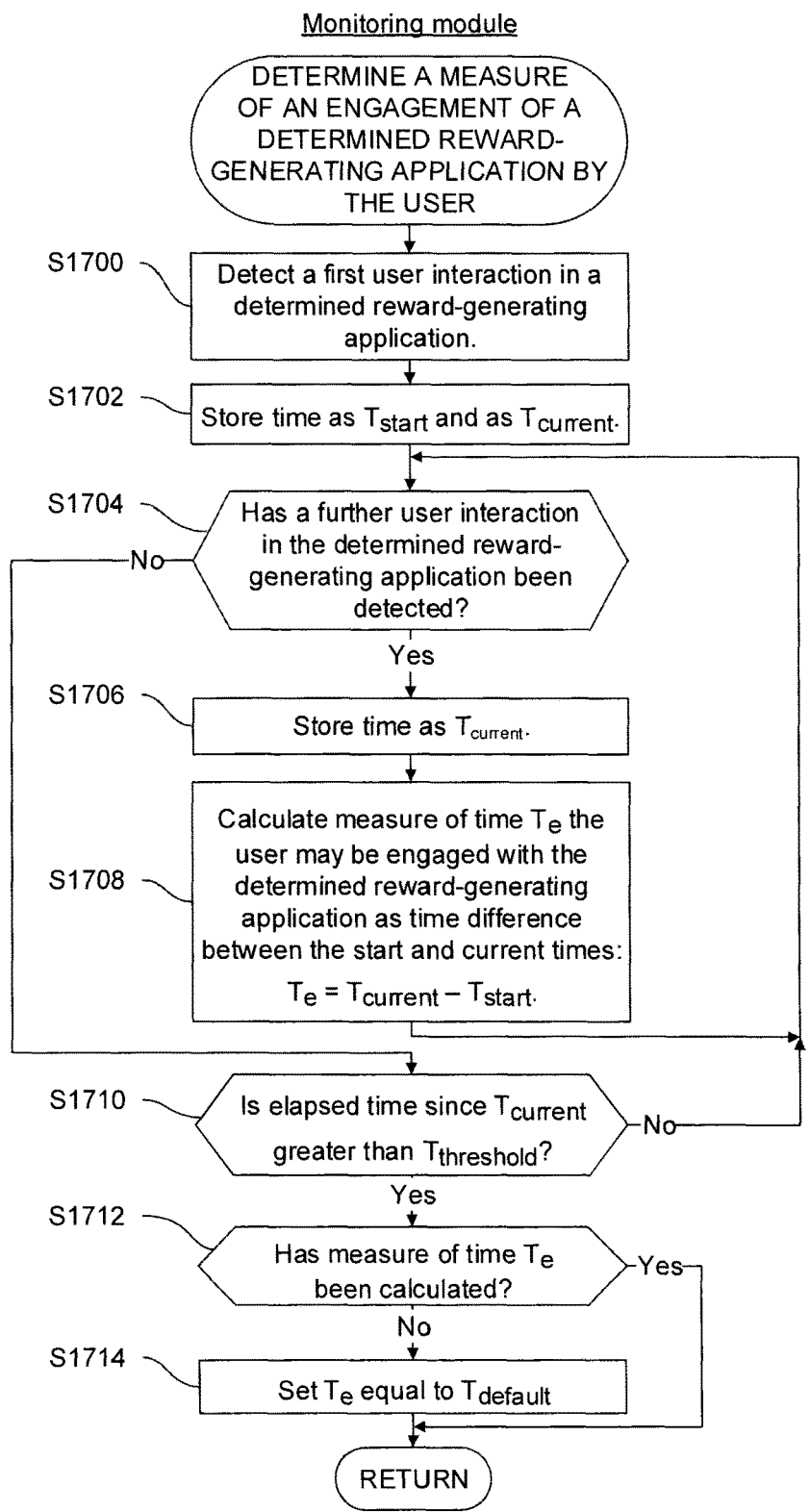
FIG. 17 shows processing operations performed by a monitoring module at step S1002 in a modification of the fourth embodiment.

Referring to FIG. 17, the processing operations steps S1700, S1702, S1704 and S1706 are the same as those in steps S1600, S1602, S1604 and S1606, respectively.

At step S1708, time duration calculation module 1530 calculates $T_e$ using the following equation:

$$T_e = T_{current} - T_{start} \quad \text{Equation 8}$$

Time duration calculation module 1530 could use other equations to calculate the measure of time $T_e$ at step S1708. For example, time duration calculation module 1530 may include an error factor in its calculation:

$$T_e = T_{end} - T_{start} + T_{error} \quad \text{Equation 9}$$

where $T_{error}$ is an error factor that is added to take account of margins for error. For example, $T_{error}$ may be set to a predetermined time value indicative of the resolution of the memory read operations performed at steps S1700 and S1704 by interaction detection module 1510. Thus, by way of example, $T_{error}$ may be set to Tf, which is the time between each reading of data by interaction detection module 1510 at steps S1700 and S1704.

Following the processing at step S1708, processing returns to step S1704.

When it is determined at step S1704 that no further user interaction has been detected, processing proceeds to step S1710, at which elapsed time determination module 1520 determines whether the elapsed time since $T_{current}$ (indicative of the time of the last user interaction in the determined reward-generating application) is greater than $T_{threshold}$.

If it is determined at step S1710 that the elapsed time is not greater than $T_{threshold}$ then processing returns to step S1704. On the other hand, when it is determined at step S1710 that the elapsed time is greater than $T_{threshold}$ then processing proceeds to step S1712 at which time duration calculation module 1530 determines whether a measure of time $T_e$ was previously calculated at step S1708 (it being possible that step S1708 was not performed if only one user interaction was detected).

If it is determined at step S1712 that no measure of time $T_e$ has been calculated, then processing proceeds to step S1714, at which time duration calculation module 1530 sets the measure of time $T_e$ equal to a predetermined default time $T_{default}$. For example, $T_{default}$ may be set to a predetermined time value that is below the threshold for the user to earn a reward. On the other hand, if it is determined at step S1712 that a measure of time $T_e$ has been calculated, then the processing at step S1712 is omitted.

Fifth Embodiment

The components of the fifth embodiment and the processing operations performed thereby are the same as those in the second embodiment, with the exception of the components of monitoring module 760 and the processing operations performed by monitoring module 760 at step S1002. Accordingly, only these differences will be described here.

In the second, third and fourth embodiments, monitoring module 760 performed processing operations to determine a measure of an engagement of a reward-generating application by a user based upon a length of a session spent in the reward-generating application by the user. As will be explained below, monitoring module 760 in the fifth embodiment is operable to determine a measure of an engagement of a reward-generating application by a user in a different way by performing processing operations to determine a length of time indicative of the time the user was actively interacting with the reward-generating application. This measure of time is different from the time of a session length, as session length also includes time when the user was not interacting with the reward-generating application, but the reward-generating application was in an active state.

Figure 18:
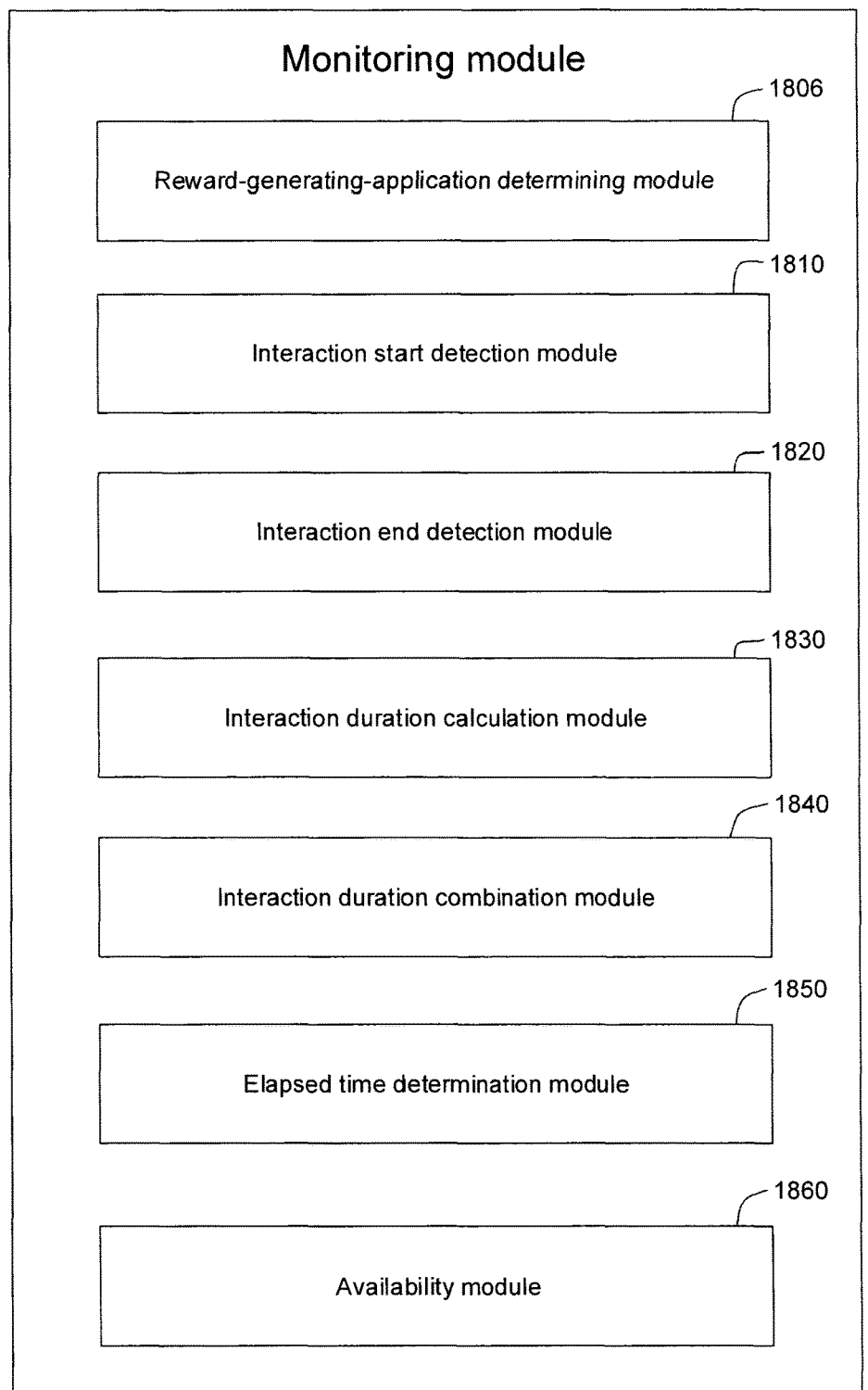
FIG. 18 schematically illustrates functional processing modules of a monitoring module in the fifth embodiment.

FIG. 18 schematically illustrates the functional processing modules of monitoring module 760 in the fifth embodiment.

Referring to FIG. 18, monitoring module 760 comprises a reward-generating-application determining module 1806, an interaction start detection module 1810, an interaction end detection module 1820, an interaction duration calculation module 1830, an interaction duration combination module 1840, an elapsed time determination module 1850 and an availability module 1860.

Reward-generating-application determining module 1806 is operable to perform the same processing as reward-generating-application determining module 806 in the second embodiment, and is therefore operable to determine at step S1000 the reward-generating application(s) to be monitored.

Interaction start detection module 1810 is operable to detect a start of a user interaction in a reward-generating application, and to store a time indicative of the time at which the user interaction started. A user interaction may comprise, for example, click, tap, swipe, key pad input, in-app purchase, or any other type of user interaction. Interaction start detection module 1810 may detect a start of a user interaction in any of a number of different ways. By way of example, interaction start detection module 1810 may detect a start of a user interaction by reading data indicative of a start of a user interaction from a memory, into which the data was written by the operating system of the user processing device. By way of further example, interaction start detection module 1810 may detect a start of a user interaction by receiving a notification indicative of a start of a user interaction start from the operating system of the user processing device.

Interaction end detection module 1820 is operable to detect the end of a user interaction in a reward-generating application, and to store a time indicative of the time at which the user interaction ended. Interaction end detection module 1820 may detect an end of a user interaction in any of a number of different ways. By way of example, interaction end detection module 1820 may detect an end of a user interaction by reading data indicative of an end of a user interaction from a memory, into which the data was written by the operating system of the user processing device. By way of further example, interaction end detection module 1820 may detect an end of a user interaction by receiving a notification indicative of an end of a user interaction sent from the operating system of the user processing device.

Interaction duration calculation module 1830 is operable to calculate a time indicative of a duration of an individual user interaction by calculating a measure of time between the start of the user interaction and the end of the user interaction.

Interaction duration combination module 1840 is operable to combine the times of individual user interactions to determine an overall measure of time for all of the user interactions.

Elapsed time determination module 1850 is operable to determine whether a predetermined time has elapsed since the time of the last user interaction in a reward-generating application.

Availability module 1860 is operable to perform the same processing operations as availability module 840 in the second embodiment, and is therefore operable to make available each determined measure of engagement at step S1004.

Figure 19:
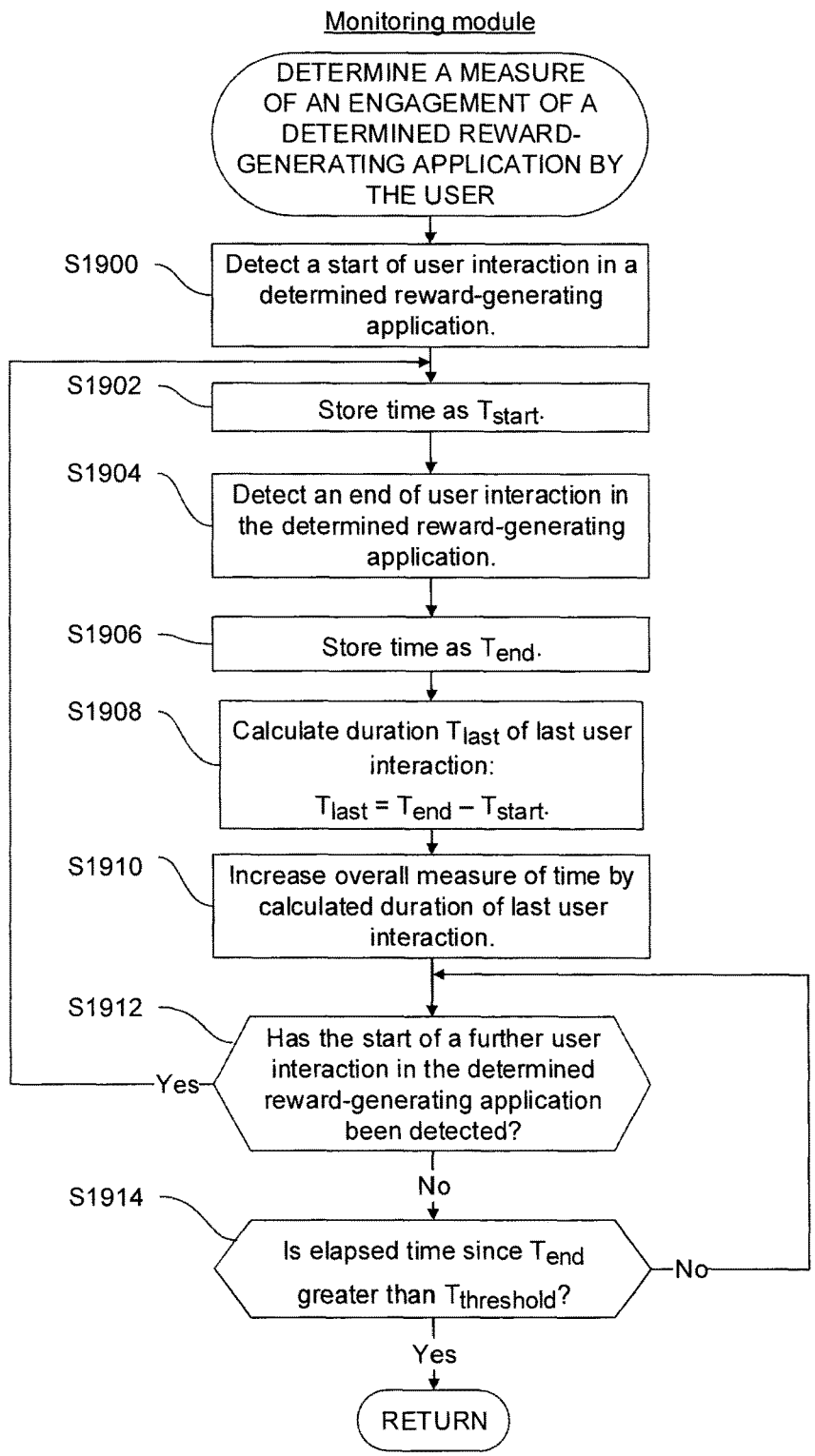
FIG. 19 shows processing operations performed by a monitoring module at step S1002 in the fifth embodiment.

FIG. 19 shows the processing operations performed by the components of monitoring module 760 at step S1002 in the fifth embodiment.

Referring to FIG. 19, at step S1900, interaction start detection module 1810 detects a start of a user interaction in a determined reward-generating application. As noted above, a user interaction may comprise any user interaction, such as a click, tap, swipe, key pad input, in-app purchase, etc. In this embodiment, interaction start detection module 1810 detects a start of a user interaction by reading data indicative of a start of a user interaction from memory, into which the data was written by the operating system of the user processing device. This reading of data from memory to check for data indicative of the start of a user interactive may occur at a predetermined frequency, with a time $T_f$ between each reading. However, as noted previously, interaction start detection module 1810 may detect a start of a user interaction in different ways.

Upon detection of a start of a user interaction at step S1900, processing proceeds to step S1902, at which interaction start detection module 1810 stores a time indicative of the detection as an interaction start time $T_{start}$.

At step S1904, interaction end detection module 1820 detects the end of the user interaction in the determined reward-generating application. In this embodiment, interaction end detection module 1820 detects the end of the user interaction by reading data indicative of the end of the user interaction from a memory, into which the data was written by the operating system of the user processing device. This reading of data from memory may occur at a predetermined frequency with a time $T_f$ between each reading.

However, as noted previously, interaction end detection module 1820 may detect the end of the user interaction in different ways.

Upon detection of the end of the user interaction at step S1904, processing proceeds to step S1906, at which interaction end detection module 1820 stores a time indicative of the time of detection as an interaction end time $T_{end}$.

At step S1908, interaction duration calculation module 1830 calculates a time indicative of the length of the last user interaction. In this embodiment, interaction duration calculation module 1830 calculates a measure of time $T_{last}$ using the following equation:

$$T_{last} = T_{end} - T_{start} \qquad \text{Equation 10}$$

Time duration calculation module 1830 could use other equations to calculate the measure of time $T_e$ at step S1908. For example, time duration calculation module 1830 may include an error factor in its calculation:

$$T_e = T_{end} - T_{start} + T_{error} \qquad \text{Equation 11}$$

where $T_{error}$ is an error factor that is added to take account of margins for error. For example, $T_{error}$ may be set to a predetermined time value indicative of the time resolution for reading the data from memory at steps S1900 and S1904. Thus, by way of example, $T_{error}$ may be set to $T_f$, which is the time between each reading of data at step S1900 by interaction start detection module 1810 and at step S1904 by interaction end detection module 1820.

At step S1910, interaction duration combination module 1840 calculates an overall measure of time for all of the detected user interactions in the determined reward-generating application. In this embodiment, interaction duration combination module 1840 stores a cumulative overall measure of time and increases the measure by $T_{last}$ calculated at step S1908. Thus, the first time step S1910 is performed, interaction duration combination module 1840 merely stores $T_{last}$ calculated when step S1908 is performed for the first time. On each subsequent iteration of step S1902 to S1912, interaction duration combination module 1840 increases the stored overall measure of time by the value of $T_{last}$ calculated at step S1908 on that iteration. In this way, the overall measure of time stored after step S1910 has been performed is indicative of the total length of all of the detected user interactions in the determined reward-generating application.

At step S1912, interaction start detection module 1810 determines whether a start of a further user interaction in the determined reward-generating application has been detected. The processing at step S1912 is the same as the processing at step S1900 described above. If it is determined at step S1912 that the start of a further user interaction has been detected, then processing returns to S1902.

On the other hand, if it is determined at step S1912 that no start of a further user interaction in the determined reward-generating application has been detected, then processing proceeds to step S1914, at which elapsed time determination module 1850 determines whether the time that has elapsed since time $T_{end}$ previously stored upon the last performance of the processing at step S1906 (this time being indicative of the end of the last user interaction in the determined reward-generating application) is greater than a threshold time $T_{threshold}$. If it is determined at step S1914 that the elapsed time is not greater than $T_{threshold}$ then processing returns to step S1912.

On the other hand, if it is determined at step S1914 that the elapsed time since the end of the last user interaction in the determined reward-generating application is greater than the threshold time, then the processing by monitoring module 760 at step S1002 ends.

In the processing operations described above, interaction duration combination module 1840 calculates the overall measure of time indicative of the length of all of the detected user interactions in the determined reward-generating application before processing is performed at step S1914 to determine whether the elapsed time since the end of the last user interaction in the determined reward-generating application is greater than a predetermined threshold. However, instead, interaction combination module 1840 may be arranged to calculate the overall measure of time after it is determined that the time since the end of the last user interaction in the determined reward-generating application is greater than a threshold time. An example of this processing is shown in FIG. 20.

Figure 20:
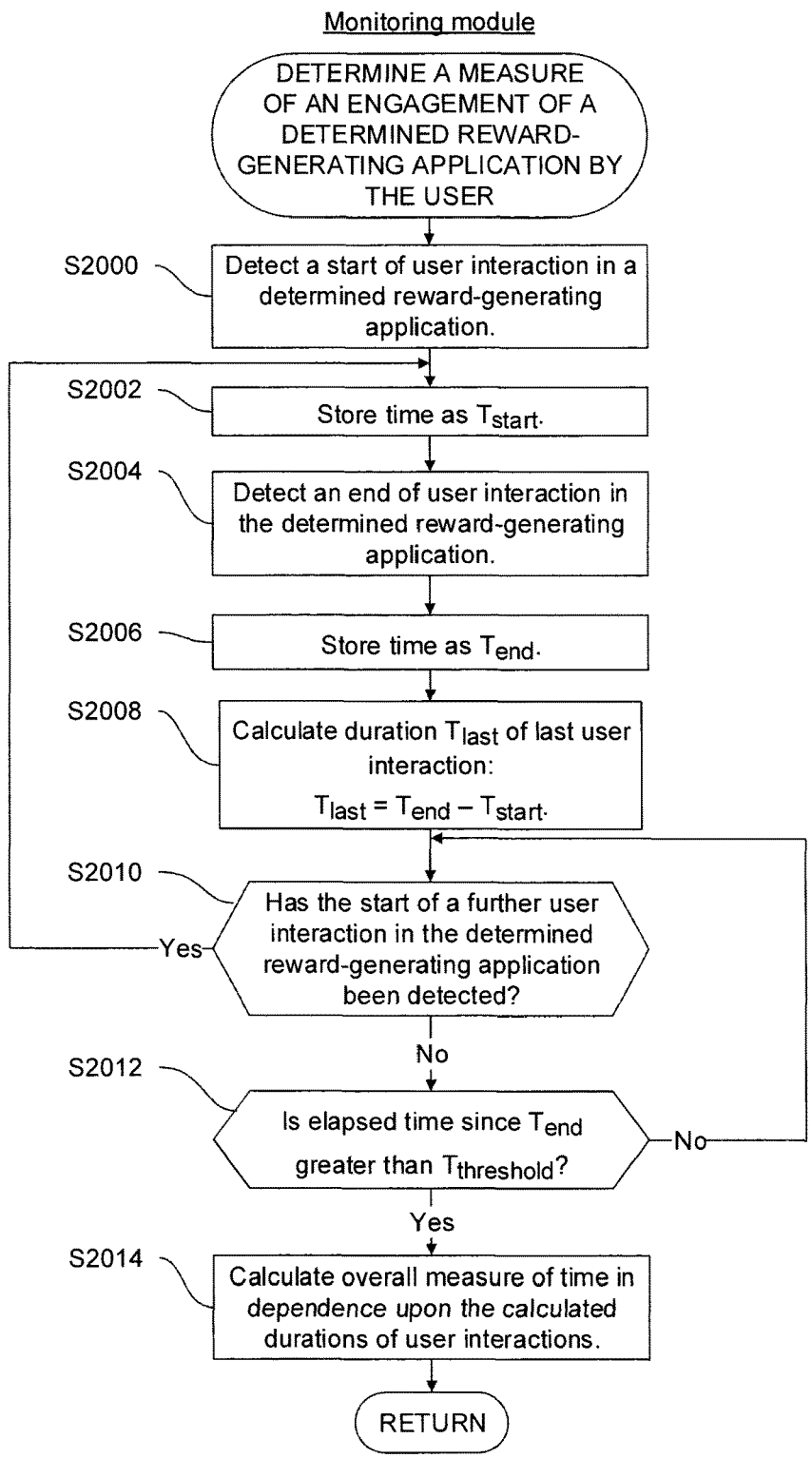
FIG. 20 shows processing operations performed by a monitoring module at step S1002 in a modification of the fifth embodiment.

Referring to FIG. 20, steps S2000, S2002, S2004, S2006 and S2008 are the same as steps S1900, S1902, S1904, S1906 and S1908, respectively, in FIG. 19.

At step S2010, interaction start detection module 1810 determines whether the start of a further user interaction in the determined reward-generator application has been detected (the processing at step S2010 being the same as the processing at step S1900 described above). If it is determined at step S2010 that the start of a further user interaction has been detected, then processing returns to step S2002.

On the other hand, if it is determined at step S2010 that no start of a further user interaction in the determined reward-generating application has been detected, then processing proceeds to step S2012, at which elapsed time determination module 1850 determines whether the time elapsed since the end of the last user interaction in the determined reward-generating application (this time being indicated by the time $T_{end}$ last stored at step S2006) is greater than a threshold time $T_{threshold}$. If it is determined at step S2012 that the elapsed time is not greater than the threshold time, then processing returns to step S2010.

On the other hand, when it is determined at step S2012 that the elapsed time since the end of the last user interaction is greater than the threshold time, processing proceeds to step S2014, at which interaction duration combination module 1840 calculates an overall measure of time for all of the detected user interactions in the determined reward-generating application. In this embodiment, interaction duration combination module 1840 calculates the overall measure of time by combining the durations of the individual user interactions calculated and stored at step S2008.

Sixth Embodiment

The components of the sixth embodiment and the processing operations performed thereby are the same as those in the second embodiment, with the exceptions of the components of monitoring module 760 and the processing operations performed by monitoring module 760 at step S1002. Accordingly, only these differences will be described here.

As will be explained below, monitoring module 760 in the sixth embodiment is operable to determine a measure of an engagement of a reward-generating application by a user by performing processing operations to determine a length of time indicative of the time the user was actively interacting with the reward-generating application. The processing operations performed by monitoring module 760 to determine a measure of time indicative of the length of time the user was actively interacting with a reward-generating application are different from the processing operations performed in the fifth embodiment.

Figure 21:
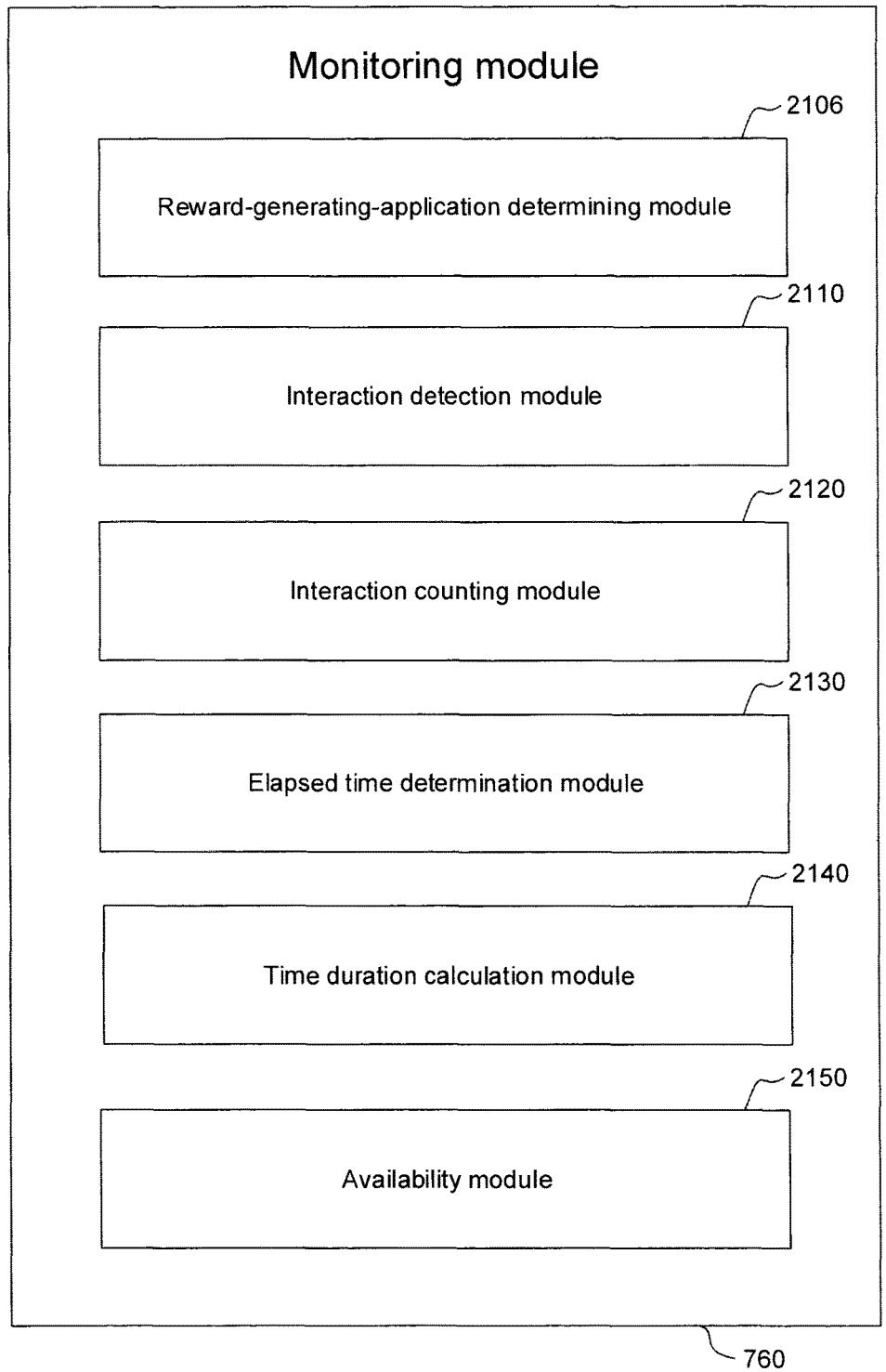
FIG. 21 schematically illustrates functional processing modules of a monitoring module in the sixth embodiment.

FIG. 21 schematically illustrates the functional processing modules of monitoring module 760 in the sixth embodiment.

Referring to FIG. 21, monitoring module 760 comprises a reward-generating-application determining module 2106, an interaction detection module 2110, an interaction counting module 2120, an elapsed time determination module 2130, a time duration calculation module 2140 and an availability module 2150.

Reward-generating-application determining module 2106 is operable to perform the same processing as reward-generating-application determining module 806 in the second embodiment, and is therefore operable to determine at step S1000 the reward-generating application(s) to be monitored.

Interaction detection module 2110 is operable to detect user interactions in a reward-generating application, and to store a time indicative of the time of detection. A user interaction may comprise any type of user interaction, such as a click, tap, swipe, key pad input, in-app purchase, etc. Interaction detection module 2110 may detect a user interaction in any of a number of different ways. For example, interaction detection module 2110 may detect a user interaction by reading data indicative of a user interaction from a memory, into which the data has been written by the operating system of the user processing device. By way of a further example, interaction detection module 2110 may detect a user interaction by receiving a notification indicative of a user interaction sent from the operating system of the user processing device.

Interaction counting module 2120 is operable to count the number of detected user interactions in a reward-generating application.

Elapsed time determination module 2130 is operable to determine whether a time since a last user interaction in the reward-generating application exceeds a threshold.

Time duration calculation module 2140 is responsive to a determination by the elapsed time determination module 2130 that the threshold has been exceeded to calculate a measure of time indicative of the time during which the user was actively interacting with a reward-generating application in dependence upon the determined number of user interactions.

Availability module 2150 is operable to perform the same processing operations as availability module 840 in the second embodiment, and is therefore operable to make available each determined measure of engagement at step S1004.

Figure 22:
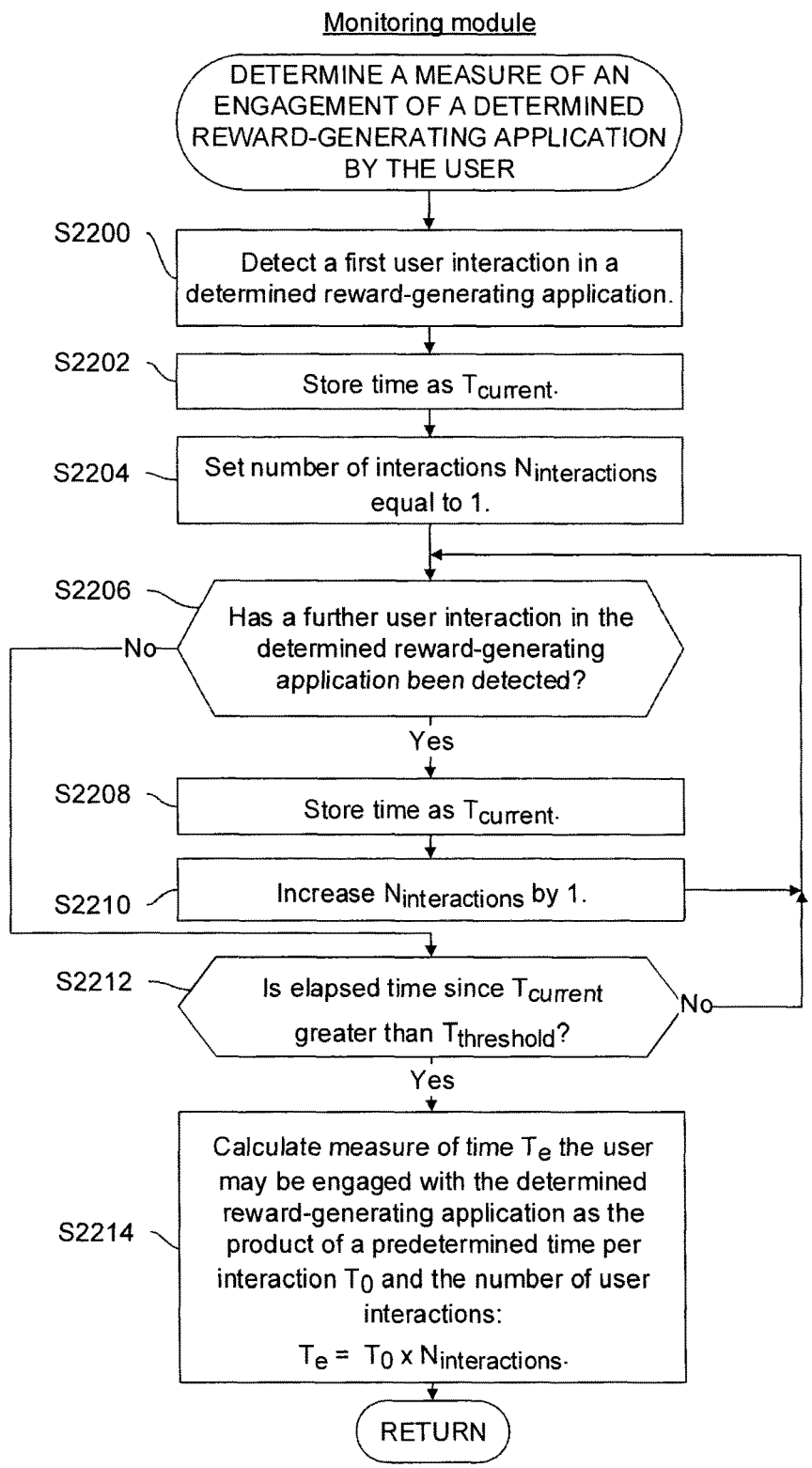
FIG. 22 shows processing operations performed by a monitoring module at step S1002 in the sixth embodiment.

FIG. 22 shows the processing operations performed by the components of monitoring module 760 at step S1002 in the sixth embodiment.

Referring to FIG. 22, at step S2200, interaction detection module 2110 detects a first user interaction in a determined reward-generating application. As noted above, a user interaction may comprise, for example, a click, tap, swipe, key pad input, in-app purchase, or any other user interaction. In this embodiment, interaction detection module 2110 detects the first user interaction by reading data indicative of a first user interaction from memory, into which the data was written by the operating system of the user processing device. This reading of data from memory to check for data indicative of the first user interaction may occur at a predetermined frequency with a time $T_f$ between each reading. However, as noted previously, interaction detection module 2110 may detect a first user interaction in different ways.

Upon detection of the first user interaction in a reward-generating application, processing proceeds to step S2202, at which interaction detection module 2110 stores a time $T_{current}$ indicative of the time of detection.

At step S2204, interaction counting module 2120 sets the value of a counter defining the number of user interactions $N_{interactions}$ equal to 1.

At step S2206, interaction detection module 2110 determines if a further user interaction in the determined reward-generating application has been deleted (the processing at step S2206 being the same as the processing at step S2200 described above). If it is determined at step S2206 that a further user interaction has not been detected, then processing proceeds to step S2212, which will be described below.

On the other hand, if it is determined at step S2206 that a further user interaction has been detected, then processing proceeds to step S2208, at which interaction detection module 2110 replaces currently-stored time $T_{current}$ with a new time $T_{current}$ indicative of the time at which the further notification was detected.

At step S2210, interaction counting module 2120 increases the value of the counter defining the number of detected user interactions in the determined reward-generating application by 1. Processing then returns to step S2206.

When it is determined at step S2206 that no further user interaction in the determined reward-generating application has been detected, processing proceeds to step S2212, at which elapsed time determination module 2130 determines whether the elapsed time since the last user interaction in the determined reward-generating application (indicated by the currently-stored value of $T_{current}$) is greater that a threshold time $T_{threshold}$.

If it is determined at step S2212 that the elapsed time since the last user interaction is not greater than the threshold time, then processing returns to step S2206.

On the other hand, if it is determined at step S2212 that the elapsed time since the last user interaction is greater than the threshold time, then processing proceeds to step S2214, at which time duration calculation module 2140 calculates a measure of time indicative of the length of time during which the user was actively interacting with the reward-generating application. In this embodiment, time duration calculation module 2140 calculates the measure of time by multiplying the number of user interactions by a predetermined time value $T_0$ that is indicative of a typical time duration for an individual user interaction in accordance with the following equation (although other equations could be used instead):

$$T_e = T_0 \times N_{interactions} \qquad \text{Equation 12}$$

In the sixth embodiment described above, no distinction is made between different types of user interactions in the determined reward-generating application. Consequently, each user interaction, irrespective of its type, increases the value of the counter by one and increases the measure of time calculated at step S2214 by $T_o$. As a modification, however, interaction detection module 2110 may determine the type of each interaction, for example, by reading data defining the type of user interaction from memory, into which the data was written by the operating system of the user processing device, or by receiving a notification of the type of the user interaction sent by the operating system of the user processing device. In this case, a separate count may be maintained for each type of user interaction and, at step S2214, each respective count may be multiplied by a different predetermined time value that is indicative of a typical length of a user interaction of that type, with the respective overall times for each type of user interaction then being combined together to give a combined overall time.

Seventh Embodiment

The components of the seventh embodiment and the processing operations performed thereby are the same as those in the second embodiment, with the exception of the components of monitoring module 760 and the processing operations performed by monitoring module 760 at step S1002. Accordingly, only these differences will be described here.

As will be explained below, monitoring module 760 in this seventh embodiment is operable to determine a measure of an engagement of a reward-generating application by a user by performing processing operations to determine a length of time that is indicative of the length of time during which the user was actively interacting with the reward-generating application. The processing operations performed by monitoring module 760 to determine this length of time are different from the processing operations performed in the fifth and sixth embodiments.

Figure 23:
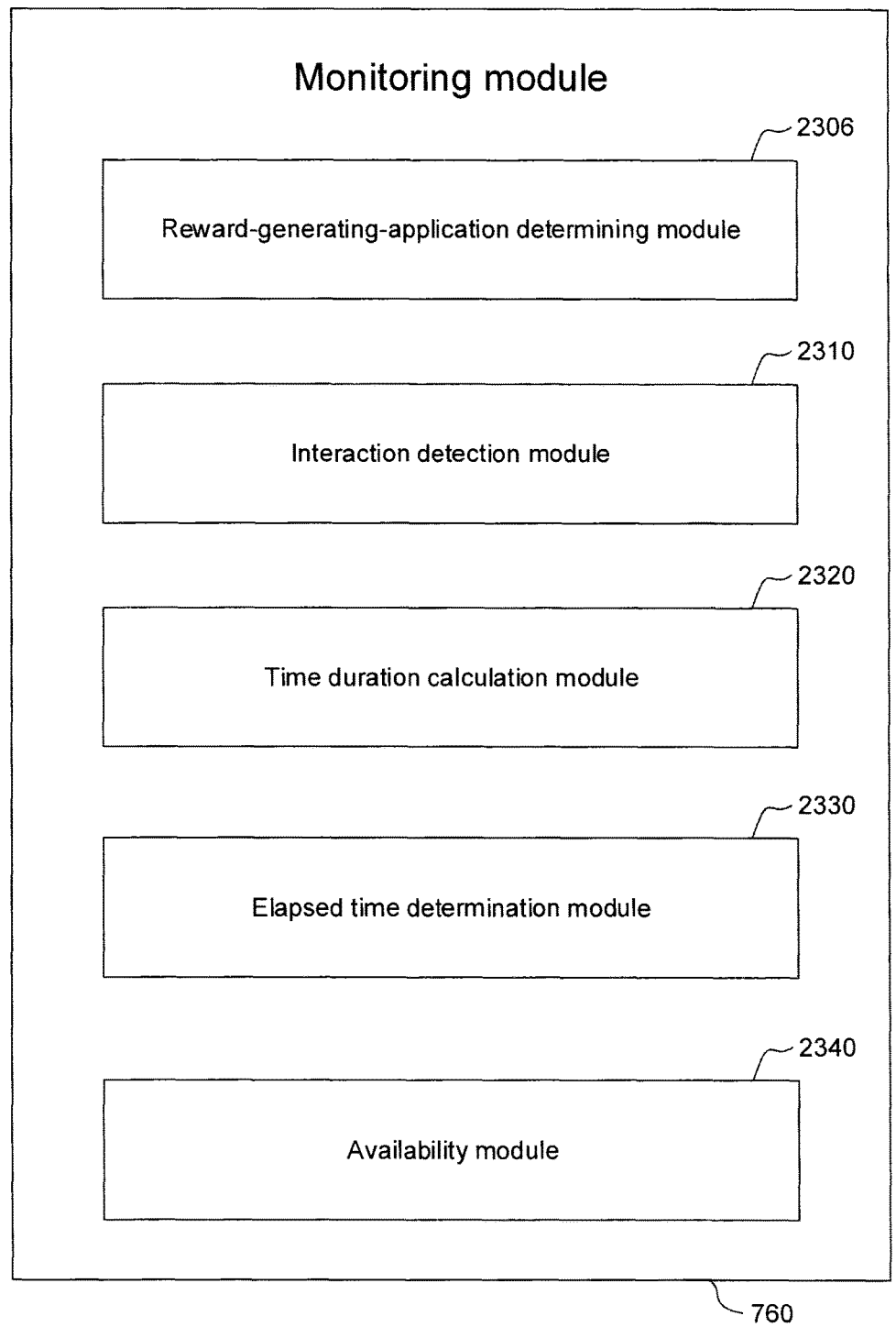
FIG. 23 schematically illustrates functional processing modules of a monitoring module in the seventh embodiment.

FIG. 23 schematically illustrates the functional processing modules of monitoring module 760 in the seventh embodiment.

Referring to FIG. 23, monitoring module 760 comprises a reward-generating-application determining module 2306, an interaction detection module 2310, a time duration calculation module 2320, an elapsed time determination module 2330, and an availability module 2340.

Reward-generating-application determining module 2306 is operable to perform the same processing as reward-generating-application determining module 806 in the second embodiment, and is therefore operable to determine at step S1000 the reward-generating application(s) to be monitored.

Interaction detection module 2310 is operable to detect user interactions in a reward-generating application, and to store a time indicative of the time of detection of each user interaction. A user interaction may comprise any user interaction, such as a click, tap, swipe, key pad input, in-app purchase, etc. Interaction detection module 2310 may detect a user interaction in any of a number of different ways. For example, interaction detection module 2310 may read data indicative of a user interaction from memory, into which the data was written by the operating system of the user processing device. By way of further example, interaction detection module 2310 may detect a user interaction by receiving a notification indicative of a user interaction sent by the operating system of the user processing device.

Time duration calculation module 2320 is operable to calculate a measure of time indicative of the time the user was actively interacting with a reward-generating application in dependence upon the detected user interactions.

Elapsed time determination module 2330 is operable to determine whether the elapsed time since the last user interaction in a reward-generating application exceeds a predetermined threshold.

Availability module 2340 is operable to perform the same processing operations as availability module 840 in the second embodiment, and is therefore operable to make available each determined measure of engagement at step S1004.

Figure 24:
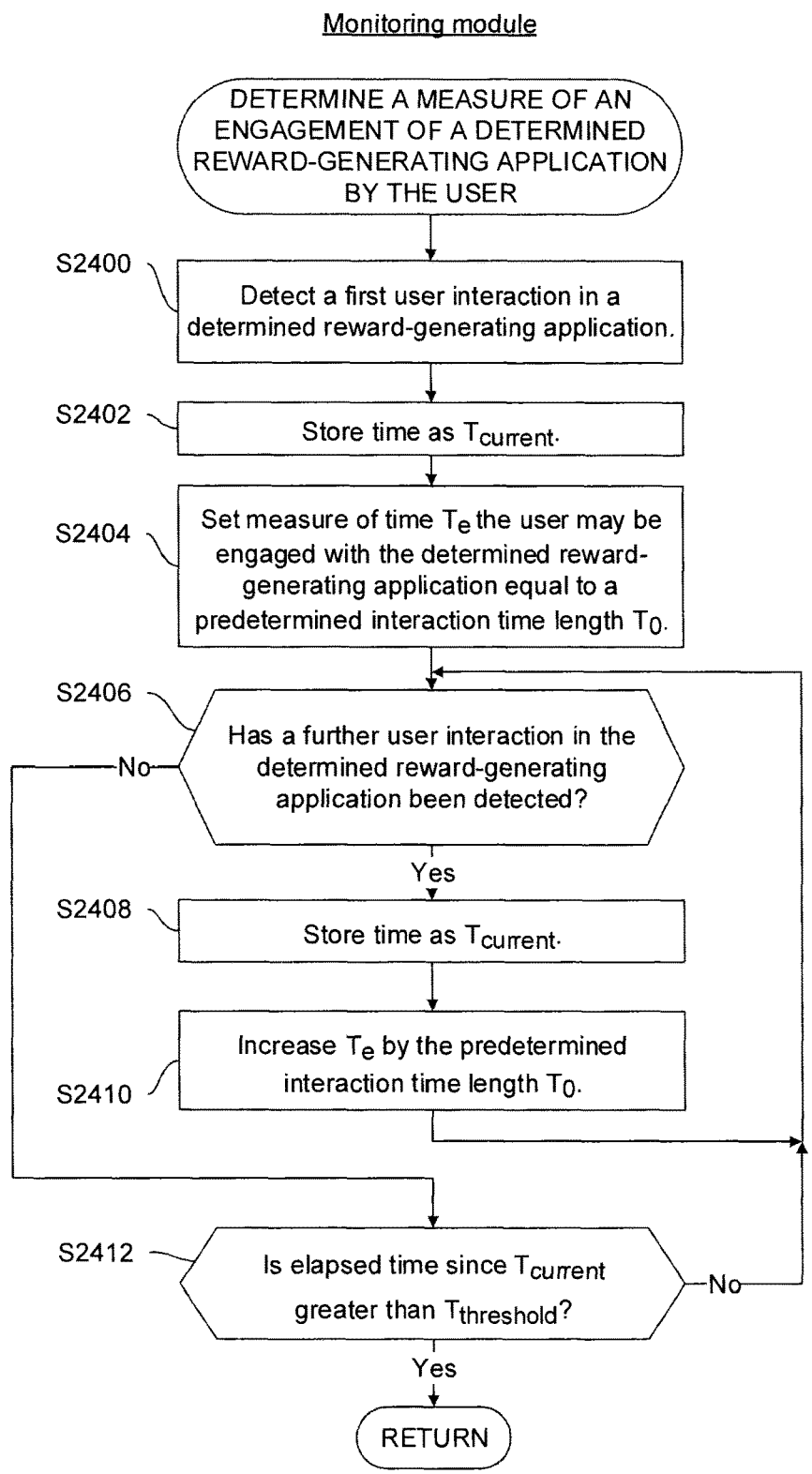
FIG. 24 shows processing operations performed by a monitoring module at step S1002 in the seventh embodiment.

FIG. 24 shows the processing operations performed by the components of monitoring module 760 at step S1002 in the seventh embodiment.

Referring to FIG. 24, at step S2400, interaction detection module 2310 detects a first user interaction in a determined reward-generating application. As noted above, a user interaction may comprise for example, a click, tap, swipe, key pad input, in-app purchase, or any other user interaction. In this embodiment, interaction notification receiving module 2310 detects a user interaction by reading data indicative of a user interaction from memory, into which the data was written by the operating system of the user processing device. This reading of data from memory to check for data indicative of a user interaction may occur at a predetermined frequency, with a time $T_f$ between each reading. However, as noted previously, interaction detection module 2310 may detect a user interaction in different ways.

Upon detection of a first user interaction at step S2400, processing proceeds to step S2402, at which interaction notification receiving module 2310 stores a time $T_{current}$ indicative of the time at which the detection was made.

At step S2404, time duration calculation module sets the value of a time $T_e$, indicative of the time during which the user was actively interacting with the reward-generating application by performing the first user interaction, equal to a predetermined time $T_0$ that is a typical time length for a user interaction.

At step S2406, interaction detection module 2310 determines whether a further user interaction in the determined reward-generating application has been detected (the processing at step S2406 being the same as the processing at step S2400 described above).

If it is determined at step S2406 that a further user interaction has been detected, then processing proceeds to step S2408, at which interaction detection module 2310 stores a time $T_{current}$ indicative of the time at which the detection was made.

At step S2410, time duration calculation module 2320 increases the stored time $T_e$ by the predetermined time value $T_0$ that is indicative of a typical time duration for a user interaction. Processing then returns to step S2406.

When it is determined at step S2406 that no further user interaction in the determined reward-generating application has been detected, processing proceeds to step S2412, at which elapsed time determination module 2330 determines whether the time since the last user interaction in the determined reward-generating application (indicated by the currently-stored value of $T_{current}$) is greater than a threshold time $T_{threshold}$.

If it is determined at step S2412 that the elapsed time is not greater than the threshold time, then processing returns to step S2406. On the other hand, if it is determined at step S2412 that the elapsed time is greater than the threshold, then the processing operations by monitoring module 760 at step S1002 end.

In the seventh embodiment described above, no distinction is made between different types of user interactions in the determined reward-generating application. Consequently, each user interaction, irrespective of its type, contributes the same length of time $T_0$ to the overall measure of time indicative of how long the user was interacting with the reward-generating application. However, as a modification, interaction detection module 2310 may determine the type of each user interaction, for example, by reading data defining the type of user interaction from memory, into which the data was written by the operating system of the user processing device, or by receiving a notification of the type of the user interaction sent by the operating system of the user processing device. Time duration calculation module 2320 may then increase the stored measure of time $T_e$ by a different predetermined time duration $T_0$ in dependence upon the type of interaction.

Eighth Embodiment

The components of the eighth embodiment and the processing operations performed thereby are the same as those in the second embodiment, with the exception of the components of monitoring module 760 and the processing operations performed by monitoring module 760 at step S1002. Accordingly, only these differences will be described here.

As will be explained below, monitoring module 760 in the eighth embodiment is operable to determine a measure of an engagement of a reward-generating application by a user by performing processing operations to determine the number of user interactions in the reward-generating application. Thus, in the eighth embodiment, the determined measure of engagement of a reward-generating application by a user is not a measure of time, as in the proceeding embodiments.

Figure 25:
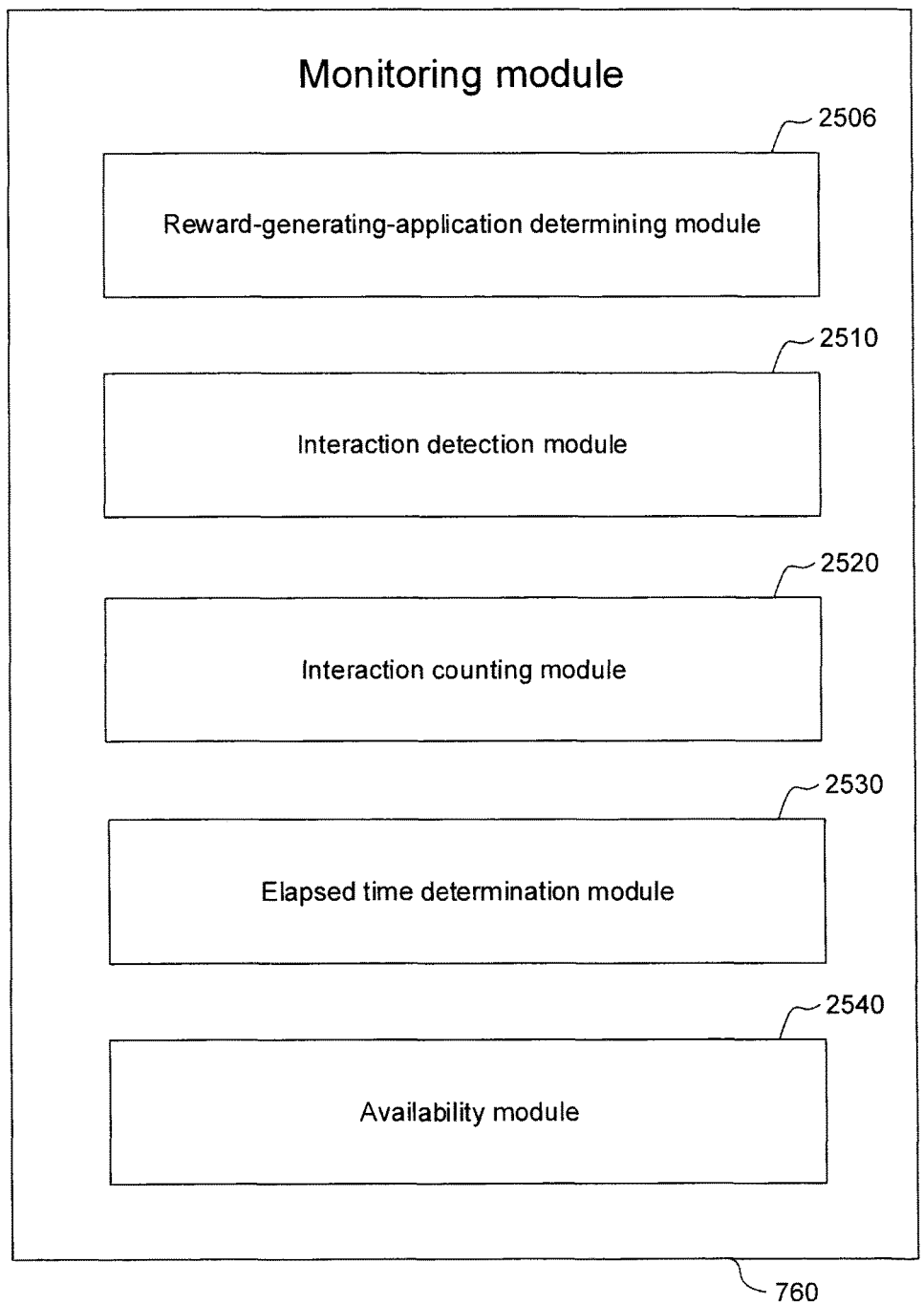
FIG. 25 schematically illustrates functional processing modules of a monitoring module in the eighth embodiment.

FIG. 25 schematically illustrates the functional processing modules of monitoring module 760 in the eighth embodiment.

Referring to FIG. 25, monitoring module 760 comprises a reward-generating-application determining module 2506, an interaction detection module 2510, an interaction counting module 2520, an elapsed time determination module 2530 and an availability module 2540.

Reward-generating-application determining module 2506 is operable to perform the same processing as reward-generating-application determining module 806 in the second embodiment, and is therefore operable to determine at step S1000 the reward-generating application(s) to be monitored.

Interaction detection module 2510 is operable to detect user interactions in a reward-generating application, and to store a respective time for each detection. A user interaction may comprise any user interaction, such as a click, tap, swipe, key pad input, in-app purchase, etc. Interaction detection module 2510 may detect a user interaction in any of a number of different ways. For example, interaction detection module 2510 may detect a user interaction by reading data indicative of a user interaction from a memory, into which the data was written by the operating system at the user processing device. By way of further example, interaction detection module 2510 may detect a user interaction by receiving a notification indicative of a user interaction sent by the operating system of the user processing device.

Interaction counting module 2520 is operable to count the number of detected user interactions in a reward-generating application.

Elapsed time determination module 2530 is operable to determine whether the time elapsed since the last user interaction in a reward-generating application exceeds a predetermined threshold.

Availability module 2540 is operable to perform the same processing operations as availability module 840 in the second embodiment, and is therefore operable to make available each determined measure of engagement at step S1004.

Figure 26:
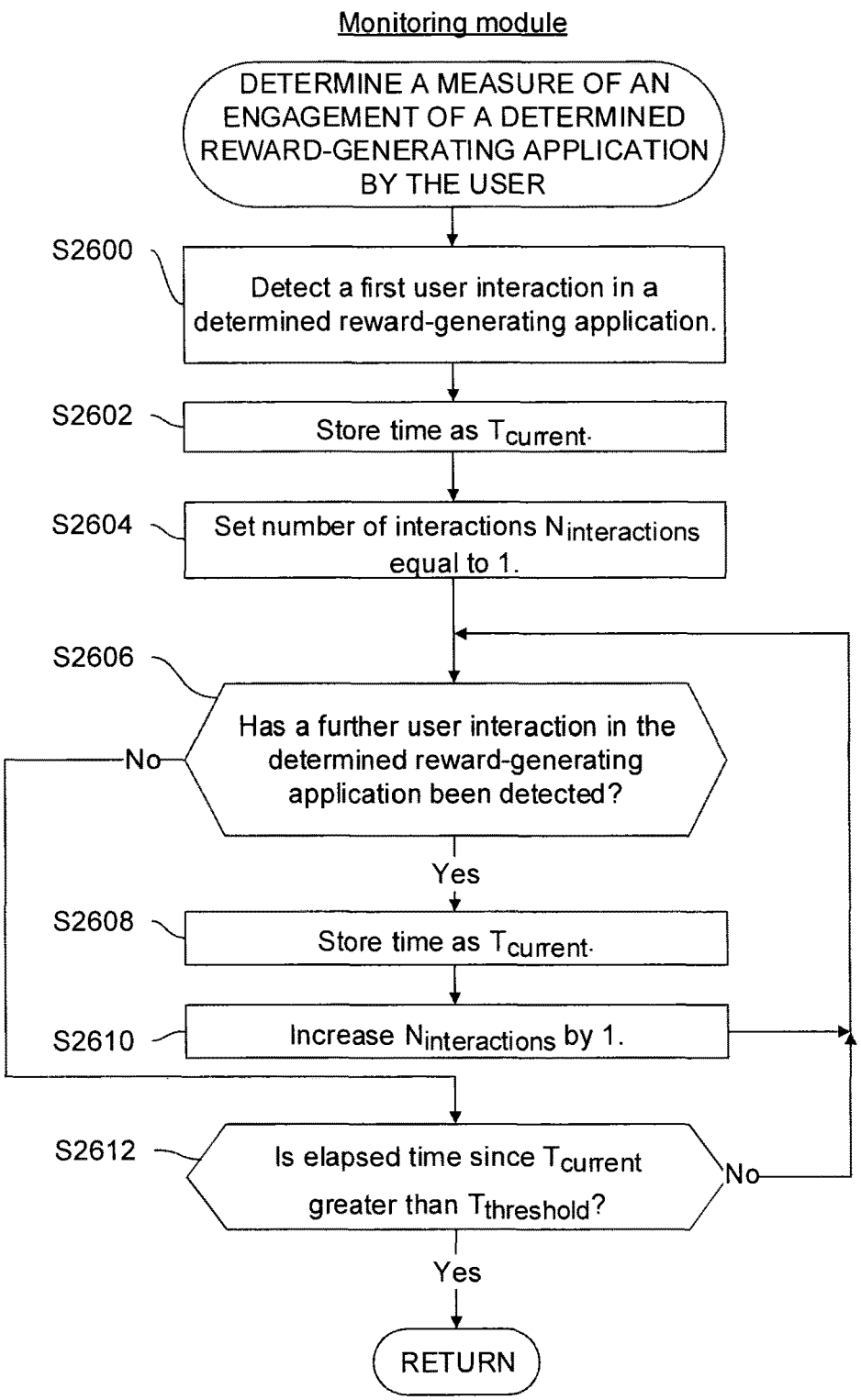
FIG. 26 shows processing operations performed by a monitoring module at step S1002 in the eighth embodiment.

FIG. 26 shows the processing operations performed by the components of monitoring module 760 at step S1002 in the eighth embodiment.

Referring to FIG. 26, at step S2600, interaction detection module 2510 detects a first user interaction in a determined reward-generating application. As noted above, a user interaction may comprise for example, a click, tap, swipe, key pad input, in-app purchase, or any other user interaction. In this embodiment, interaction notification receiving module 2510 detects a user interaction by reading data indicative of a user interaction from memory, into which the data was written by the operating system of the user processing device. This reading of data from memory to check for data indicative of a user interaction may occur at a predetermined frequency with a time $T_f$ between each reading.

However, as noted previously, interaction detection module 2510 may detect a user interaction in different ways.

Upon detection of a first user interaction at step S2600, processing proceeds to step S2602, at which interaction detection module 2510 stores a time $T_{current}$ indicative of the time of the detection.

At step S2604, interaction counting module 2520 sets the value of a counter indicative of the number interactions $N_{interactions}$ performed by the user in the reward-generating application equal to 1.

At step S2606, interaction detection module 2510 determines whether a further user interaction in the determined reward-generating application has been detected (the processing at step S2606 being the same as the processing at step S2600 described above).

If it is determined at step S2606 that a further user interaction has been detected, processing proceeds to step S2608, at which interaction detection module 2510 stores a time $T_{current}$ indicative of the detection time.

At step S2610, interaction counting module 2520 increases the value of the counter defining the number of interactions $N_{interactions}$ performed by the user in the determined reward-generating application by 1. Processing then returns to step S2606.

When it is determined at step S2606 that no further user interaction in the determined reward-generating application has been detected, processing proceeds to step S2612, at which elapsed time determination module 2530 determines whether the elapsed time since the last user interaction in the determined reward-generating application (indicated by the currently-stored value $T_{current}$) is greater than a threshold time $T_{threshold}$.

If it is determined that the elapsed time since the last user interaction is not greater than the threshold, then processing returns to step S2606. On the other hand, when it is determined at step S2612 that the elapsed time since the last user interaction is greater than the threshold, then the processing by monitoring module 760 at step S1002 ends.

Ninth Embodiment

The components of the ninth embodiment and the processing operations performed thereby are the same as those in the second embodiment, with the exception of the components of monitoring module 760 and the processing operations performed by monitoring module 760 at step S1002. Accordingly, only these differences will be described here.

As will be explained below, monitoring module 760 in the ninth embodiment is operable to determine a measure of an engagement of a reward-generating application by a user by performing processing operations to determine a length of a session spent in the reward-generating application by the user. The processing operations performed by monitoring module 760 to determine a session length are different from the processing operations performed in the second, third and fourth embodiments.

Figure 27:
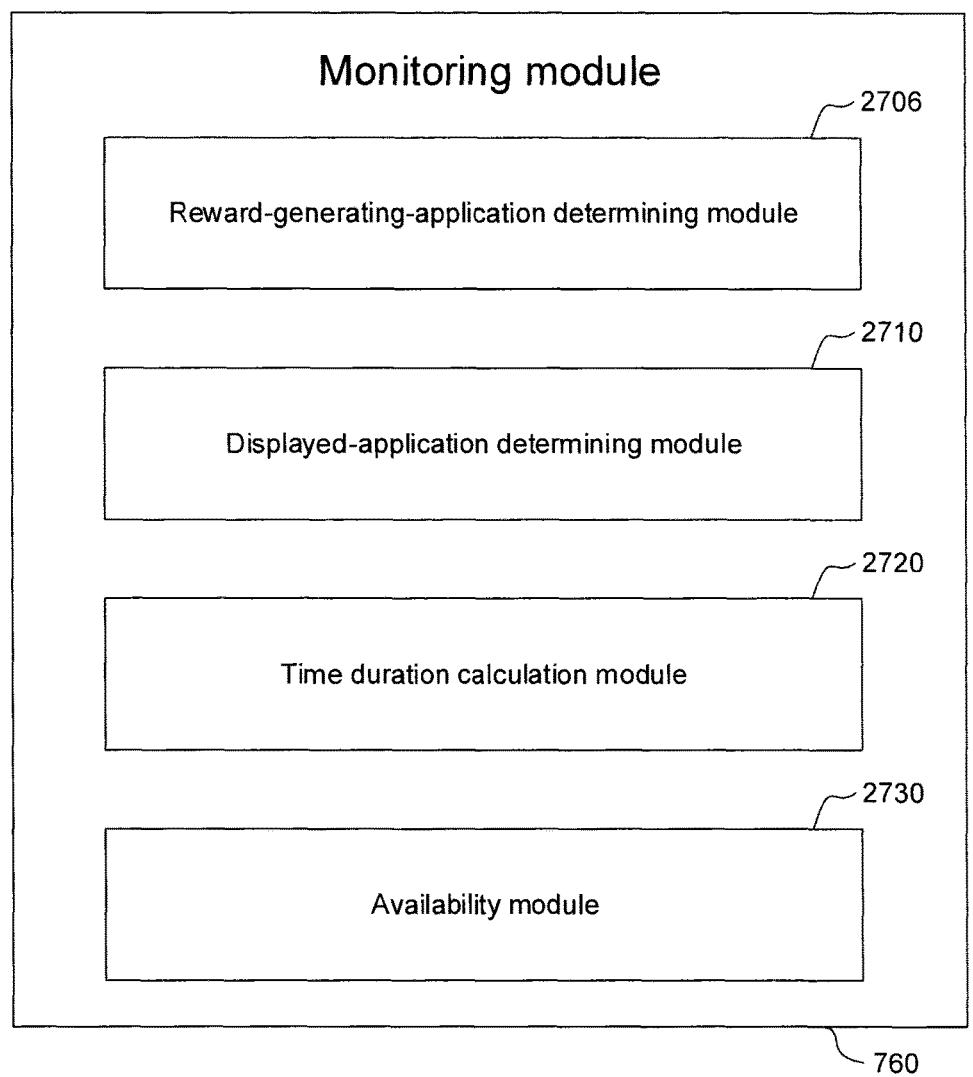
FIG. 27 schematically illustrates functional processing modules of a monitoring module in a ninth embodiment.

FIG. 27 schematically illustrates the functional processing modules of monitoring module 760 in the ninth embodiment. Referring to FIG. 27, monitoring module 760 comprises a reward-generating-application determining module 2706, a displayed-application determining module 2710, a time duration calculation module 2720 and an availability module 2730.

Reward-generating-application determining module 2706 is operable to perform the same processing operations as reward-generating-application determining module 806 in the second embodiment, and is therefore operable to determine at step S1000 the reward-generating application(s) to be monitored.

Display-application determining module 2710 is operable to determine an application currently displayed to a user and to determine whether the application displayed to the user is a determined reward-generating application. Displayed-application determining module 2710 is further operable to store a time at which the application currently displayed to the user is first determined to be a reward-generating application to be monitored and at a time at which the application currently displayed to the user is determined to be no longer that reward-generating application. Display-application determining module 2710 may determine an application currently being displayed to a user in a number of different ways. For example, display-application determining module 2710 may determine an application displayed to a user by reading data indicative of a currently displayed application from memory, into which the data was written by the operating system of the user processing device. By way of further example, displayed-application determining module 2710 may determine an application displayed to a user by receiving a notification indicative of the displayed application sent by the operating system of the user processing device.

Time duration calculation module 2710 is operable to determine a measure of engagement of a reward-generating application by a user by calculating a measure of time between the first time at which the application currently displayed to the user is determined to be a reward-generating application and the time at which the application currently displayed to the user is determined to be no longer the reward-generating application.

Availability module 2730 is operable to perform the same processing operations as availability module 840 in the second embodiment, and is therefore operable to make available each determined measure of engagement at step S1004.

Figure 28:
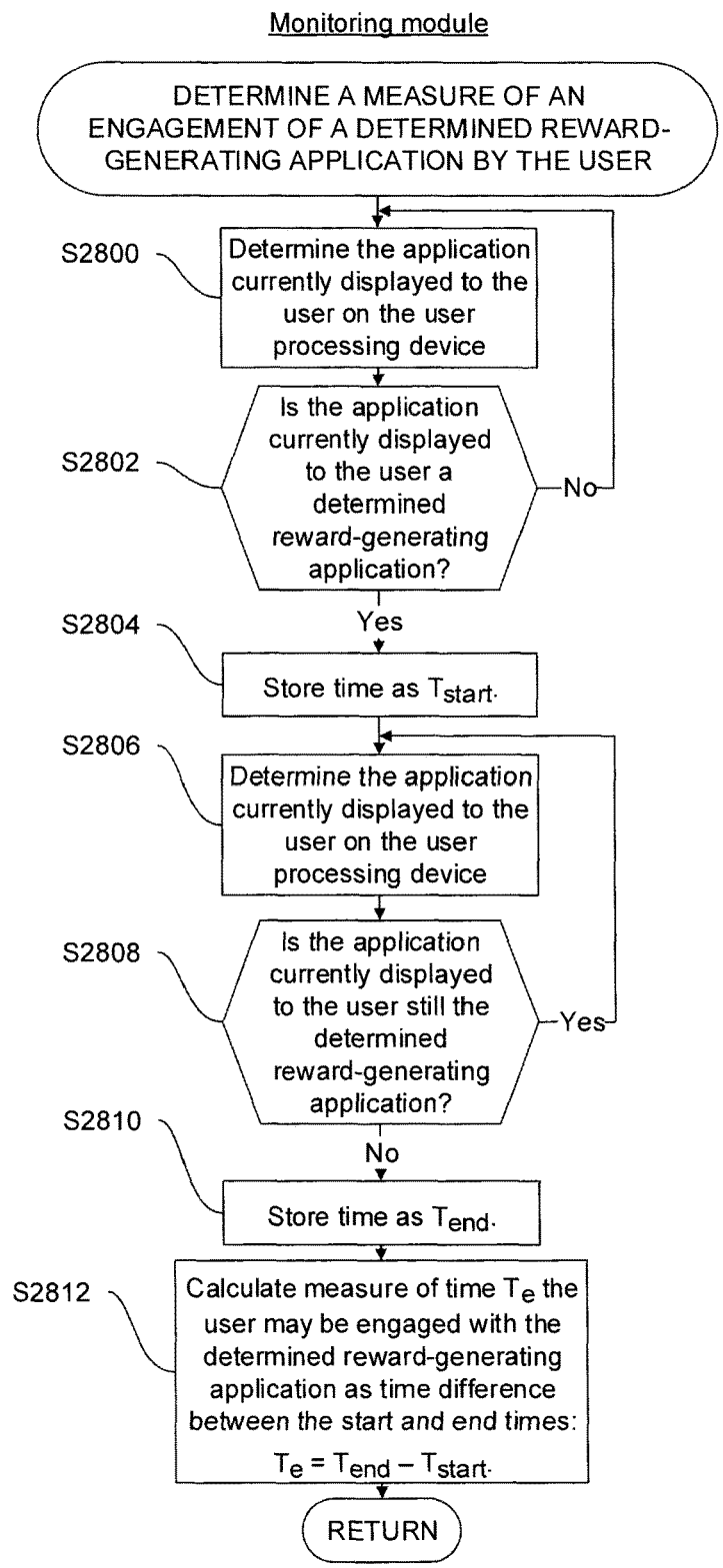
FIG. 28 shows processing operations performed by a monitoring module at step S1002 in the ninth embodiment.

FIG. 28 shows the processing operations performed by components of monitoring module 760 at step S1002 in the ninth embodiment.

Referring to FIG. 28, at step S2800, displayed-application determining module 2710 determines the application currently displayed to the user on the user processing device. In this embodiment, displayed-application determining module 2710 determines the application currently displayed to the user by reading data indicative of the currently displayed application from memory, into which the data was written by the operating system of the user processing device. This reading of data from memory may occur at a predetermined frequency with a time $T_f$ between each reading. However, as noted previously, displayed-application determining module 2710 may determine the application currently displayed to the user in different ways.

At step S2802, displayed-application determining module 2710 determines whether the application currently displayed to the user is a determined reward-generating application.

When it is determined at step S2802 that the application currently displayed to the user is a determined reward-generating application, processing proceeds to step S2804, at which displayed-application determining module 2710 stores the current time as a start time $T_{start}$.

At step S2806, displayed-application determining module 2710 again determines the application currently displayed to the user on the user processing device. This processing is the same as the processing at step S2800 described above.

At step S2808, displayed-application determining module 2710 determines whether the application currently displayed to the user is still the determined reward-generating application.

When it is determined at step S2808 that the application currently displayed to the user is no longer the determined reward-generating application, this is indicative of the end of the user's session in the determined reward-generating application and so processing proceeds to step S2810, at which displayed-application determining module 2710 stores the current time as an end time $T_{end}$.

At step S2812, time duration calculation module 2720 calculates a measure of time indicative of the time that the user may have been engaged with the determined reward-generating application. In this embodiment, time duration calculation module 2720 calculates the measure of time, $T_e$, using the following equation:

$$T_e = T_{end} - T_{start} \qquad \text{Equation 13}$$

Time duration calculation module 2720 could use other equations to calculate the measure of time $T_e$ at step S2812. For example, time duration calculation module 2720 may include an error factor in its calculation:

$$T_e = T_{end} - T_{start} + T_{error} \qquad \text{Equation 14}$$

where $T_{error}$ is an error factor that is added to take account of margins of error. For example, $T_{error}$ may be set to a predetermined time value indicative of the time resolution for obtaining the data at steps S2800 and S2806 defining the application currently displayed to the user on the user processing device. Thus, by way of example, $T_{error}$ may be set to $T_f$, which is a time between each reading of data from memory by displayed-application determining module 2710 at steps S2800 and S2806.

Figure 29:
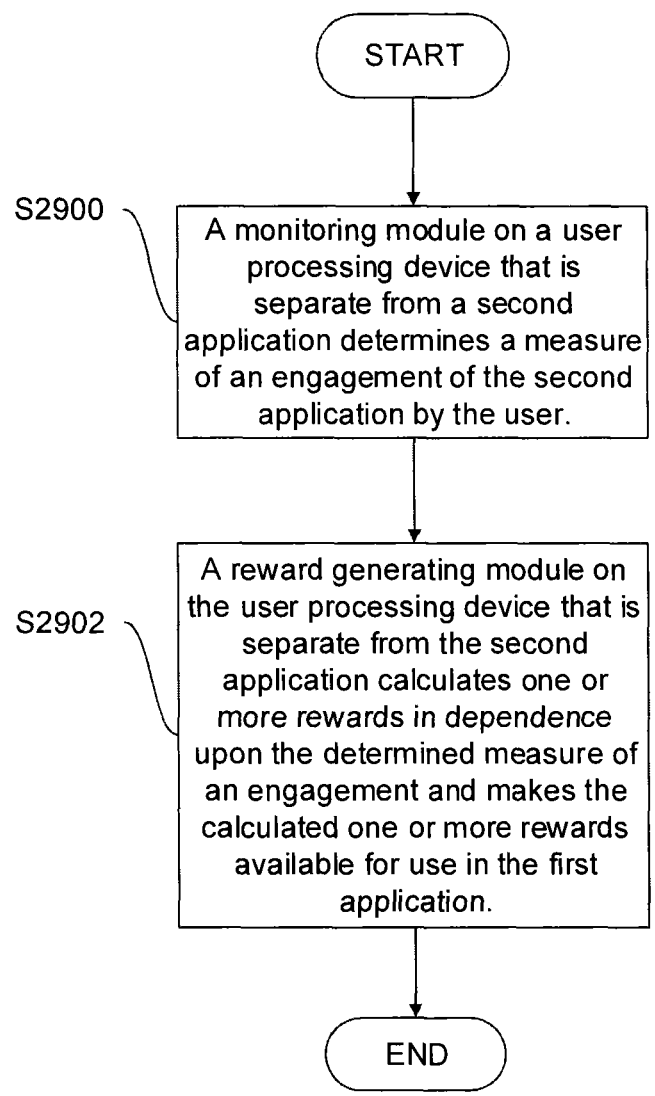
FIG. 29 shows processing operations performed by certain embodiments to effect a method of generating rewards for use in a first application on a processing device in response to user engagement of a second application on the processing device.

It will be appreciated from the description above that certain embodiments of the present invention perform processing operations to effect a method of generating rewards for use in a first application on a processing device in response to user engagement of a second application on the processing device as shown in FIG. 29.

Referring to FIG. 29, step S2900 a monitoring module on the processing device that is separate from the second application determines a measure of an engagement of the second application by the user.

At step S2902, a reward generating module on the user processing device that is separate from the second application calculates one or more rewards in dependence upon the determined measure of an engagement and makes the calculated one or more rewards available for use in the first application.

Figure 30:
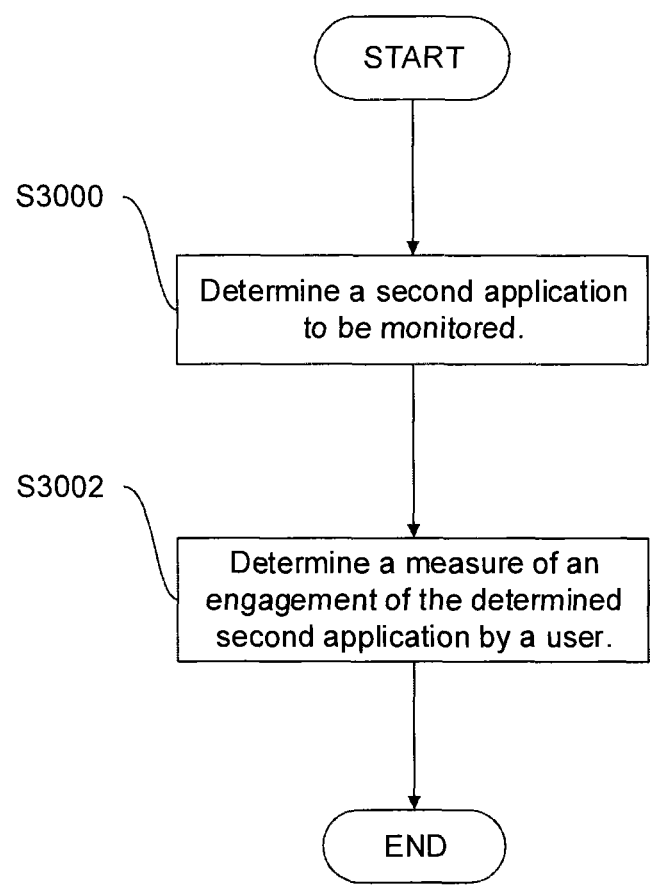
FIG. 30 shows processing operations performed in certain embodiments by the execution of monitoring instructions on a processing device that has first application instructions defining a first application and second application instructions, separate from the monitoring instructions, defining a second application engagement of which by a user is effective to generate one or more rewards for use in the first application.

It will also be appreciated from the description above that certain embodiments of the present invention perform processing operations to effect a method as shown in FIG. 30 that is performed by the execution of monitoring instructions on a processing device that has first application instructions defining a first application and second application instructions, separate from the monitoring instructions, defining a second application engagement of which by a user is effective to generate one or more rewards for use in the first application.

Referring to FIG. 30, at step S3000, a second application to be monitored is determined.

At step S3002, a measure of an engagement of the determined second application by a user is determined.

Comparison of Certain Embodiments Using an Example Scenario

Certain embodiments of the invention will now be compared using the following example scenario:
 a user selects a reward-generating application from a menu displayed at step S510 or step S910;
 the user uses the selected reward-generating application for 1 minute (60 seconds), performing 30 user interactions with the application (clicks, taps, swipes, etc), with these user interactions starting 10 seconds into the session, ending 10 seconds before the user closes the selected reward-generating application, and being evenly distributed in time between the first and last user interactions;
 the user then closes the selected reward-generating application, stops using the user processing device for 1 minute and then resumes using the user processing device by returning to the first application.

The first embodiment would determine a measure of engagement of the user with the reward-generating application by calculating the time between the time at which activation of the reward-generating application is triggered (this being indicated for example by the time at which the user selected the reward-generating application) and the time at which the user returns to the first application. Accordingly, in the example scenario above, the first embodiment would determine a measure of engagement of 2 minutes.

The second embodiment would determine a measure of engagement of the user with the reward-generating application by processing a list of applications running on the user processing device, sorted by time of last engagement by the user, so as to calculate the time between the first time at which the last application used by the user was determined to be the selected reward-generating application (this occurring when the user selected the reward-generating application in the example scenario) and the time at which the application last used by the user was determined to no longer be the reward-generating application (this being the time at which the user closed the reward-generating application in the example scenario as the reward-generating application would then no longer be running and so would not appear on the sorted list of applications). Accordingly, in the example scenario above, the second embodiment would determine a measure of engagement of 1 minute (or, if the second embodiment included an error factor in its calculation, 1 minute+$T_{error}$).

The fourth embodiment would determine a measure of engagement of the user with the reward-generating application by detecting user interactions in the reward-generating application and determining the time between the first user interaction and the last user interaction. Accordingly, in the example scenario above, the fourth embodiment would detect the first user interaction 10 seconds into the session and would detect the last user interaction 10 seconds before the end of the session. The fourth embodiment would therefore determine a measure of engagement of 40 seconds (or, if the fourth embodiment included an error factor in its calculation, 40 seconds+$T_{error}$).

[Modifications]

Many modifications can be made to the embodiments described above without departing from the spirit and scope of the present invention.

For example, in the embodiments described above, the reward-generating applications to be monitored are determined from the configuration data received from a backend server 120. However, instead, the reward-generating applications to be monitored may be determined from a predefined list of reward-generating applications or a list generated by the first application 300, 700 based on attributes of the reward-generating applications. Alternatively, the reward-generating applications to be monitored may comprise all applications running on the user processing device 102, 104, 106, 108, 110.

In the processing performed at step S1206 in the second to eighth embodiments described above, notification module 780 interfaces with the operating system of the user processing device to send a notification which links to the first application 700. As an alternative, notification module 780 may interface with an email application on the user processing device to send a notification to the user comprising an email that includes a link to the first application 700.

The described embodiments can be used to promote applications that the user has not previously downloaded or has downloaded and are identified in the configuration data from backend server 120 as reward-generating applications that are still being promoted. The described embodiments can also be used to promote re-engagement of users with existing applications that have already been installed on the user processing device but which the user has not engaged with for a period of time and which have been removed from the applications that are identified in the configuration data as reward-generating applications. Such promotion of re-engagement with a second application can be achieved, for example, by re-identifying a second application as a promoted application in the configuration data.

Each of the embodiments described above can be modified so as to report determined measures of engagement of each reward-generating application by a user to a backend server 120. If the user processing device does not have a connection to network 140, such a report could be sent the next time the user processing device establishes a connection with the network 140. By sending reports in this way, the receiving backend server 120 would be able to monitor how successful a promotion of a second application was by using the reported measures of engagement from different user processing devices.

In the embodiments described above, it is not necessary for any change to be made to a second application to enable a users engagement with the second application to be monitored or for rewards to be generated based upon a user's engagement with the second application. However, if the developer of a second application permits modifications to be made to the second application (by itself, by the developer of a first application or by a third party), a second application may be modified to send a notification when the second application is installed and/or first opened on the user processing device. The notification may be transmitted for example to a backend server 120 or to a third party tracker.

Although the methods performed by the embodiments have been described separately above, the different respective methods can be selectively combined and used together.

A person skilled in the art will, of course, recognise that modifications other than those described above can be made.

The invention claimed is:

1. A processing device storing instructions defining a first application and a second application, engagement of the second application by a user of the processing device being effective to generate one or more rewards for use in the first application, wherein the processing device further stores instructions separate from the second application defining:
   a monitoring module in the processing device that is operable to determine a measure of time as a measure of an engagement of the second application by the user, the monitoring module comprising:
      an application list obtaining module operable to obtain a list of applications running on the processing device sorted by time of last engagement by the user;
      an application list processing module operable to repeatedly process the list to determine whether the application last used by the user is the second application, and
      a time duration calculation module operable to calculate a measure of time between a first time at which the application last used by the user is determined to be the second application and a time at which the application last used by the user is determined to be no longer the second application, and
   a reward generating module in the processing device that is operable to calculate one or more rewards in dependence upon the determined measure of engagement and to make the calculated one or more rewards available for use in the first application.

2. A processing device according to claim 1, wherein the monitoring module is operable to interface with at least one of the first application and operating system of the processing device and is operable to determine therefrom the measure of the engagement of the second application by the user.

3. A processing device according to claim 1, wherein the instructions defining the first application include the instructions defining the monitoring module.

4. A processing device according to claim 1, wherein the instructions defining the first application include the instructions defining the reward generating module.

5. A processing device according to claim 3, wherein the monitoring module comprises:
   a reward-generating-application trigger module operable to trigger activation of the second application;
   a return detection module operable to detect a return of the user to the first application; and
   a time duration calculation module operable to calculate a measure of time between a time at which activation of the second application is triggered and a time at which the user returns to the first application.

6. A processing device according to claim 1, wherein the instructions defining the monitoring module are separate from the instructions defining the first application.

7. A processing device according to claim 6, wherein the instructions defining the monitoring module are part of the instructions defining an operating system of the processing device.

8. A processing device according to claim 1, wherein the instructions defining the reward generating module are separate from the instructions defining the first application.

9. A processing device according to claim 1, wherein the monitoring module comprises:
   a session start detection module operable to detect a start of a session in the second application;
   a session end detection module operable to detect an end of a session in the second application; and
   a time duration calculation module operable to calculate a measure of time between the start of the session and the end of the session.

10. A processing device according to claim 1, wherein the monitoring module comprises:
    an interaction detection module operable to detect user interactions in the second application;
    an elapsed time determination module operable to determine when a time since a last user interaction in the second application exceeds a threshold; and
    a time duration calculation module responsive to a determination by the elapsed time determination module that the threshold has been exceeded to calculate a measure of time between a first user interaction in the second application and the last user interaction in the second application.

11. A processing device according to claim 1, wherein the monitoring module comprises:
    an interaction detection module operable to detect user interactions in the second application;

a time duration calculation module operable to calculate a measure of time between a first user interaction in the second application and subsequent user interactions in the second application;

an elapsed time determination module operable to determine when a time since a last user interaction in the second application exceeds a threshold.

12. A processing device according to claim 1, wherein the monitoring module comprises:
   an interaction start detection module operable to detect, for each of a plurality of user interactions in the second application, a start of the user interaction;
   an interaction end detection module operable to detect, for each of the plurality of user interactions in the second application, the end of the user interaction;
   an interaction duration calculation module operable to calculate a duration of each of the plurality of user interactions by calculating a measure of time between the start of the user interaction and the end of the user interaction; and
   an interaction duration combination module operable to combine the durations of the user interactions calculated by the interaction duration calculation module.

13. A processing device according to claim 1, wherein the monitoring module comprises:
   an interaction detection module operable to detect user interactions in the second application;
   an interaction counting module operable to count the detected user interactions in the second application;
   an elapsed time determination module operable to determine whether a time since a last user interaction in the second application exceeds a threshold; and
   a time duration calculation module responsive to a determination by the elapsed time determination module that the threshold has been exceeded to calculate a measure of time in dependence upon the number of detected user interactions in the second application.

14. A processing device according to claim 1, wherein the monitoring module comprises:
   an interaction detection module operable to detect user interactions in the second application;
   a time duration calculation module operable to calculate a measure of time in dependence upon the detected user interactions; and
   an elapsed time determination module operable to determine whether a time since a last user interaction in the second application exceeds a threshold.

15. A processing device according to claim 1, wherein the monitoring module comprises:
   an interaction detection module operable to detect user interactions in the second application; and
      an interaction counting module operable to count the detected user interactions in the second application.

16. A processing device according to claim 1, wherein the monitoring module comprises:
   a displayed-application determining module operable to determine an application displayed to a user and operable to determine whether the application displayed to the user is the second application; and
   a time duration calculation operable to calculate a measure of time between a first time at which the application displayed to the user is determined to be the second application and a time at which the application displayed to the user is determined to no longer be the second application.

17. A processing device according to claim 1, further comprising instructions defining a notification module, the notification module operable to trigger a notification to the user of the one or more rewards, the notification linking to the first application.

18. A method of generating rewards for use in a first application on a processing device in response to engagement of a second application on the processing device by a user of the processing device, the method comprising:
   a monitoring module on the processing device that is separate from the second application determining a measure of time as a measure of an engagement of the second application by the user, wherein the monitoring module:
   obtains a list of applications on the processing device sorted by time of last engagement by the user;
   repeatedly processes the list to determine whether the application last used by the user is the second application; and
   calculates a measure of time between a first time at which the application last used by the user is determined to be the second application and a time at which the application last used by the user is determined to be no longer the second application; and
   a reward generating module on the processing device that is separate from the second application calculating one or more rewards in dependence upon the determined measure of an engagement and making the calculated one or more rewards available for use in the first application.

19. A method according to claim 18, wherein the monitoring module interfaces with at least one of the first application and operating system of the processing device and determines therefrom the measure of the engagement of the second application by the user.

20. A method according to claim 18, wherein the monitoring module is part of the first application.

21. A method according to claim 18, wherein the reward generating module is part of the first application.

22. A method according to claim 20, wherein the monitoring module:
   triggers activation of the second application;
   detects a return of the user to the first application; and
   calculates a measure of time between a time at which activation of the second application is triggered and a time at which the user returns to the first application.

23. A method according to claim 18, wherein the monitoring module is separate from the first application.

24. A method according to claim 23, wherein the monitoring module is part of an operating system of the processing device.

25. A method according to claim 18, wherein the reward generating module is separate from the first application.

26. A method according to claim 18, wherein the monitoring module:
   detects a start of a session in the second application;
   detects an end of a session in the second application; and
   calculates a measure of time between the start of the session and the end of the session.

27. A method according to claim 18, wherein the monitoring module:
   detects user interactions in the second application;
   determines when a time since a last user interaction in the second application exceeds a threshold; and
   in response to a determination that the threshold has been exceeded, calculates a measure of time between a first user interaction in the second application and the last user interaction in the second application.

28. A method according to claim 18, wherein the monitoring module:
  detects user interactions in the second application;
  calculates a measure of time between a first user interaction in the second application and subsequent user interactions in the second application; and
  determines when a time since a last user interaction in the second application exceeds a threshold.

29. A method according to claim 18, wherein the monitoring module:
  detects, for each of a plurality of user interactions in the second application, the start of the user interaction:
  detects, for each of the plurality of user interactions in the second application, the end of the user interaction;
  calculates, for each of the plurality of user interactions, a duration of the user interaction by calculating a measure of time between the start of the user interaction and the end of the user interaction; and
  combines the durations of the user interactions.

30. A method according to claim 18, wherein the monitoring module:
  detects user interactions in the second application;
  counts the detected user interactions in the second application;
  determines whether a time since a last user interaction in the second application exceeds a threshold; and
  in response to a determination that the threshold has been exceeded, calculates a measure of time in dependence upon the number of detected user interactions in the second application.

31. A method according to claim 18, wherein the monitoring module:
  detects user interactions in the second application;
  calculates a measure of time in dependence upon the detected user interactions; and
  determines whether a time since a last user interaction in the second application exceeds a threshold.

32. A method according to claim 18, wherein the monitoring module:
  detects user interactions in the second application; and
  counts the detected user interactions in the second application.

33. A method device according to claim 18, wherein the monitoring module: determines whether an application displayed to a user is the second application; and calculates a measure of time between a first time at which the application displayed to the user is determined to be the second application and a time at which the application displayed to the user is determined to no longer be the second application.

34. A method according to claim 18, further comprising triggering a notification to the user of the one or more rewards, the notification linking to the first application.

35. A non-transitory storage medium storing computer program instructions which, when executed by a processing device that has first application instructions defining a first application and second application instructions, separate from the computer program instructions, defining a second application engagement of which by a user of the processing device is effective to generate one or more rewards for use in the first application, cause the processing device to:
  determine a second application to be monitored; and
  determine a measure of time as a measure of an engagement of the determined second application by a user, by:
    obtaining a list of applications on the processing device sorted by time of last engagement by the user;
    repeatedly processing the list to determine whether the application last used by the user is the second application; and
    calculating a measure of time between a first time at which the application last used by the user is determined to be the second application and a time at which the application last used by the user is determined to be no longer the second application.

36. A non-transitory storage medium according to claim 35, wherein the computer program instructions, when executed, cause the processing device to:
  interface with at least one of the first application and operating system of the processing device and determines therefrom the measure of the engagement of the second application by the user.

37. A non-transitory storage medium according to claim 35, wherein the computer program instructions are part of the first application instructions.

38. A non-transitory storage medium according to claim 37, wherein the computer program instructions, when executed, cause the processing device to:
  trigger activation of the second application;
  detect a return of the user to the first application, and
  calculate a measure of time between a time at which activation of the second application is triggered and a time at which the user returns to the first application.

39. A non-transitory storage medium according to claim 35, wherein the computer program instructions are part of an operating system of the processing device.

40. A non-transitory storage medium according to claim 35, wherein the computer program instructions, when executed, cause the processing device to:
  detect a start of a session in the second application;
  detect an end of a session in the second application; and
  calculate a measure of time between the start of the session and the end of the session.

41. A non-transitory storage medium according to claim 35, wherein the computer program instructions, when executed, cause the processing device to:
  detect user interactions in the second application;
  determine when a time since a last user interaction in the second application exceeds a threshold; and
  in response to a determination that the threshold has been exceeded, calculate a measure of time between a first user interaction in the second application and the last user interaction in the second application.

42. A non-transitory storage medium according to claim 35, wherein the computer program instructions, when executed, cause the processing device to:
  detect user interactions in the second application;
  calculate a measure of time between a first user interaction in the second application and subsequent user interactions in the second application; and
  determine when a time since a last user interaction in the second application exceeds a threshold.

43. A non-transitory storage medium according to claim 35, wherein the computer program instructions, when executed, cause the processing device to:
  detect, for each of a plurality of user interactions in the second application, the start of the user interaction;
  detect, for each of the plurality of user interactions in the second application, the end of the user interaction;
  calculate, for each of the plurality of user interactions, a duration of the user interaction by calculating a measure of time between the start of the user interaction and the end of the user interaction; and
  combine the durations of the user interactions.

44. A non-transitory storage medium according to claim 35, wherein the computer program instructions, when executed, cause the processing device to:
  detect user interactions in the second application;
  count the detected user interactions in the second application;
  determine whether a time since a last user interaction in the second application exceeds a threshold; and
  in response to a determination that the threshold has been exceeded, calculate a measure of time in dependence upon the number of detected user interactions in the second application.

45. A non-transitory storage medium according to claim 35, wherein the computer program instructions, when executed, cause the processing device to:
  detect user interactions in the second application:
  calculate a measure of time in dependence upon the detected user interactions; and
  determine whether a time since a last user interaction in the second application exceeds a threshold.

46. A non-transitory storage medium according to claim 35, wherein the computer program instructions, when executed, cause the processing device to:
  detect user interactions in the second application; and
  count the detected user interactions in the second application.

47. A non-transitory storage medium according to claim 35, wherein the computer program instructions, when executed, cause the processing device to:
  determine whether an application displayed to a user is the second application; and
  calculate a measure of time between a first time at which the application displayed to the user is determined to be the second application and a time at which the application displayed to the user is determined to no longer be the second application.

48. A method performed by the execution of monitoring instructions on a processing device that has first application instructions defining a first application and second application instructions, separate from the monitoring instructions, defining a second application engagement of which by a user of the processing device is effective to generate one or more rewards for use in the first application, the method comprising:
  determining a second application to be monitored; and
  determining a measure of time as a measure of an engagement of the determined second application by a user, by:
  obtaining a list of applications on the processing device sorted by time of last engagement by the user;
  repeatedly processing the list to determine whether the application last used by the user is the second application; and
  calculating a measure of time between a first time at which the application last used by the user is determined to be the second application and a time at which the application last used by the user is determined to be no longer the second application.

49. A method according to claim 48, wherein the measure of the engagement of the second application by the user is determined by interfacing with at least one of the first application and operating system of the processing device.

50. A method according to claim 48, wherein the monitoring instructions are part of the first application instructions.

51. A method according to claim 50, wherein the measure of the engagement of the second application by the user is determined by:
  triggering activation of the second application;
  detecting a return of the user to the first application; and
  calculating a measure of time between a time at which activation of the second application is triggered and a time at which the user returns to the first application.

52. A method according to claim 48, wherein the monitoring instructions are part of an operating system of the processing device.

53. A method according to claim 48, wherein the measure of time is determined by:
  detecting a start of a session in the second application;
  detecting an end of a session in the second application; and
  calculating a measure of time between the start of the session and the end of the session.

54. A method according to claim 48, wherein the measure of time is determined by:
  detecting user interactions in the second application;
  determining when a time since a last user interaction in the second application exceeds a threshold; and
  in response to a determination that the threshold has been exceeded, calculating a measure of time between a first user interaction in the second application and the last user interaction in the second application.

55. A method according to claim 48, wherein the measure of time is determined by:
  detecting user interactions in the second application;
  calculating a measure of time between a first user interaction in the second application and subsequent user interactions in the second application; and
  determining when a time since a last user interaction in the second application exceeds a threshold.

56. A method according to claim 48, wherein the measure of time is determined by:
  detecting, for each of a plurality of user interactions in the second application, the start of the user interaction;
  detecting, for each of the plurality of user interactions in the second application, the end of the user interaction;
  calculating, for each of the plurality of user interactions, a duration of the user interaction by calculating a measure of time between the start of the user interaction and the end of the user interaction; and
  combining the durations of the user interactions.

57. A method according to claim 48, wherein the measure of time is determined by:
  detecting user interactions in the second application;
  counting the detected user interactions in the second application;
  determining whether a time since a last user interaction in the second application exceeds a threshold; and
  in response to a determination that the threshold has been exceeded, calculating a measure of time in dependence upon the detected number of user interactions in the second application.

58. A method according to claim 48, wherein the measure of time is determined by:
  detecting user interactions in the second application;
  calculating a measure of time in dependence upon the detected user interactions; and
  determining whether a time since a last user interaction in the second application exceeds a threshold.

59. A method according to claim 48, wherein the measure of the engagement of the second application by the user is determined by:

detecting user interactions in the second application; and
counting the detected user interactions in the second application.

60. A method according to claim 48, wherein the measure of time is determined by:
determining whether an application displayed to a user is the second application; and
calculating a measure of time between a first time at which the application displayed to the user is determined to be the second application and a time at which the application displayed to the user is determined to no longer be the second application.

* * * * *